US012351355B2

(12) United States Patent
Iijima et al.

(10) Patent No.: US 12,351,355 B2
(45) Date of Patent: Jul. 8, 2025

(54) LABEL WRAPPING DEVICE INCLUDING FIRST AND SECOND MEMBERS ARRANGED TO PARTIALLY OVERLAP EACH OTHER IN WIDTH DIRECTION OF LABEL TO CORRECT CURLING TENDENCY OF LABEL

(71) Applicant: BROTHER KOGYO KABUSHIKI KAISHA, Nagoya (JP)

(72) Inventors: Shota Iijima, Nagoya (JP); Yoshikazu Kawauchi, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 142 days.

(21) Appl. No.: 17/870,730

(22) Filed: Jul. 21, 2022

(65) Prior Publication Data

US 2022/0355964 A1 Nov. 10, 2022

Related U.S. Application Data

(63) Continuation of application No. PCT/JP2021/001614, filed on Jan. 19, 2021.

(30) Foreign Application Priority Data

Jan. 31, 2020 (JP) ................................ 2020-014455

(51) Int. Cl.
*B65C 3/02* (2006.01)

(52) U.S. Cl.
CPC ..................................... *B65C 3/02* (2013.01)

(58) Field of Classification Search
CPC ....................................................... B65C 3/02
See application file for complete search history.

(56) References Cited

U.S. PATENT DOCUMENTS 7,231,952 B2 * 6/2007 Schanke ............... B65C 9/1865 53/586
2004/0211522 A1 * 10/2004 Fries ......................... B65C 3/02 156/443

(Continued)

FOREIGN PATENT DOCUMENTS

| | | | |
|---|---|---|---|
| JP | 2005-1139 | A | 1/2005 |
| JP | 2007-001710 | A | 1/2007 |
| WO | 2021/153330 | A1 | 8/2021 |

OTHER PUBLICATIONS

International Search Report and Written Opinion of the International Search Report for PCT/JP2021/001614 dated Apr. 13, 2021.

(Continued)

*Primary Examiner* — Daniel Jeremy Leeds
(74) *Attorney, Agent, or Firm* — Kenealy Vaidya LLP

(57) ABSTRACT

A label wrapping device configured to warp a label around a cable includes: a conveying roller, a straightening member and an insertion recess. The conveying roller conveys the label in a conveying direction along a conveying path. The straightening member is positioned downstream of the conveying roller in the conveying direction. The straightening member includes a first member and a second member opposing each other across the conveying path in a prescribed direction intersecting the conveying path. A part of the first member and a part of the second member overlap each other in a width direction orthogonal to the conveying direction and crossing the prescribed direction. The insertion recess is positioned downstream of the straightening member in the conveying direction and on the same side as the second member in the prescribed direction with respect to the conveying path. The insertion recess is open toward the conveying path.

17 Claims, 43 Drawing Sheets

(56) References Cited

U.S. PATENT DOCUMENTS

| | | | | |
|---|---|---|---|---|
| 2004/0257428 | A1 | 12/2004 | Sato et al. | |
| 2019/0263552 | A1* | 8/2019 | Nelson | B65C 3/02 |

OTHER PUBLICATIONS

International Preliminary Report on Patentability for PCT/JP2021/001614 dated Jul. 28, 2022.
Office Action issued in Japanese Patent Application No. 2020-014455 dated Aug. 22, 2023.

* cited by examiner

LABEL WRAPPING DEVICE INCLUDING FIRST AND SECOND MEMBERS ARRANGED TO PARTIALLY OVERLAP EACH OTHER IN WIDTH DIRECTION OF LABEL TO CORRECT CURLING TENDENCY OF LABEL

CROSS REFERENCE TO RELATED APPLICATION

This is a by-pass continuation application of International Application No. PCT/JP2021/001614 filed on Jan. 19, 2021 which claims priority from Japanese Patent Application No. 2020-014455 filed Jan. 31, 2020. The entire contents of the earlier applications are incorporated herein by reference.

TECHNICAL FIELD

The present disclosure relates to a label wrapping device configured to wrap a label around a cable.

BACKGROUND

Devices that wrap labels around cables are known in the art. A prior art discloses a label applicator including a puck assembly, a gripper assembly, a label roller assembly, and a label stripper assembly.

The label roller assembly pays out a liner member from a roll of the liner member. A plurality of labels is affixed to the liner member. While conveyed by rollers in the label roller assembly, the liner member is guided to the label stripper assembly. The label stripper assembly separates the labels from the liner member one label at a time. The portion of the liner member having been stripped off labels is taken up by a take-up roller.

The puck assembly includes two arm members having curved plate shapes. The two arm members are each rotatable about a pin and are urged toward each other. The gripper assembly moves a cable toward the puck assembly and presses the cable between the two arm members. A label that has been peeled off the liner member by the label stripper assembly is interposed between the two arm members and the cable, and a portion of the label is affixed to the cable. The two arm members pivot in directions away from each other, and the cable is interposed and fixed therebetween. The puck assembly rotates around the cable fixed by the two arm members. Through these operations, the label applicator wraps the label around the cable.

SUMMARY

Because the liner member is maintained in a rolled state, the labels may have a tendency to curl. In such cases, the labels will curl after being peeled off the liner member by the label stripper assembly. In order to ensure that the labels can be securely wrapped around a cable, the curling tendency of the label is preferably corrected to straighten the label before the wrapping operation.

In view of the foregoing, it is an object of the present disclosure to provide a label wrapping device capable of securely wrapping a label around a cable by correcting curling tendency in the label.

In order to attain the above and other objects, according to one aspect, the disclosure provides a label wrapping device configured to wrap a label around a cable. The label wrapping device includes a conveying roller, a straightening member and an insertion recess. The conveying roller is configured to convey the label in a conveying direction along a conveying path. The straightening member is positioned downstream of the conveying roller in the conveying direction. The straightening member includes a first member and a second member positioned opposite each other with respect to the conveying path in a prescribed direction intersecting the conveying path. A part of the first member and a part of the second member overlap each other in a width direction orthogonal to the conveying direction and crossing the prescribed direction. The insertion recess is disposed downstream of the straightening member in the conveying direction and is positioned on the same side as the second member in the prescribed direction with respect to the conveying path. The insertion recess is open toward the conveying path.

In the above-described label wrapping device, the label reaches the insertion recess after passing through the straightening member. The straightening member can correct curling tendency in the label conveyed by the conveying roller using the first member and the second member overlapping each other in the width direction. With this structure, this label wrapping device can stably wrap the label about the cable by driving the insertion recess.

BRIEF DESCRIPTION OF THE DRAWINGS

The particular features and advantages of the embodiment(s) as well as other objects will become apparent from the following description taken in connection with the accompanying drawings, in which.

DETAILED DESCRIPTION

A label wrapping device 1A according to an embodiment of the present disclosure will be described while referring to the accompanying drawings. The referenced drawings are used to describe the technical features made possible with the present disclosure. The configurations and the like of apparatuses included therein are merely examples, and the present disclosure is not intended to be limited to these configurations and the like.

The label wrapping device 1A is configured to affix a label 10A having an adhesive surface to a cable 19 by wrapping the label 10A around the cable 19. In the following description, the lower-left, upper-right, upper-left, lower-right, top, and bottom of the label wrapping device 1A in FIG. 1 will be respectively defined as the front, rear, left, right, top, and bottom of the label wrapping device 1A.

<Overview of the Label Wrapping Device 1A>

An overview of the label wrapping device 1A will be described with reference to FIGS. 1 through 9.

The label wrapping device 1A includes a plate-shaped frame 11. The frame 11 includes side plates 11A and 11B, and a bottom plate 11C. The side plates 11A and 11B are both orthogonal to a left-right direction and oppose each other to be spaced apart from each other in the left-right direction. The bottom plate 11C extends horizontally, spanning between bottom edges of the respective side plates 11A and 11B. The label wrapping device 1A is used with the bottom plate 11C resting on a table or the like.

Figure 4:
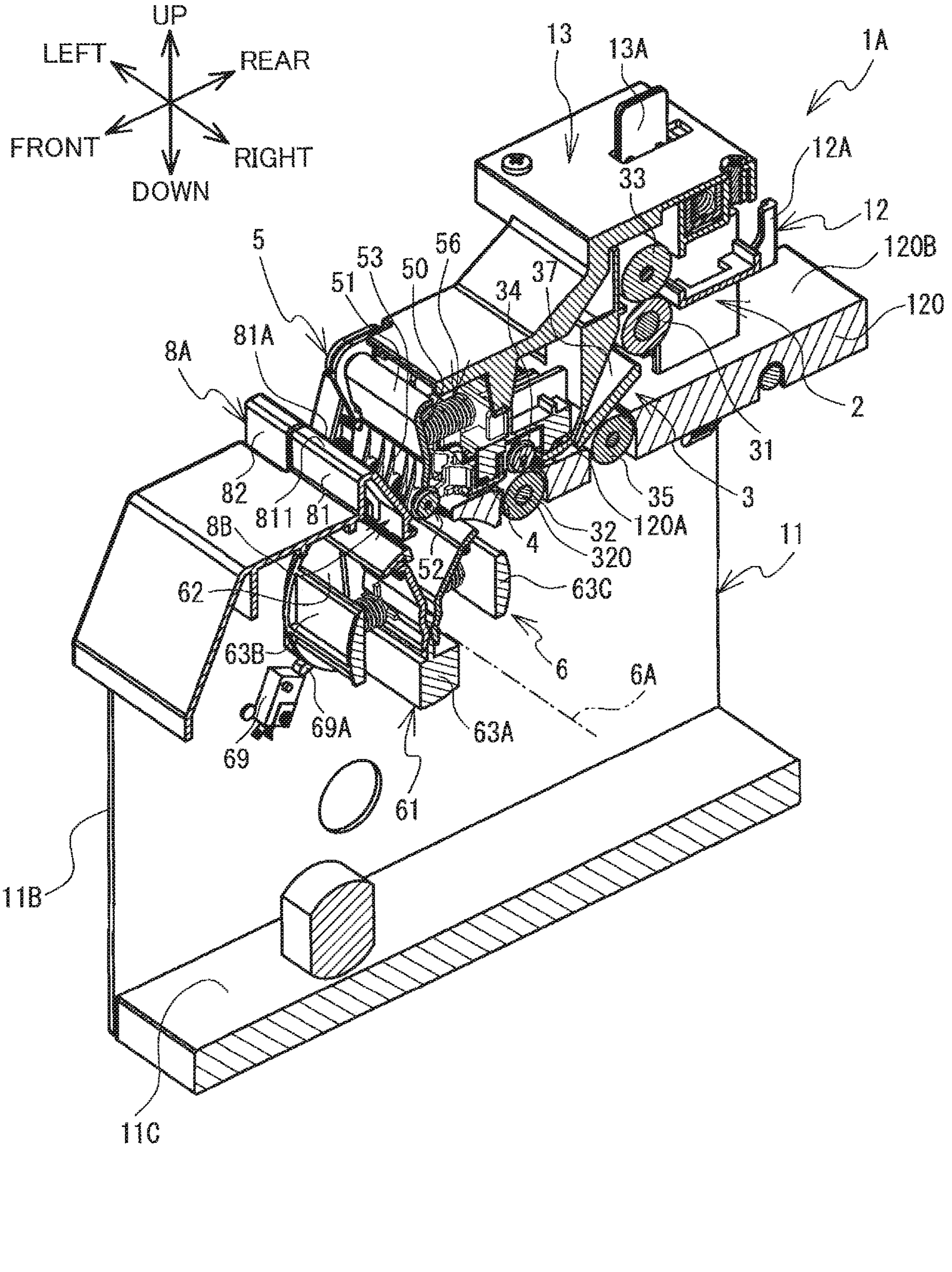
FIG. 4 is a perspective view including a cross section of the label wrapping device 1A taken along a line IV-IV in FIG. 1.
Figure 5:
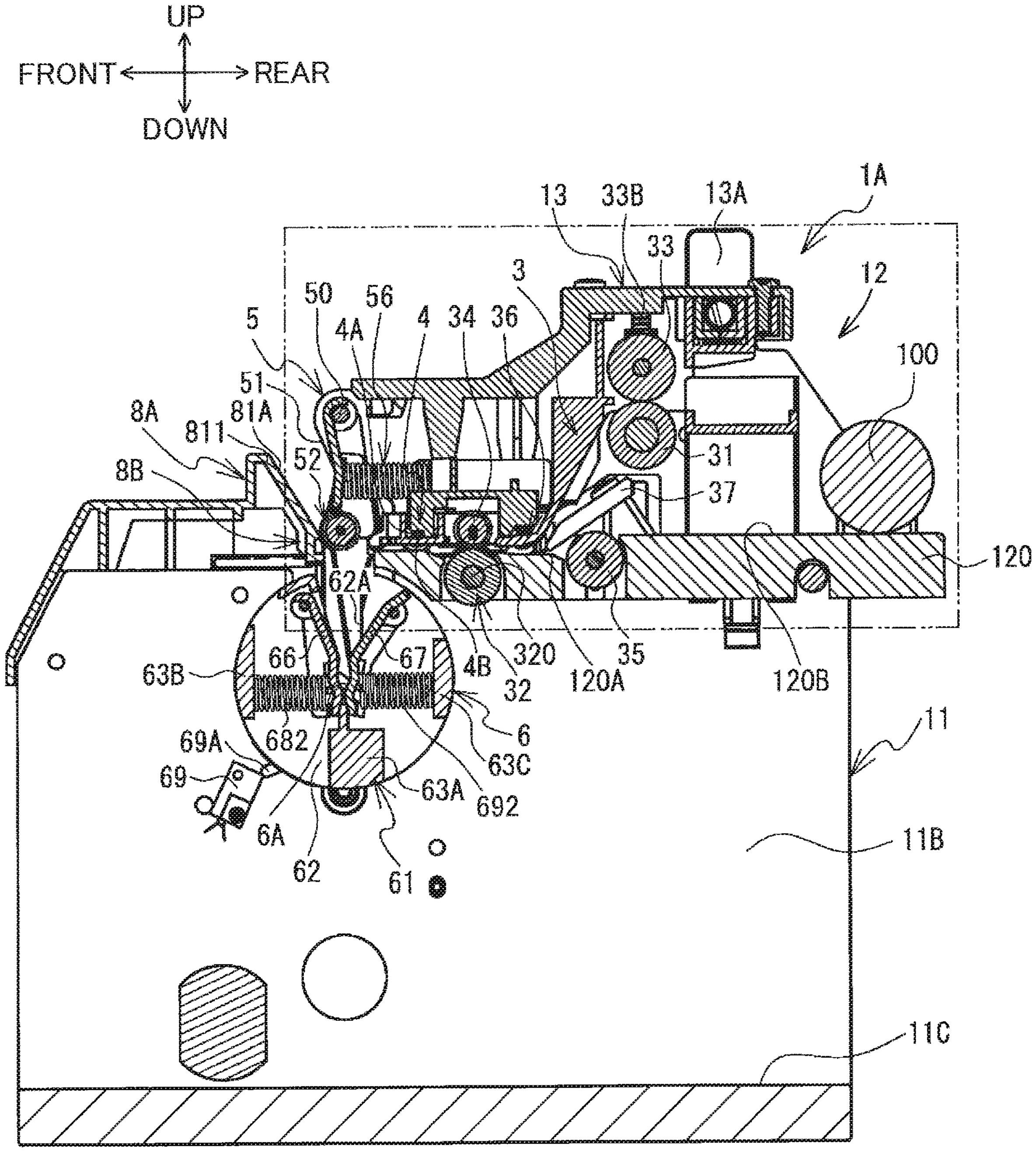
FIG. 5 is a cross-sectional view of the label wrapping device 1A taken along a line V-V in FIG. 2 as viewed in a direction indicated by corresponding arrows.

The frame 11 supports a conveyance base 120. The conveyance base 120 has a thick plate shape and is sandwiched between the side plates 11A and 11B of the frame 11 above a vertical center thereof (see FIGS. 4 and 5). The conveyance base 120 extends horizontally. As illustrated in FIG. 4, aa front end of the conveyance base 120 is located in approximate front-rear centers of the respective side plates 11A and 11B. A rear end of the conveyance base 120 protrudes rearward from rear edges of the respective side plates 11A and 11B. As illustrated in FIG. 5, the conveyance base 120 has a top surface that is interrupted in a front-rear direction by a space in which a follow roller 35 described later is supported. Hereinafter, a front region of the top surface of the conveyance base 120 (on the front side of the follow roller 35) will be referred to as a conveying surface 120A, and a rear region of the top surface of the conveyance base 120 (on the rear side of the follow roller 35) will be referred to as a conveying surface 120B. The conveying surface 120A is positioned lower than the conveying surface 120B.

Figure 1:
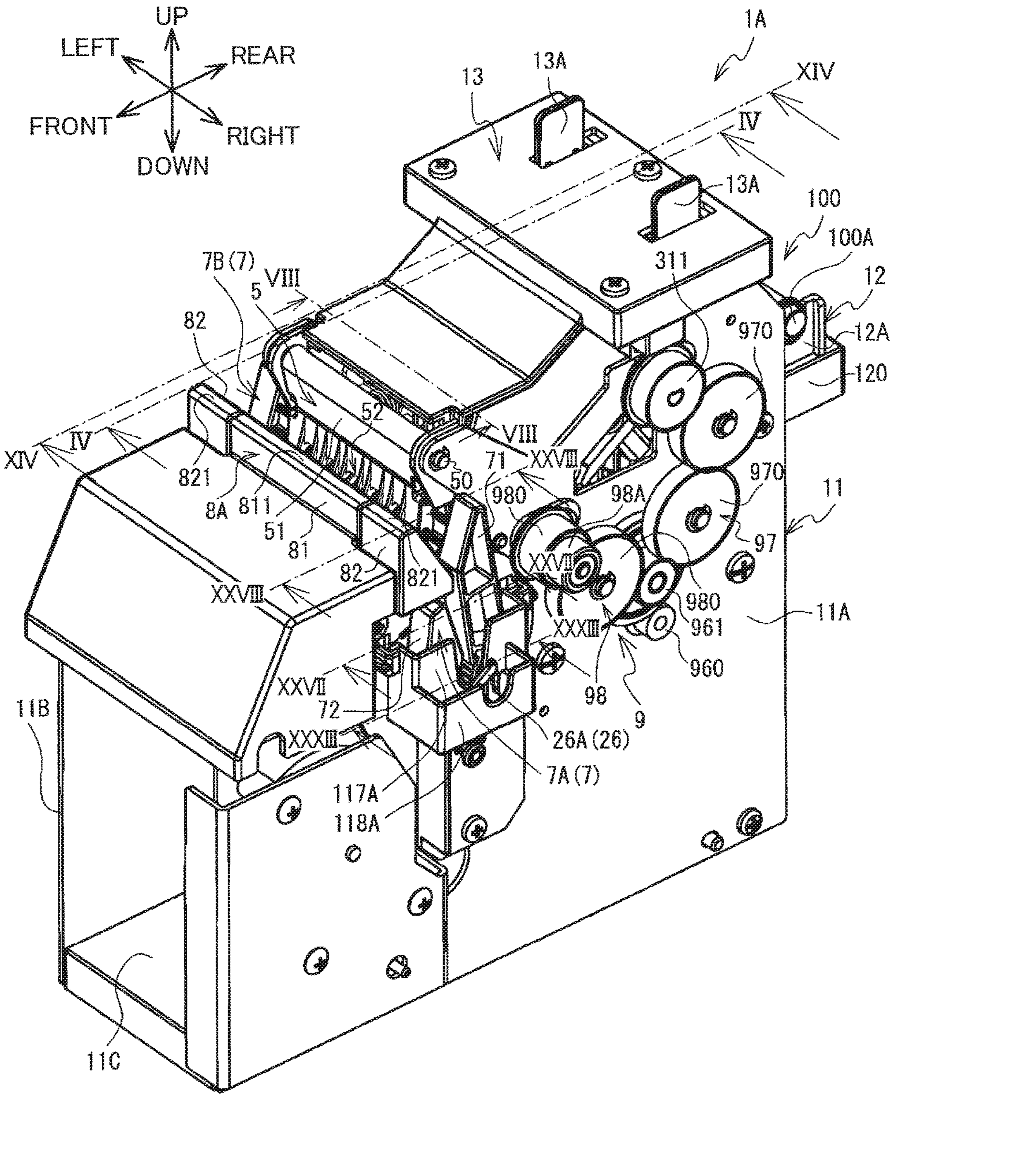
FIG. 1 is a perspective view of a label wrapping device 1A (cover part 13: closed position)
Figure 2:
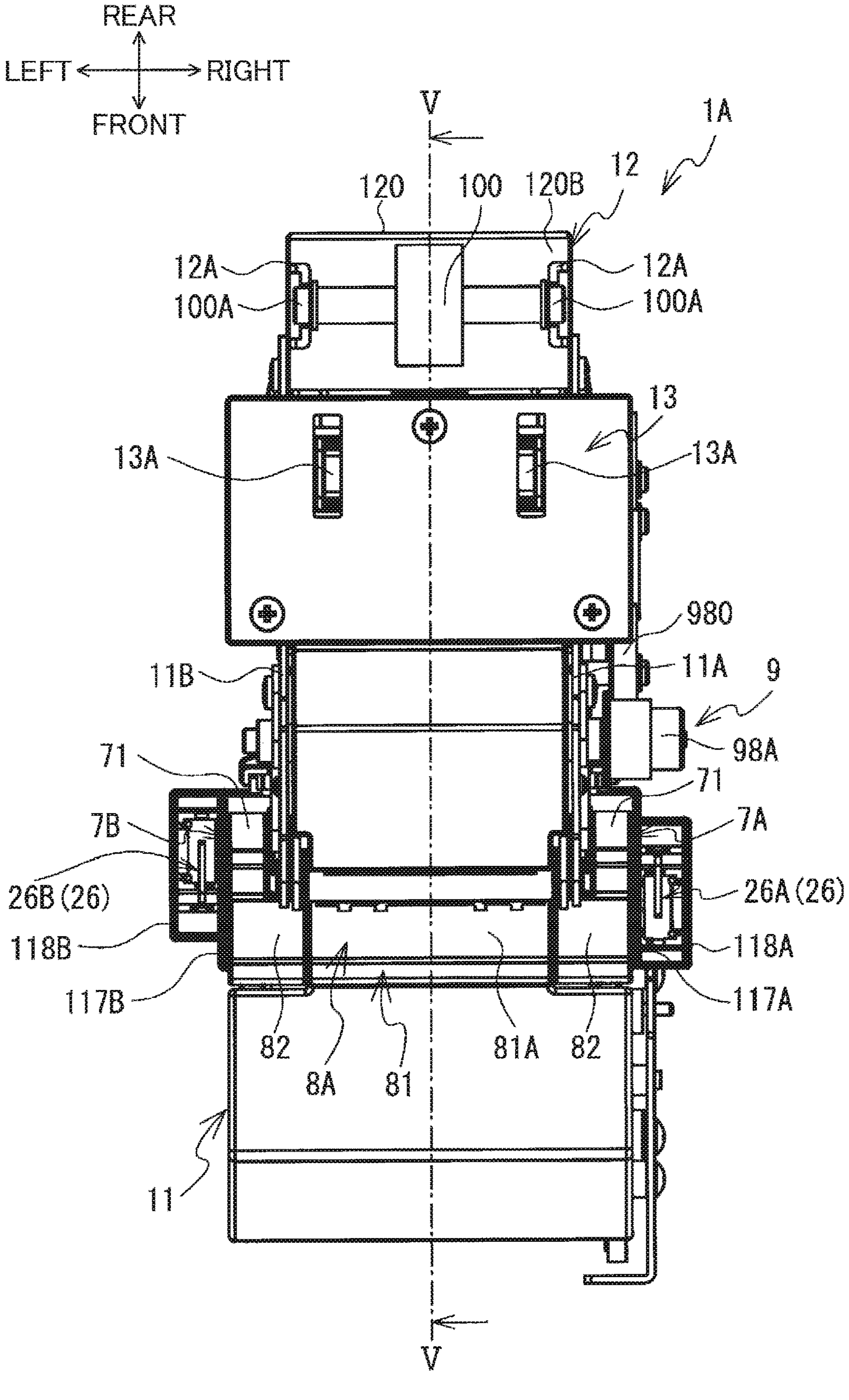
FIG. 2 is a plan view of the label wrapping device 1A (cover part 13: closed position)
Figure 3:
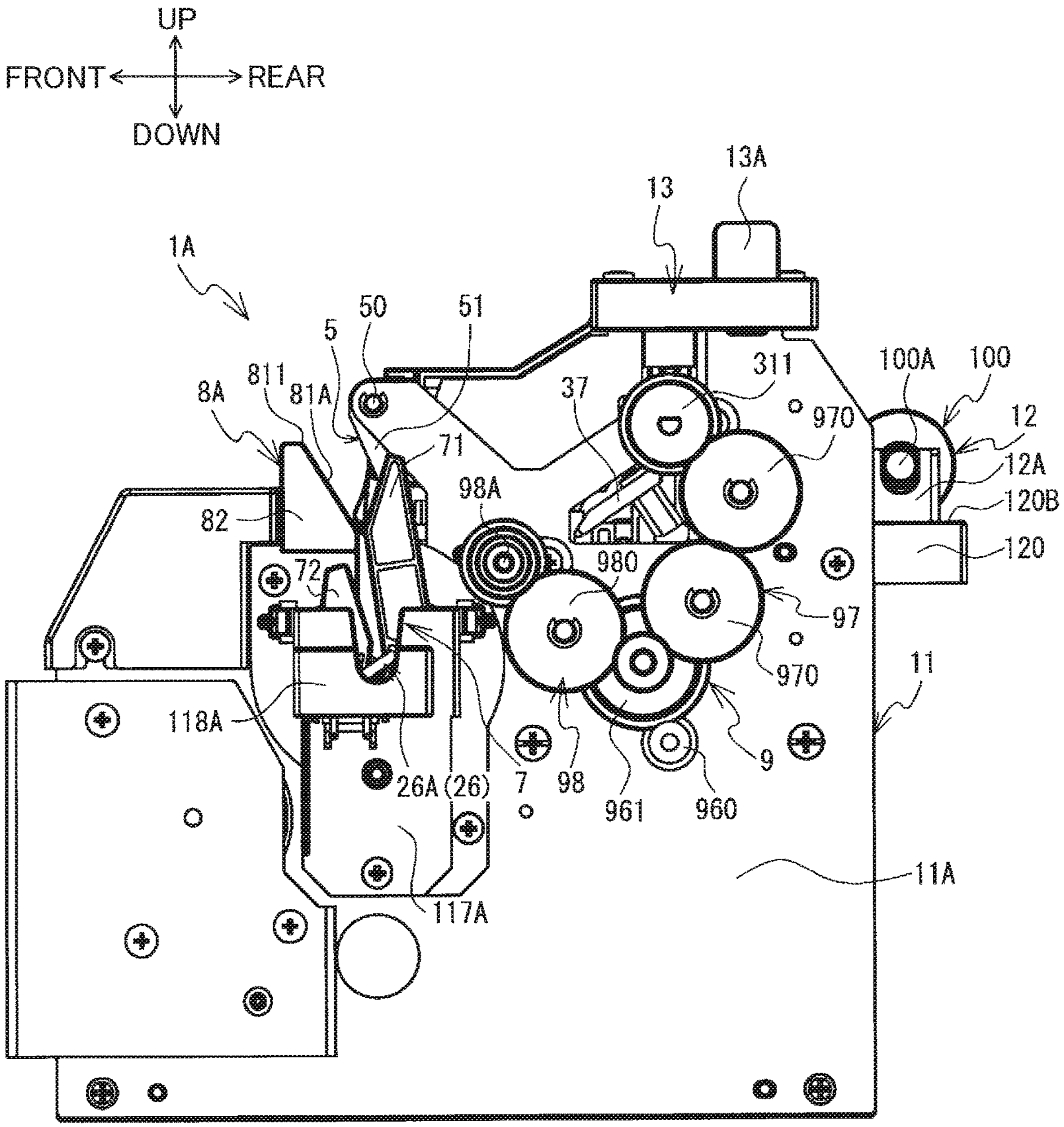
FIG. 3 is a right side view of the label wrapping device 1A (cover part 13: closed position)
Figure 8:
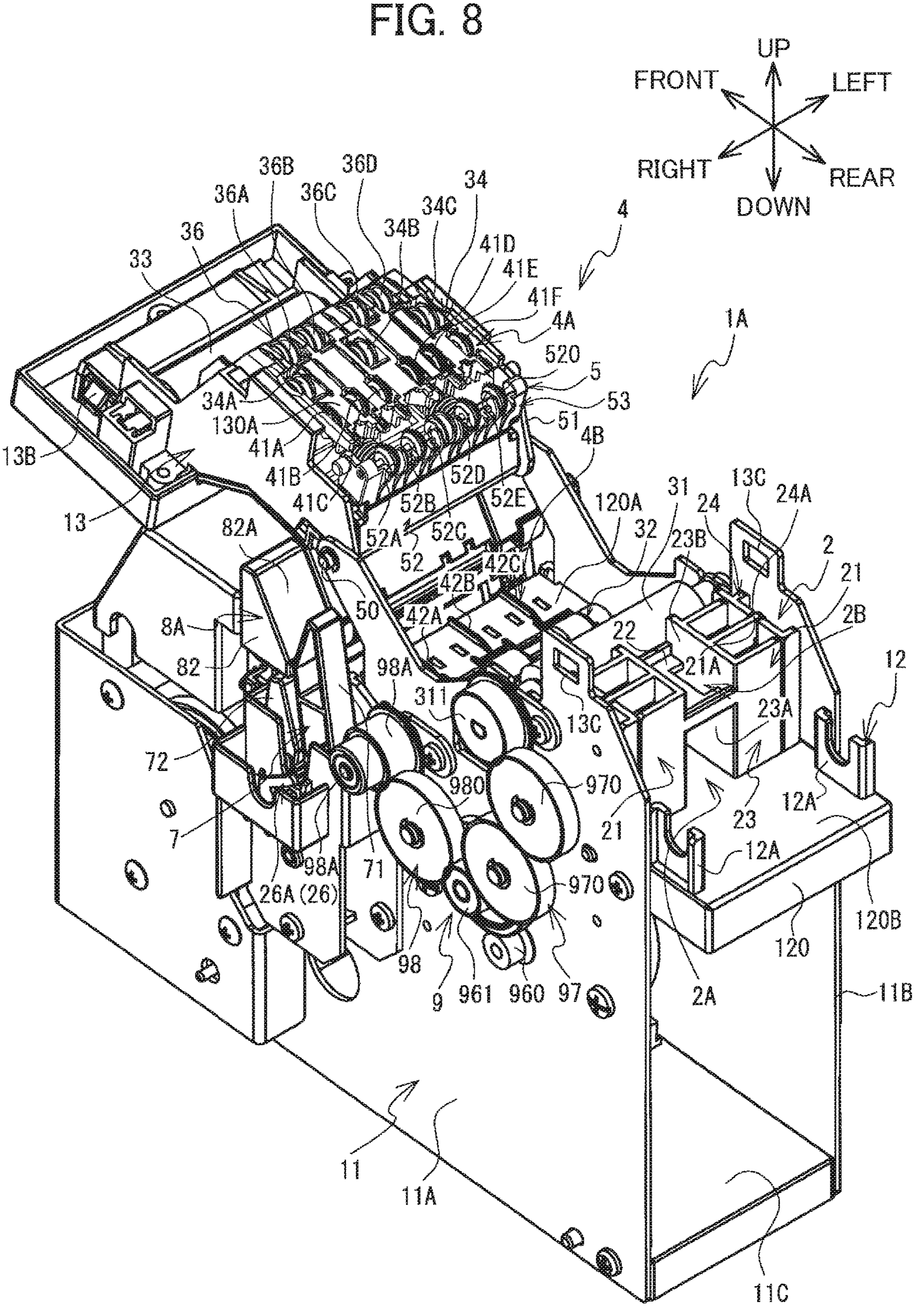
FIG. 8 is a perspective view of the label wrapping device 1A (cover part 13: open position)

A holder 12 is provided on the conveying surface 120B at a rear end portion thereof. As illustrated in FIGS. 2 and 8, the holder 12 includes a pair of bearings 12A that are spaced apart from each other in the left-right direction. As illustrated in FIGS. 1 through 3, the bearings 12A rotatably support a roll 100 configured by a label tape 10 wound around a core 100A. The bearings 12A rotatably support respective ends of the core 100A. The label tape 10 includes a plurality of labels 10A, and a release paper 10B. The release paper 10B is along strip to which the labels 10A are affixed. The labels 10A are arranged sequentially in a longitudinal direction of the release paper 10B. Slits are pre-cut at each boundary between neighboring two labels 10A in the longitudinal direction of the release paper 10B.

The label tape 10 is inserted into the label wrapping device 1A through an insertion port 2A (see FIG. 8), which is an opening provided above the conveying surface 120B. Inside the label wrapping device 1A, the labels 10A are peeled off the release paper 10B one at a time. Each label 10A separated from the release paper 10B is wrapped around and affixed to a cable 19 by the label wrapping device 1A. The release paper 10B is subsequently discharged from the label wrapping device 1A through a discharge port 2B (see FIGS. 8 and 11), which is an opening provided above the insertion port 2A.

Figure 9:
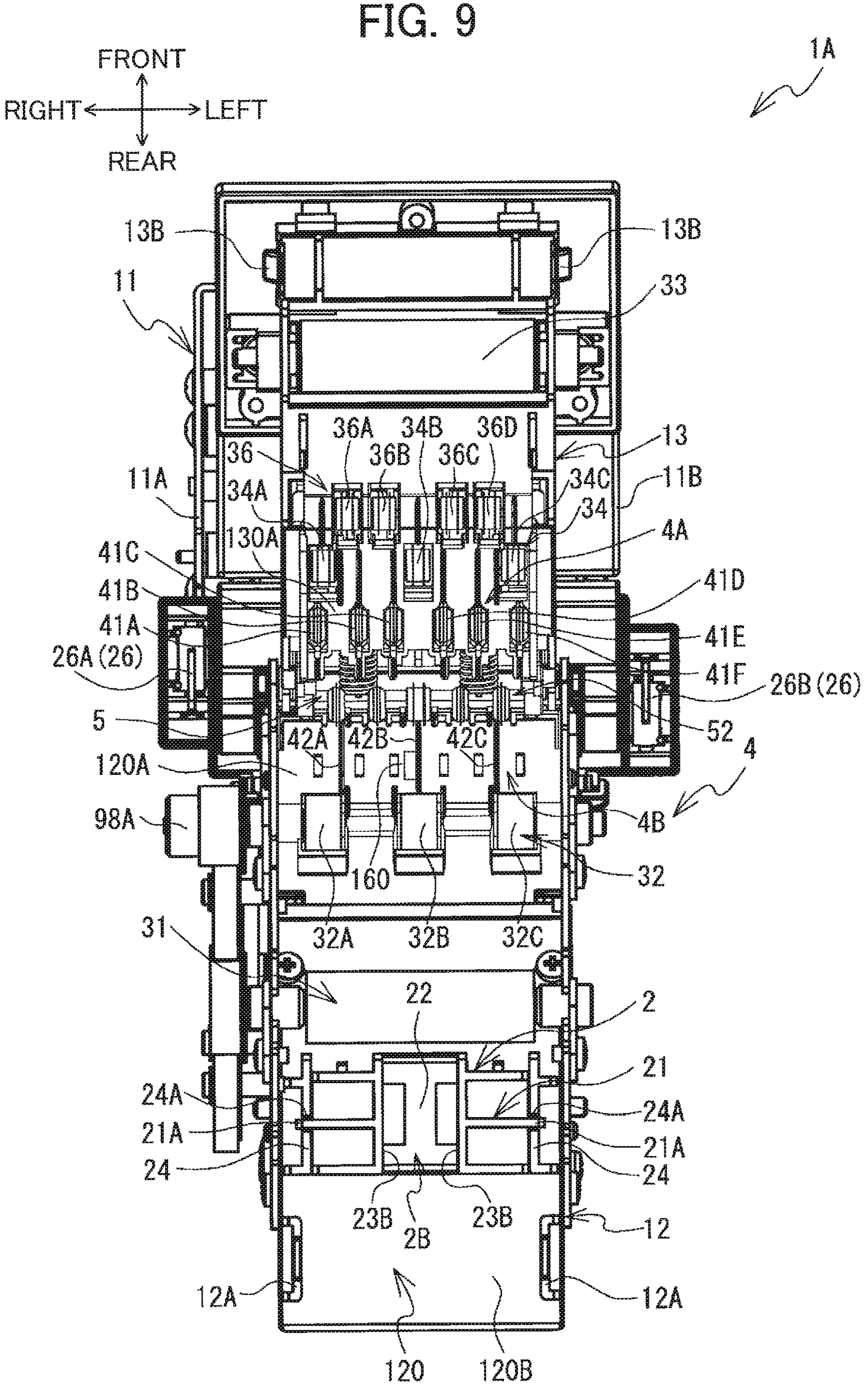
FIG. 9 is a plan view of the label wrapping device 1A (cover part 13: open position)

As illustrated in FIGS. 1 through 3, a cover part 13 is provided on the top of the frame 11. The cover part 13 is pivotably supported by the side plates 11A and 11B through a rotating shaft 50 extending in the left-right direction (see FIGS. 1 and 3). The rotating abaft 50 extends between top end portions of the side plates 11A and 11B at positions approximately front-rear centers of the respective side plates 11A and 11B. The cover part 13 pivots about an axis 50C (see FIG. 6) which is a centerline of the rotating shaft 50 that extends in the left-right direction. By pivoting, the cover part 13 can be switched between an orientation extending rearward from the rotating shaft 50 (see FIGS. 1 through 5; hereinafter called a closed position) and an orientation extending forward from the rotating shaft 50 (see FIGS. 8 and 9; hereinafter called an open position). As illustrated in FIGS. 8 and 9, the conveying surface 120A of the conveyance base 120 is exposed when the cover part 13 is disposed in the open position.

As illustrated in FIGS. 1 through 3, the cover part 13 includes a pair of levers 13A in positions corresponding to a top surface of the cover part 13 in the closed position. The cover part 13 also includes a pair of hooks 13B (see FIGS. 8 and 9) at positions corresponding to a bottom surface of the cover part 13 in the closed position. A pair of engagement holes 13C (see FIG. 8) are formed in the top end portions of the respective side plates 11A and 11B near rear ends thereof. When the cover part 13 is in the closed position, the hooks 13B engage with the corresponding engagement holes 13C from inner sides thereof. This engagement restricts the cover part 13 from pivoting from its closed state to its open state. However, when an operation is performed to move the levers 13A inward, the hooks 13B also move inward. At this time, the engaged state of the hooks 13B to the engagement holes 13C is released. Therefore, the cover part 13 can be pivoted about the rotating shaft 50 and moved from the closed position to the open position.

Figure 6:
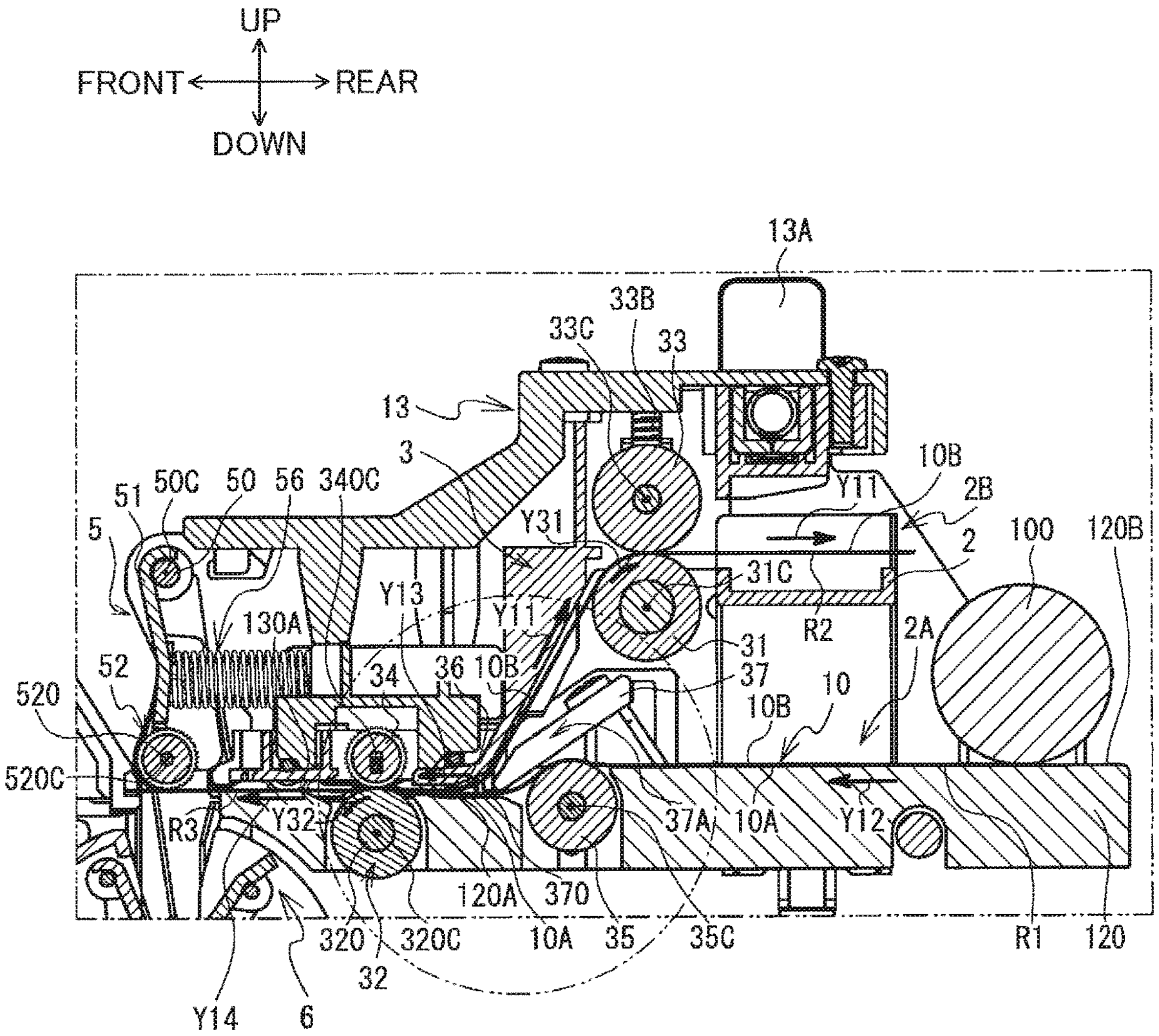
FIG. 6 is an enlarged view of an area indicated in FIG. 5.

The label wrapping device 1A is used while the cover part 13 is in the closed position. As illustrated in FIG. 6, a surface of the cover part 13 that opposes the conveying surface 120A of the conveyance base 120 from above when the cover part 13 is in the closed position will be called a conveying surface 130A. When the cover part 13 is in the closed position, the conveying surface 130A is above and slightly separated from the conveying surface 120A. Unless specifically indicated otherwise, the directions, positional relationships, and the like of the various mechanisms will be described below under an assumption that the cover part 13 is disposed in the closed position.

As illustrated in FIGS. 3 through 5, the frame 11 holds a guide member 2, a conveying mechanism 3, a straightening member 4, an opening/closing member 5, a wrapping mechanism 6, retaining members 7, a guide member 8A, a restriction part 8B, a drive unit 9, and the like.

The conveying mechanism 3 is configured to draw out the label tape 10 from the roll 100 and peel the labels 10A off the release paper 10B while conveying the labels 10A forward. The guide member 2 is configured to guide the label tape 10, which is drawn off the roll 100 by the conveying mechanism 3, and the release paper 10B from which the labels 10A have been separated. The straightening member 4 is configured to correct curl in the labels 10A separated from the release paper 10B. The wrapping mechanism 6 is configured to wrap each label 10A around the cable 19 and affixes the label 10A to the cable 19. The retaining members 7 hold the cable 19 relative to the wrapping mechanism 6 in order that the wrapping mechanism 6 can wrap the label 10A about the cable 19 and affix the label 10A thereto. The opening/closing member 5 and guide member 8A are configured to guide the cable 19 to the wrapping mechanism 6. The restriction part 8B is configured to restrict the movement of the label 10A separated from the release paper 10B. The drive unit 9 is configured to drive the conveying mechanism 3, the wrapping mechanism 6, and the like.

<Drive Unit 9>

A motor 96A (see FIG. 34) is provided on the left side (inside) of the side plate 11A configuring the frame 11. As illustrated in FIGS. 1 and 3, the motor 96A has a rotational shaft protruding rightward from the side plate 11A, and a gear 960 is provided on the rotational shaft. The gear 960 engages with an intermediate gear 961, and the intermediate gear 961 is coupled with transmission parts 97 and 98 described next.

The transmission part 97 includes a plurality of gears 970 that are rotatably supported on the right surface of the side plate 11A. The gears 970 are in mesh with each other. The transmission part 97 is interposed between the intermediate gear 961 and a stripping roller 31 of the conveying mechanism 3 described later (see FIGS. 4 and 5) for transmitting a rotational drive force of the motor 96A to the stripping roller 31. The transmission part 98 includes a plurality of gears 980 that are rotatably supported on the right surface of the side plate 11A, and a one-way clutch 98A. The transmission part 98 is interposed between the intermediate gear 961 and conveying rollers 32 of the conveying mechanism 3 described later (see FIGS. 4 and 5) for transmitting the rotational drive force of the motor 96A to the conveying rollers 32.

A motor 96B (see FIG. 34) is provided near front edges of the side plates 11A and 11B configuring the frame 11. A rotational drive force of the motor 96B is transmitted to the wrapping mechanism 6 described later (see FIGS. 4 and 5). The wrapping mechanism 6 is configured to rotate when receiving the rotational drive force of the motor 96B. Hereinafter, the motors 96A and 96B will be collectively referred to as the drive unit 9, wherever appropriate.

<Conveying Mechanism 3>

The conveying mechanism 3 is arranged in front of the roll 100 supported by the holder 12. As illustrated in FIG. 5, the conveying mechanism 3 includes the stripping roller 31, conveying rollers 32, follow rollers 33-36, and a stripping plate 37.

As illustrated in FIG. 4, the stripping roller 31 has a columnar shape. The stripping roller 31 is rotatably supported between the side plates 11A and 11B of the frame 11 (see FIG. 1). As illustrated in FIG. 6, the stripping roller 31 defines an axis 31C aligned in the left-right direction that serves as a rotational center of the stripping roller 31. The stripping roller 31 is positioned above and is separated from the conveying surface 120B of the conveyance base 120. The stripping roller 31 has a length in the left-right direction that is slightly smaller than a gap between the side plates 11A and 11B. The stripping roller 31 includes a rotational shaft that is coupled with a gear 311 illustrated in FIGS. 1 and 3. The gear 311 is engaged with one of the gears 970 in the transmission part 97. The stripping roller 31 is thus configured to receive the rotational drive force of the motor 96A transmitted by the transmission part 97 via the gear 311. In such cases, as illustrated in FIG. 6, the stripping roller 31 rotates clockwise when the label wrapping device 1A is viewed from its right side (i.e., in a direction indicated by an arrow Y31 in FIG. 6). Unless specifically indicated otherwise, the directions of rotation (clockwise or counterclockwise) in the following description will be defined based on an assumption that the label wrapping device 1A is viewed from its right side.

As illustrated in FIG. 4, the follow roller 33 has a columnar shape. The follow roller 33 has a diameter and a length in the left-right direction that are both substantially the same as a diameter and a length in the left-right direction of the stripping roller 31. The follow roller 33 is rotatably supported in the cover part 13. As illustrated in FIG. 6, the follow roller 33 defines an axis 33C aligned in the left-right direction that serves as a rotational center of the follow roller 33. The follow roller 33 is positioned above and adjacent to the stripping roller 31. The axis 31C of the stripping roller 31 and the axis 33C of the follow roller 33 extend parallel to each other and have the same position in the front-rear direction.

Springs 33B are disposed above the follow roller 33. The springs 33B are interposed between the top inner surface of the cover part 13 and the follow roller 33 and exert a downward urging force on the follow roller 33. When receiving this urging force of the springs 33B, the follow roller 33 is moved downward and pressed against the stripping roller 31.

As illustrated in FIGS. 4 and 5, the conveying rollers 32 are provided near the front end of the conveyance base 120. As illustrated in FIG. 9, the conveying rollers 32 include conveying rollers 32A, 32B, and 32C. The conveying rollers 32A, 32B, and 32C are each columnar in shape and are evenly spaced in the left-right direction. The conveying rollers 32A, 32B, and 32C are coupled to a rotational shaft 320 illustrated in FIGS. 4 and 5. The rotational shaft 320 has a columnar shape and extends in the left-right direction. The rotational shaft 320 is rotatably supported between the side plates 11A and 11B of the frame 11 (see FIG. 1). As illustrated in FIG. 6, the rotational shaft 320 defines an axis 320C extending in the left-right direction and serving as a rotational center of the rotational shaft 320 at a position below the conveying surface 120A of the conveyance base 120. As illustrated in FIG. 8, upper ends of the respective conveying rollers 32 protrude slightly above the conveying surface 120A.

The rotational shaft 320 of the conveying rollers 32 is coupled to the one-way clutch 98A of the transmission part 98 illustrated in FIGS. 1 and 3. The one-way clutch 98A is configured to transmit the rotational drive force of the motor 96A to the conveying rollers 32. The conveying rollers 32 is configured to receive the rotational drive force of the motor % A transmitted by the transmission part 98 via the one-way clutch 98A. In such cases, as illustrated in FIG. 6, the conveying rollers 32 rotate counterclockwise (in a direction of an arrow Y32 in FIG. 6).

Note that the one-way clutch 98A is configured to uncouple the motor 96A from the conveying rollers 32 when the conveying rollers 32 rotate in the direction of the arrow Y32 while the motor 96A is halted. Accordingly, the conveying rollers 32 can freely rotate in the direction of the arrow Y32 while the motor 96A is halted without being affected by the torque of the motor 96A.

As illustrated in FIGS. 8 and 9, the follow rollers 34 include follow rollers 34A, 34B, and 34C arranged in the left-right direction. The follow rollers 34A, 34B, and 34C are disc-shaped with uneven circumferential edges. The follow rollers 34 are rotatably supported in the cover part 13. As illustrated in FIG. 5, bottom ends of the follow rollers 34 protrude slightly downward from the conveying surface 130A of the cover part 13. The follow rollers 34 are positioned above and adjacent to the conveying rollers 32. The bottom ends of the follow rollers 34 contact the upper ends of the conveying rollers 32. More specifically, the follow roller 34A illustrated in FIG. 9 is above and adjacent to the conveying roller 32A, with the bottom and of the follow roller 34A contacting the upper end of the conveying roller 32A. The follow roller 34B is above and adjacent to the conveying roller 32B, with the bottom end of the follow roller 34B contacting the upper end of the conveying roller 32B. The follow roller 34C is above and adjacent to the conveying roller 32C, with the bottom end of the follow roller 34C contacting the upper end of the conveying roller 32C.

As illustrated in FIG. 6, the follow rollers 34 define an axis 340C that extends in the left-right direction and that serves as a rotational center of the follow rollers 34. The axis 320C of the conveying rollers 32 and the axis 340C of the follow rollers 34 extend parallel to each other at the same position in the front-rear direction.

As illustrated in FIG. 4, the stripping plate 37 is disposed diagonally below and forward of the stripping roller 31 and rearward of the conveying rollers 32. The stripping plate 37 has a plate shape and is sloped relative to the horizontal direction. More specifically, the stripping plate 37 slopes diagonally downward from a rear end toward a front end thereof. As illustrated in FIG. 6, the stripping plate 37 has a front end portion 37A whose thickness tapers gradually toward the front end. The front end portion 37A has a curved surface that appears substantially arc-shaped in a side view. As illustrated in FIG. 6, the position of the front end of the stripping plate 37 will be called a peeling point 370. The peeling point 370 is slightly above and separated from the conveying surface 120A of the conveyance base 120.

As illustrated in FIG. 4, the follow roller 35 has a columnar shape. The follow roller 35 has a length in the left-right direction that is approximately the same as a length of the stripping plate 37 in the left-right direction. The follow roller 35 is rotatably supported in the space between the conveying surface 120A and conveying surface 120B of the conveyance base 120. As illustrated in FIG. 6, the follow roller 35 defines an axis 35C that extends in the left-right direction and that serves as a rotational center of the follow roller 35. The upper end of the follow roller 35 protrudes slightly above the conveying surface 120B. The follow roller 35 is below and adjacent to the stripping plate 37. The follow roller 35 contacts the bottom surface of the stripping plate 37 at a position slightly forward of the top of the follow roller 35.

As illustrated in FIGS. 8 and 9, the follow rollers 36 include follow rollers 36A, 36B, 36C, and 36D arranged in the left-right direction. The follow rollers 36A, 36B, 36C, and 36D are disc-shaped with uneven circumferential edges. The follow rollers 36 are rotatably supported in the cover part 13. As illustrated in FIG. 5, the bottom ends of the follow rollers 36 protrude slightly downward from the conveying surface 130A of the cover part 13. The follow rollers 36 are positioned rearward of the conveying rollers 32 and follow rollers 34 and forward of the stripping plate 37, stripping roller 31, and follow rollers 33 and 35.

As illustrated in FIG. 6, the label tape 10 drawn off the roll 100 is inserted into the label wrapping device 1A through the insertion port 2A. The label tape 10 is conveyed forward along the conveying surface 120B of the conveyance base 120. At this time, the labels 10A of the label tape 10 are arranged on the bottom surface of the release paper 10B such that the top surfaces of the labels 10A correspond to adhesive surfaces adhered to the release paper 10B.

The label tape 10 extends forward from the bottom of the roll 100 and passes over the follow roller 35. Subsequently, the label tape 10 bends diagonally downward and extends farther forward, passing through the gap between the follow roller 35 and the stripping plate 37. The label tape 10 continues to extend diagonally downward along the bottom surface of the stripping plate 37 to the peeling point 370. At this point, the release paper 10B is bent upward around the peeling point 370, causing the labels 10A of the label tape 10 to separate from the release paper 10B.

The labels 10A peeled off by the stripping plate 37 extend forward along the conveying surface 120A of the conveyance base 120, passing beneath the follow rollers 36 and through the gap between the conveying rollers 32 and follow rollers 34. At this time, the adhesive surfaces of the labels 10A face upward. The labels 10A are subsequently wrapped around and affixed to cables 19 by the wrapping mechanism 6 described later, which is provided on the front side of the conveyance base 120.

In the meantime, the release paper 10B from which the stripping plate 37 has separated the labels 10A is bent around the peeling point 370 and extends diagonally upward and rearward along the top surface of the stripping plate 37. The release paper 10B continues to extend diagonally upward and rearward to the stripping roller 31, curves rearward while in contact with the stripping roller 31, and passes rearward through the gap between the stripping roller 31 and follow roller 33. The release paper 10B is then discharged from the label wrapping device 1A through the discharge port 2B.

Hereinafter, the area through which the label tape 10 passes when conveyed from the insertion port 2A toward the peeling point 370 of the stripping plate 37 will be called a first conveying path R1. The area through which the release paper 10B passes when conveyed from the peeling point 370 of the stripping plate 37 toward the discharge port 2B will be called a second conveying path R2. The area through which the labels 10A pass while conveyed forward from the peeling point 370 of the stripping plate 37 will be called a third conveying path R3.

Figure 7:
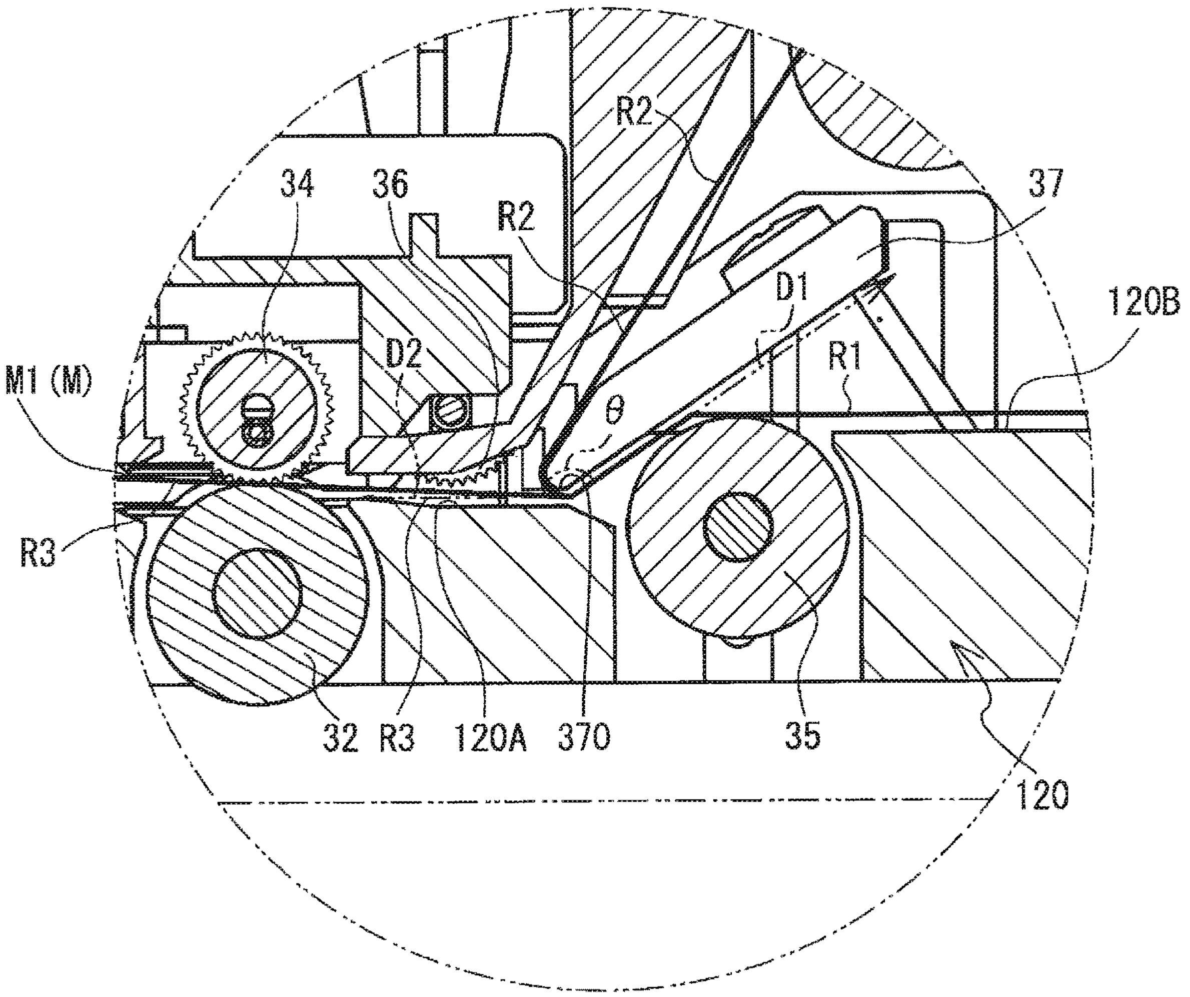
FIG. 7 is an enlarged view of an area encircled in FIG. 6.

As illustrated in FIG. 7, the direction along the first conveying path R1 from the peeling point 370 of the stripping plate 37 and opposite a conveying direction of the label tape 10 is defined as a first direction D1. The direction along the third conveying path R3 from the peeling point 370 and the same as the conveying direction of the label 10A is defined as a second direction D2. In FIG. 7, assume that the first direction D1 and the second direction D2 define an angle θ therebetween. In this example, the angle θ is within a range of 120-155°, and more preferably the angle θ be 120°.

Figure 34:
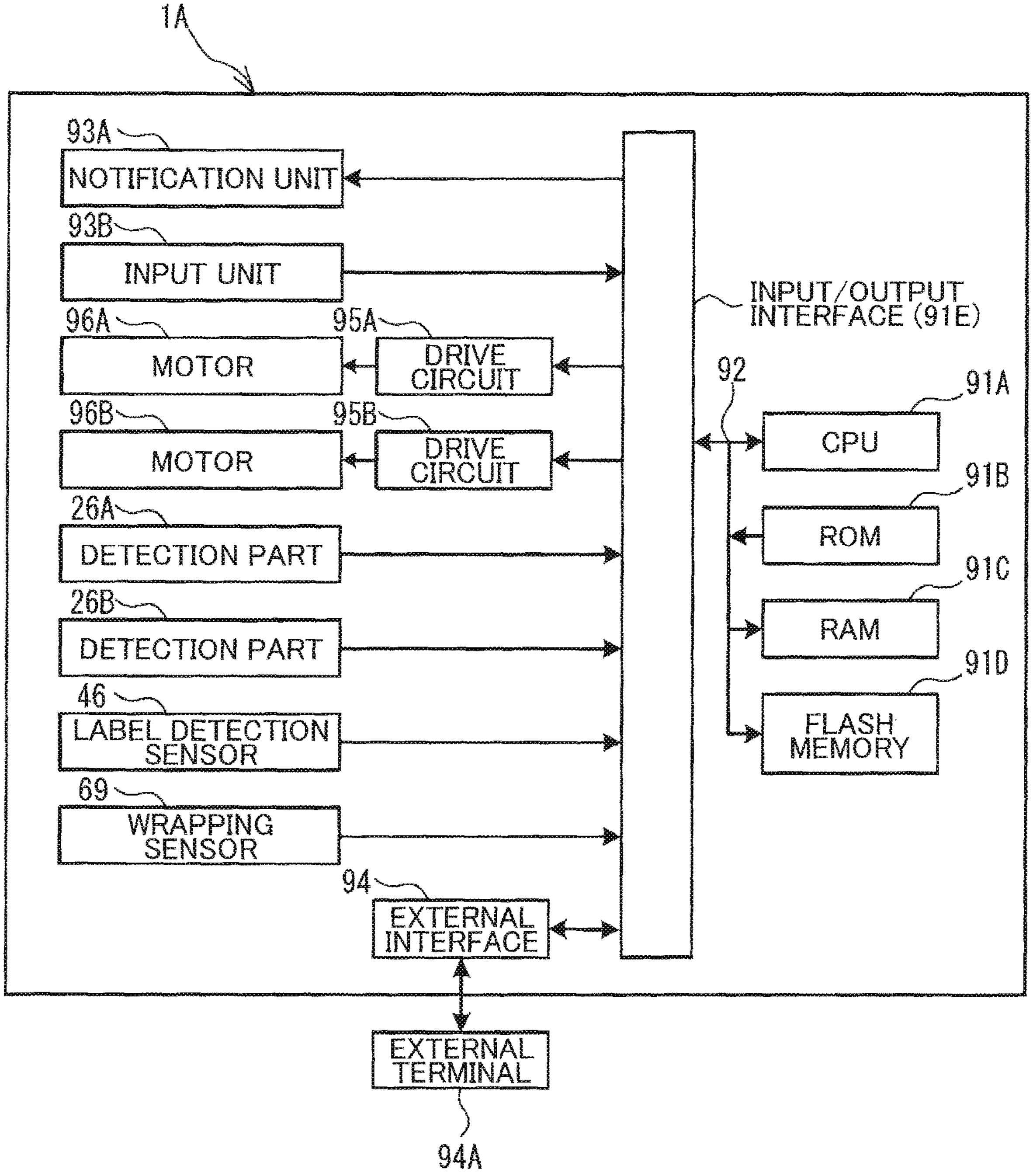
FIG. 34 is a block diagram illustrating an electrical configuration of the label wrapping device 1A.

As illustrated in FIG. 6, the label wrapping device 1A rotates the stripping roller 31 and conveying rollers 32 through the drive of the motor 96A (see FIG. 34). The stripping roller 31 rotates in the direction indicated by the arrow Y31 to convey the release paper 10B pinched between the stripping roller 31 and the follow roller 33 in a direction indicated by an arrow Y11. This action draws more of the label tape 10 off the roll 100 in a direction indicated by an arrow Y12.

The label tape 10 is guided along the stripping plate 37 while the follow roller 35 rotates in response to the movement of the label tape 10. The labels 10A are peeled off the release paper 101B as the release paper 10B bends around the peeling point 370 of the stripping plate 37. The separated labels 10A are pushed in a direction of an arrow Y13. The labels 10A are guided forward by the follow rollers 36 and enters between the conveying rollers 32 and follow rollers 34 from a rear side thereof. The conveying rollers 32 rotate in a direction indicated by an arrow Y32 and convey the labels 10A pinched between the conveying rollers 32 and follow rollers 34 forward. The labels 10A conveyed by the conveying rollers 32 move in a direction indicated by an arrow Y14 to a position above the wrapping mechanism 6, which is disposed forward of the conveyance base 120.

Hereinafter, the direction in which the label 10A is conveyed by the rotation of the conveying rollers 32 (the direction indicated by the arrow Y14) will simply be called the conveying direction. The conveying direction is coincident with the forward direction. The upstream side in the conveying direction corresponds to the rear side of the label wrapping device 1A. The downstream side in the conveying direction corresponds to the front side of the label wrapping device 1A. Hereinafter, the downstream side in the conveying direction will simply be called the downstream side, and the upstream side in the conveying direction will simply be called the upstream side. As illustrated in FIG. 7, a plane passing through the peeling point 370 of the stripping plate 37 and the tops of the conveying rollers 32 (i.e., the surfaces of the conveying rollers 32 closest to the third conveying path R3) will be defined as a datum plane M1.

<Guide Member 2>

Figure 11:
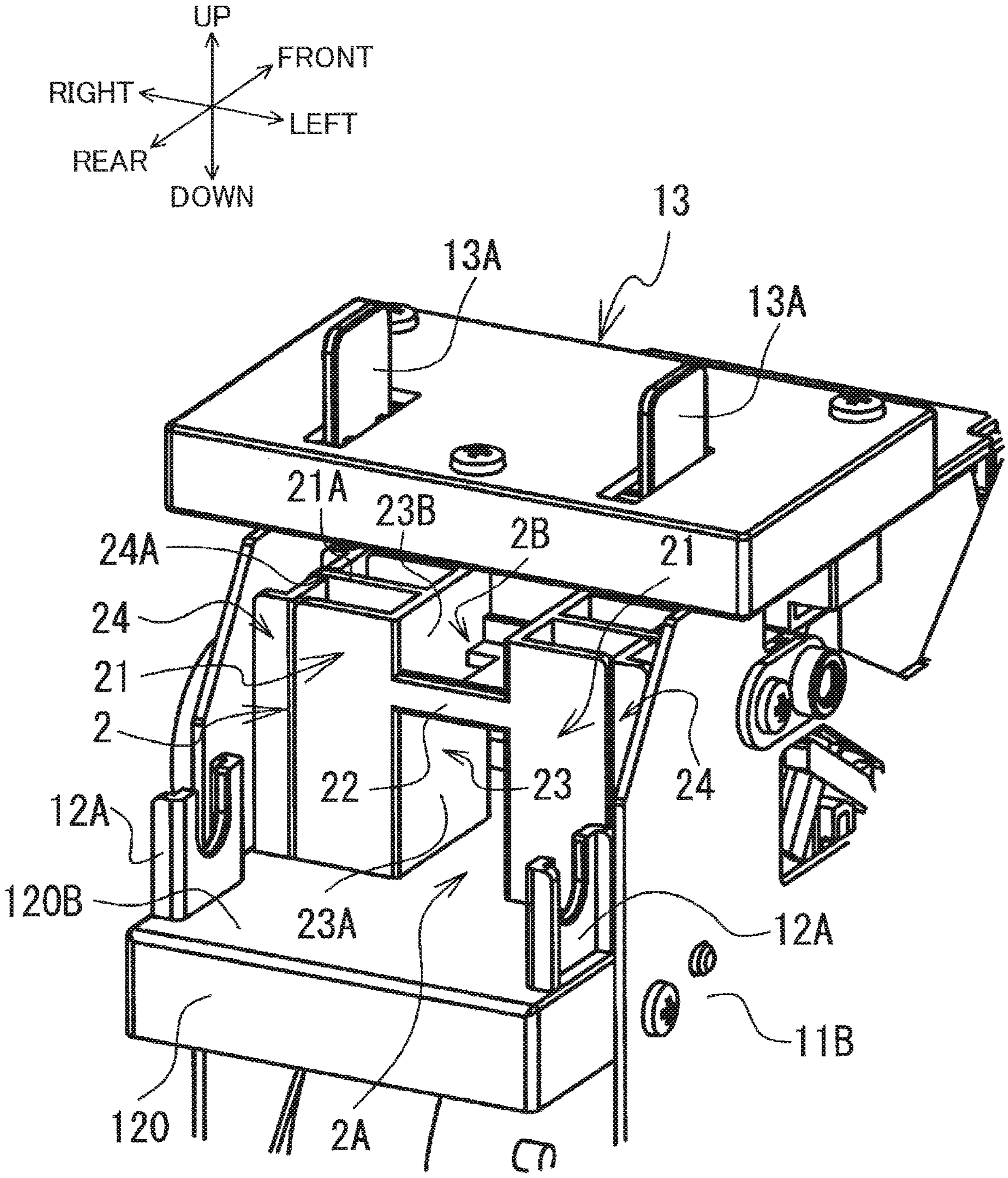
FIG. 11 is an enlarged perspective view of an upper-rear end portion of the label wrapping device 1A.

As illustrated in FIGS. 8 and 11, the guide member 2 is detachably mounted on the conveying surface 120B of the conveyance base 120 in front of the holder 12. The guide member 2 includes a pair of blocks 21, and a bridging part 22. The blocks 21 are spaced apart from each other in the left-right direction. Respective bottom ends of the blocks 21 contact the conveying surface 120B of the conveyance base 120 from above. The bridging part 22 spans between the pair of blocks 21. Each of the blocks 21 has a projecting part 21A that protrudes outward from respective outer left and right surfaces thereof. The projecting parts 21A are positioned at front-rear centers of the respective blocks 21 to extend vertically from respective top edges to bottom edges thereof.

Side walls of the respective blocks 21 facing each other will be called a pair of side walls 23. A portion of each side wall 23 positioned below the bridging part 22 is a first portion. The first conveying path R1 along which the label tape 10 is conveyed when paid out from the roll 100 (see FIG. 6) is located inside the first portions of the side walls 23. Hereinafter, the first portions will be called a pair of side wall portions 23A. The side wall portions 23A guide the label tape 10 along the first conveying path R1 by contacting and positioning both left and right edges of the release paper 10B in the label tape 10 being conveyed along the first conveying path R1. The opening enclosed by the bridging part 22 and the pair of side wall portions 23A corresponds to the insertion port 2A through which the label tape 10 is inserted into the label wrapping device 1A.

A portion of each side wall 23 positioned above the bridging part 22 constitute a second portion. The second conveying path R2 along which the release paper 10B is conveyed after the labels 10A have been peeled off the release paper 10B (see FIG. 6) is located inside the second portions of the side walls 23. Hereinafter, the second portions will be called a pair of side wall portions 23B. The side wall portions 23B guide the release paper 10B along the second conveying path R2 by contacting and positioning both left and right edges of the release paper 10B being conveyed along the second conveying path R2. The opening enclosed by the bridging part 22 and the pair of side wall portions 23B corresponds to the discharge port 2B through which the release paper 10B is discharged from the label wrapping device 1A.

A pair of mounting parts 24 is provided inside the respective side plates 11A and 11B of the frame 11 and above the conveying surface 120B of the conveyance base 120. The mounting parts 24 protrude inward from the inner surfaces of the respective side plates 11A and 11B. A groove 24A is formed in a front-rear center of each mounting part 24. The grooves 24A extend vertically between the top edge and bottom edge of the corresponding mounting parts 24. The guide member 2 can be mounted in the label wrapping device 1A by inserting the projecting parts 21A into the grooves 24A of the corresponding mounting parts 24 and can be removed from the label wrapping device 1A by retracting the projecting parts 21A from the corresponding grooves 24A.

A plurality of guide members 2 having different distances between side walls 23 is prepared in advance. Specifically, since there is a plurality of types of rolls 100 having release papers 10B of different widths, the different types of guide members 2 are configured with distances between the side walls 23 that correspond to the different widths of the release papers 10B. With this label wrapping device 1A, the guide member 2 to be mounted in the pair of mounting parts 24 is selected from among the plurality of guide members 2 and interchanged in conformance with the width of the release paper 10B in the roll 100 to be mounted in the holder 12. In this way, the distance between the pair of side walls 23 in the guide member 2 can be adjusted in the label wrapping device 1A to conform with the width of the release paper 10B.

<Straightening Member 4>

Figure 12:
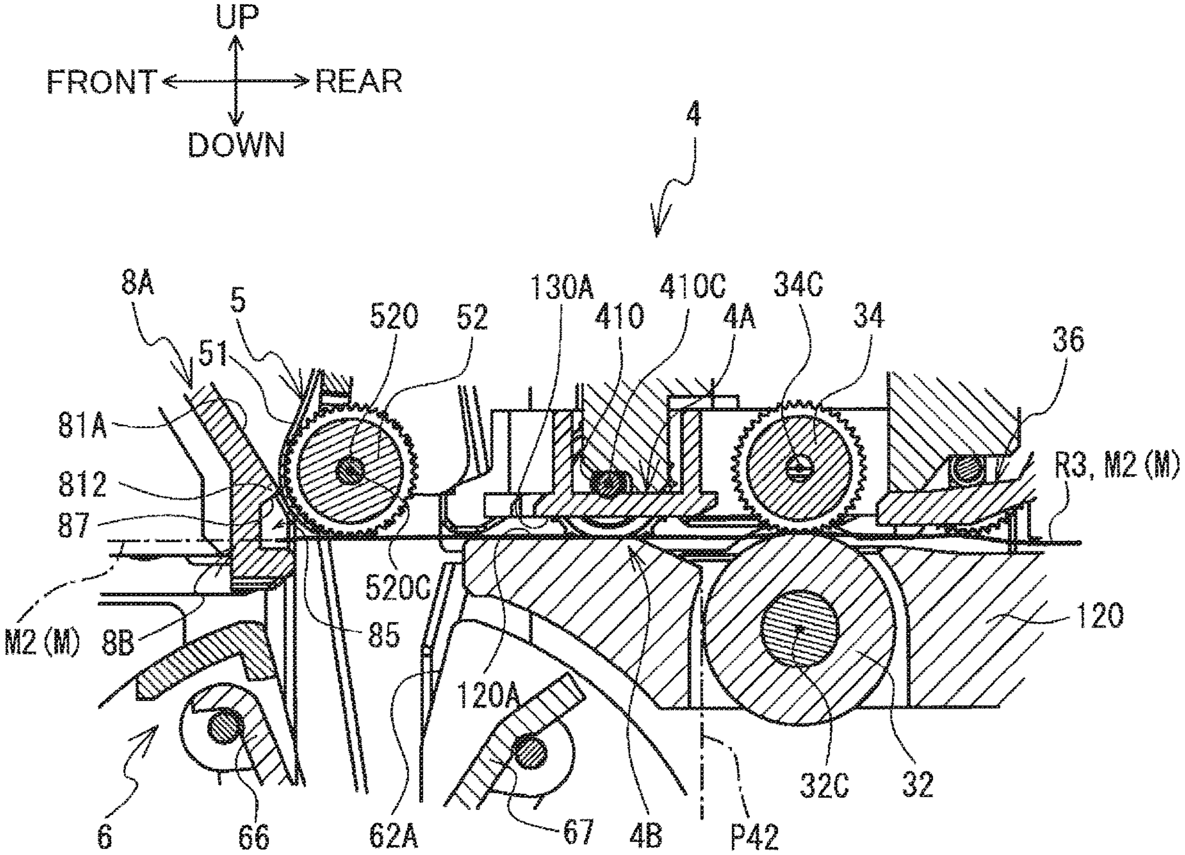
FIG. 12 is an enlarged view of a part illustrated in FIG. 5.
Figure 13:
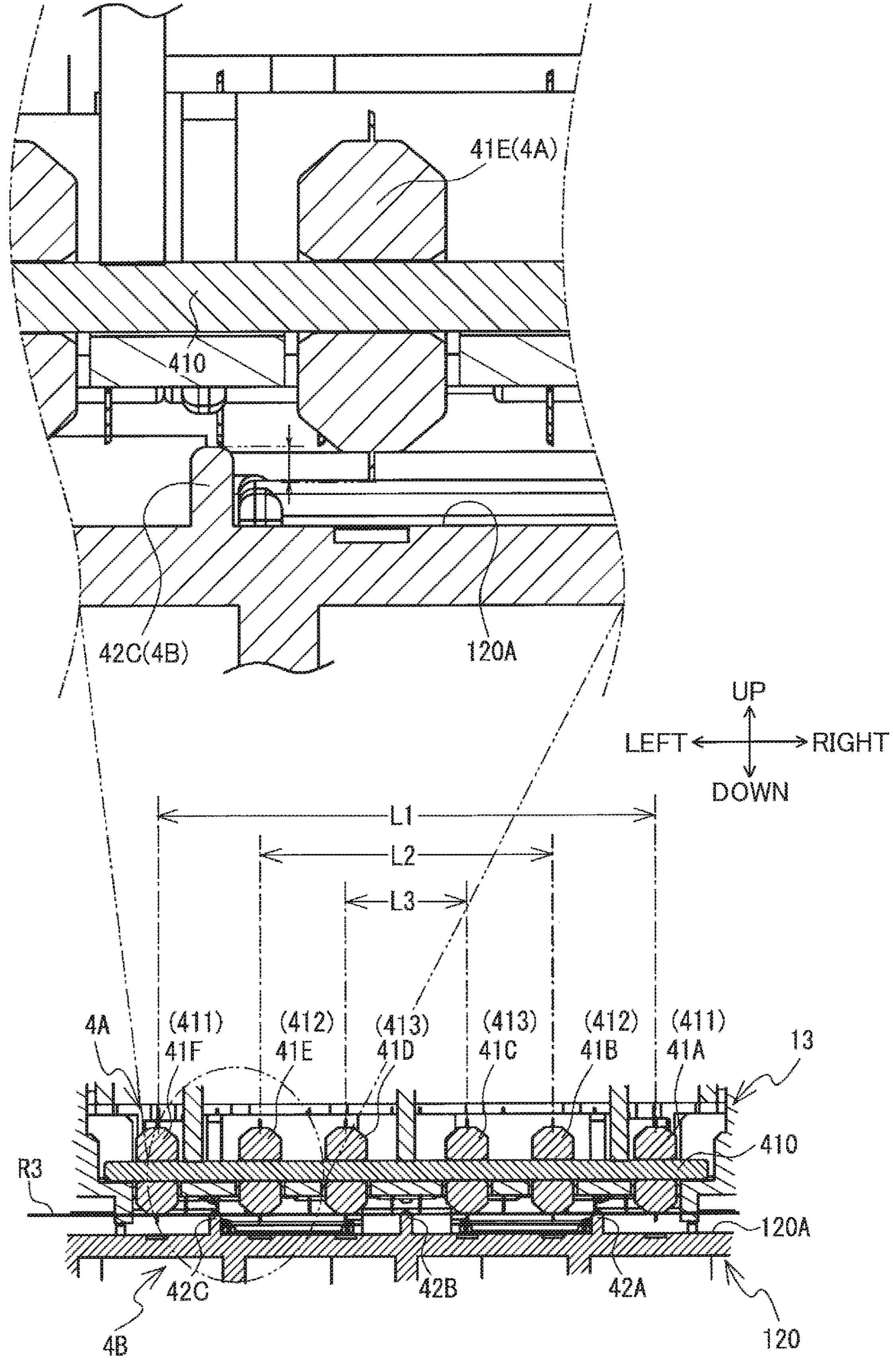
FIG. 13 is a cross-sectional view of a section taken along a line XIII-XIII in FIG. 1 as viewed in a direction indicated by corresponding arrows.

As illustrated in FIGS. 4 and 5, the straightening member 4 is provided downstream relative to the conveying rollers 32 and follow rollers 34 of the conveying mechanism 3. As illustrated in FIGS. 12 and 13, the straightening member 4 includes rotating bodies 4A and ribs 4B. The rotating bodies 4A are arranged above the third conveying path R3, and the ribs 4B are arranged below the third conveying path R3.

As illustrated in FIGS. 9 and 13, the rotating bodies 4A include rotating bodies 41A, 41B, 41C, 41D, 41E, and 41F arranged in the left-right direction. The rotating bodies 41A-41F are disc-shaped and have uneven circumferential edges. Holes are formed through centers of the respective rotating bodies 4A, and a rotational shaft 410 illustrated in FIG. 13 is inserted into these holes. The rotational shaft 410 is rod-shaped and extends in the left-right direction. The rotating bodies 4A are rotatably supported in the cover part 13 by the rotational shaft 410. As illustrated in FIG. 12, the rotational shaft 410 defines an axis 410C extending in the left-right direction and serving as a center of the rotational shaft 410. The rotational shaft 410 is arranged so that the axis 410C is above the conveying surface 130A of the cover part 13. The bottoms of the rotating bodies 4A protrude slightly below the conveying surface 130A.

As illustrated in FIG. 13, the rotating bodies 41A-41F form rotating sets 411, 412, and 413, each of which is configured of two rotating bodies 4A positioned at equal distances from the left-right center of the conveying surface 130A. Specifically, the rotating bodies 41A and 41F that form the rotating set 411 are separated by a separation distance L1 in the left-right direction. The rotating bodies 41B and 41E that form the rotating set 412 are separated by a separation distance L2 in the left-right direction. The rotating bodies 41C and 41D that form the rotating set 413 are separated by a separation distance L3 in the left-right direction. The separation distances L1-L3 are mutually different. Each of the separation distances L1-L3 corresponds to the length in the left-right direction of the labels 10A that can be used in the label wrapping device 1A (hereinafter called the width of the labels 10A) when the labels 10A are conveyed along the third conveying path R3. That is, the separation distances L1-L3 are respectively set to the different types of labels 10A that can be used in the label wrapping device 1A.

Figure 10:
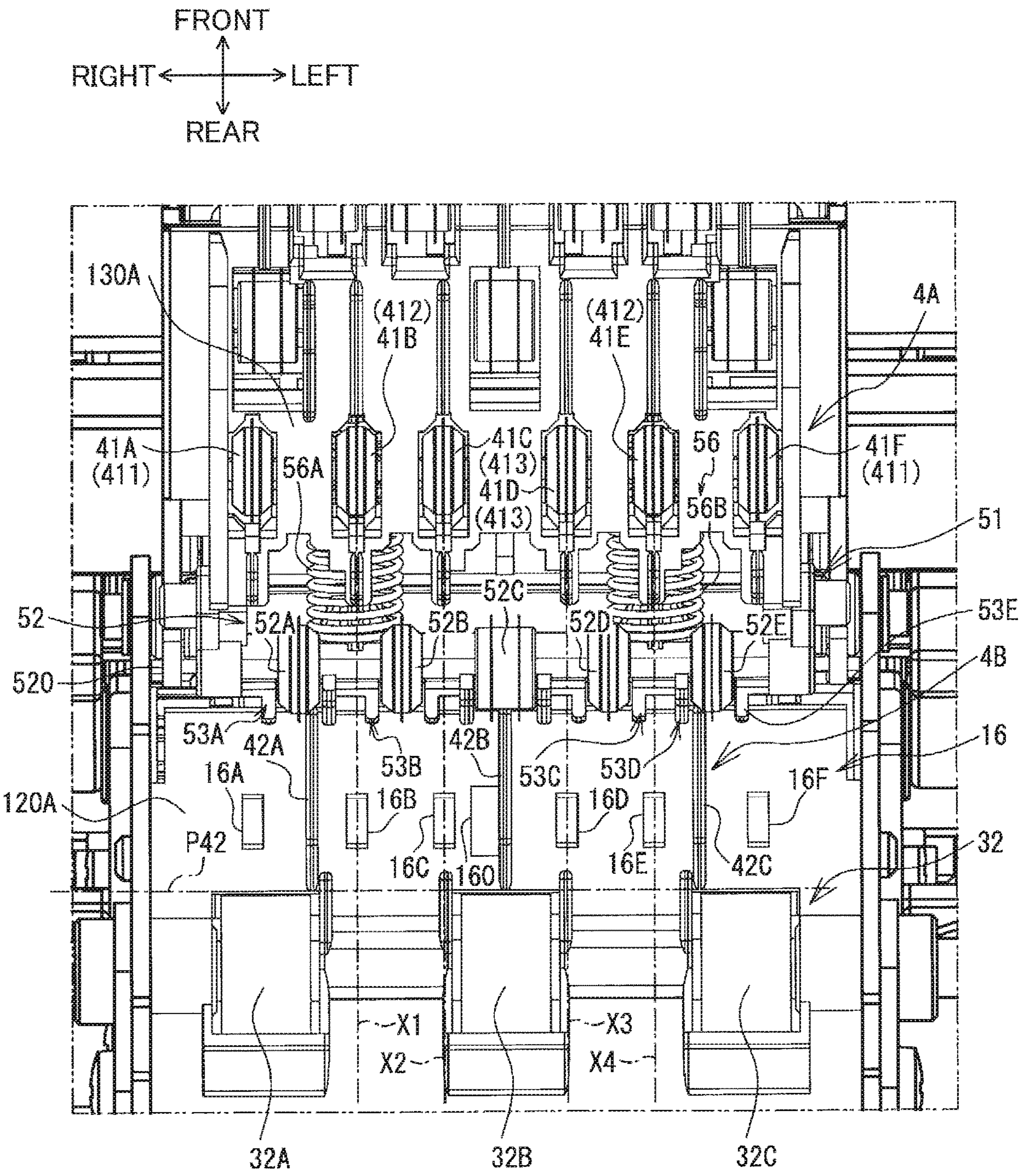
FIG. 10 is an enlarged view of a region near a straightening member 4 in FIG. 9.

As illustrated in FIG. 10, the rotating bodies 41B and 41C are arranged so that both of their left-right center positions X1 and X2 fall between the conveying rollers 32A and 32B in the left-right direction. The rotating bodies 41D and 41E are arranged so that their respective left-right center positions X3 and X4 fall between the conveying rollers 32B and 32C in the left-right direction. Accordingly, the center positions X1 and X4 of the respective rotating bodies 41B and 41E included in the rotating set 412 and center positions X2 and X3 of the respective rotating bodies 41C and 41D included in the rotating set 413 are all arranged at different positions in the left-right direction from the conveying rollers 32A-32C.

As illustrated in FIGS. 10 and 13, the ribs 4B include ribs 42A, 42B, and 42C arranged in the left-right direction. The ribs 42A-42C all protrude upward from the conveying surface 120A. As illustrated in FIG. 10, the ribs 42A, 42B, and 42C extend parallel to each other in the conveying direction. As illustrated in FIGS. 10 and 12, rear ends of the respective ribs 4B and front ends of the respective conveying rollers 32 are arranged at the same position P42 in the front-rear direction. In other words, the rear ends of the ribs 4B are arranged at the same position as the front ends of the conveying rollers 32 in the conveying direction. The front ends of the ribs 42A, 42B, and 42C extend to the front edge of the conveying surface 120A.

As illustrated in FIG. 13, the tops of the ribs 4B are positioned slightly higher than the bottoms of the rotating bodies 4A. That is, the distal ends of the rotating bodies 4A and the ribs 4B overlap each other vertically. As illustrated in FIG. 12, the positions of the rotating bodies 4A and the ribs 4B in the front-rear direction are partially the same. Accordingly, the rotating bodies 4A and the ribs 4B overlap each other in the left-right direction.

The label 10A peeled off the release paper 10B by the stripping plate 37 of the conveying mechanism 3 is conveyed along the third conveying path R3 by the conveying rollers 32 and guided to the straightening member 4 located downstream of the conveying rollers 32. As the label 10A passes between the rotating bodies 4A and the ribs 4B of the straightening member 4, the top adhesive surface of the label 10A contacts the rotating bodies 4A while the bottom surface of the label 10A contacts the ribs 4B. The rotating bodies 4A and the ribs 4B convey the label 10A while deforming the label 10A into a wavy shape having a series of alternating crest-like and trough-like curved parts in the left-right direction. While the label 10A has a curling tendency due to being maintained in a rolled state in the roll 100, the straightening member 4 can correct the curvature by deforming the label 10A into a wavy shape.

As illustrated in FIG. 12, a plane extending horizontally that passes through the tops of the ribs 4B will be defined as a datum plane M2. The datum plane M2 is coincident with the datum plane M1 (see FIG. 7), which is a plane passing through the peeling point 370 of the stripping plate 37 and the tops of the conveying rollers 32. Hereinafter, the datum planes M1 and M2 will be collectively referred to as a datum plane M. The bottoms of the rotating bodies 4A are arranged lower than the datum plane M2, meaning that the bottoms of the rotating bodies 4A are positioned lower than the tops of the conveying rollers 32.

Note that while portions of the third conveying path R3 substantially correspond to the datum plane M, strictly speaking the two are different. This is because the datum plane M is a plane while the third conveying path R3 is defined as a region through which the label 10A passes and transforms into a wavy shape in an area where the straightening member 4 is located. Further, since conveyance of the label 10A is restricted by the restriction part 8B as will be described later, the downstream end of the third conveying path R3 corresponds to the position of the restriction part 8B. However, the datum plane M extends further forward relative to the restriction part 8B.

<Label Detection Sensor 46>

As illustrated in FIG. 10, recesses 16 (specifically, recesses 16A, 16B, 16C, 16D, 16B, and 16F) are formed in the conveying surface 120A. These recesses 16A, 16B, 16C, 16D, 16E, and 16F are provided in positions opposing the respective rotating bodies 41A-41F when the cover part 13 is in the closed position. The recesses 16A-16F are recessed slightly downward from the conveying surface 120A to form a prescribed gap between themselves and the rotating bodies 41A-41F. A rectangular through-hole 160 is provided at a position adjacent to and rightward of the rib 42B.

Figure 14:
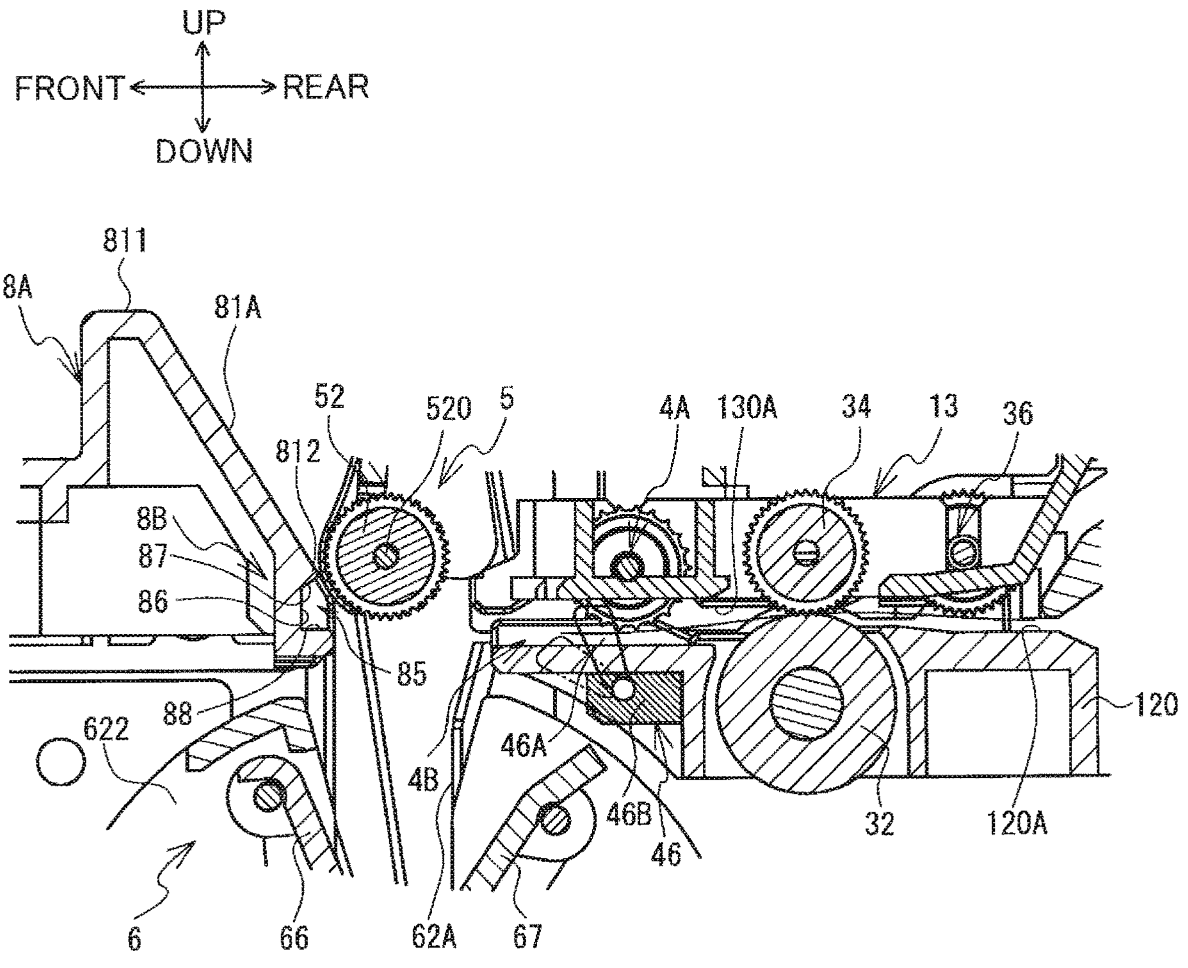
FIG. 14 is a cross-sectional view of a section along a line XIV-XIV in FIG. 1 as viewed in a direction indicated by corresponding arrows.

As illustrated in FIG. 14, a label detection sensor 46 is provided beneath the through-hole 160. The label detection sensor 46 is an actuator-type sensor having an actuator 46A and a detection part 46B. The actuator 46A is rod-shaped and has a proximal end pivotably supported by the detection part 46B. The actuator 46A has a distal end configured to protrude from the through-hole 160 up to a position above the conveying surface 120A. Specifically, the actuator 46A can pivot between a state where the distal end is located above the tops of the ribs 4B and a state where the distal end is located below the tops of the ribs 4B.

The detection part 46B is configured to detect the pivoted state of the actuator 46A and output a signal based on the detection results to a CPU 91A (see FIG. 34). More specifically, the detection part 46B is configured to output an OFF signal when the distal end of the actuator 46A is disposed above the tops of the ribs 4B and output an ON signal when the distal end of the actuator 46A is disposed below the tops of the ribs 4B.

The actuator 46A can pivot from the state where the distal end is positioned above the tops of the ribs 4B to the state where the distal end is positioned below the tops of the ribs 4B when a downstream edge of the label 10A advances between the rotating bodies 4A and the ribs 4B of the straightening member 4 along the third conveying path R3. Additionally, the actuator 46A can pivot from the state where the distal end is positioned below the tops of the ribs 4B to the state where the distal end is positioned above the tops of the ribs 4B when an upstream edge of the label 10A passes out from between the rotating bodies 4A and the ribs 4B of the straightening member 4. Hence, the CPU 91A can detect when both the downstream edge and the upstream edge of the label 10A on the third conveying path R3 is at the position of the straightening member 4 based on the output signals from the label detection sensor 46. Note that a reflective optical sensor, for example, may be used as the label detection sensor 46 in place of an actuator-type sensor.

<Opening/Closing Member 5>

As illustrated in FIGS. 4 and 5, the opening/closing member 5 is arranged downstream of the straightening member 4 and above the third conveying path R3 (see FIG. 6). The opening/closing member 5 includes a base part 51, rotating bodies 52, and ribs 53.

Figure 15:
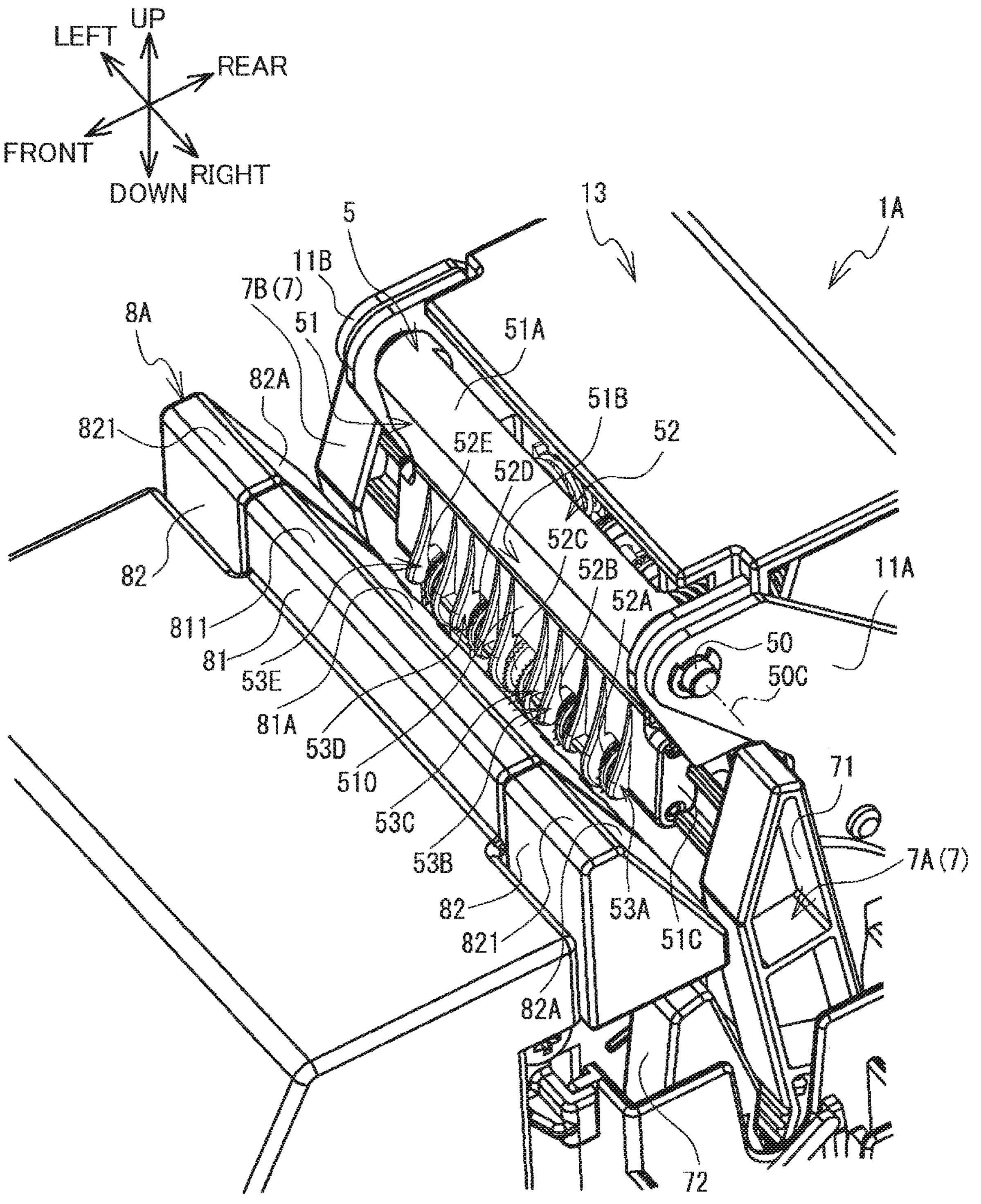
FIG. 15 is a perspective view of an area near an opening/closing member 5 (first position) and a guide member 8A.
Figure 16:
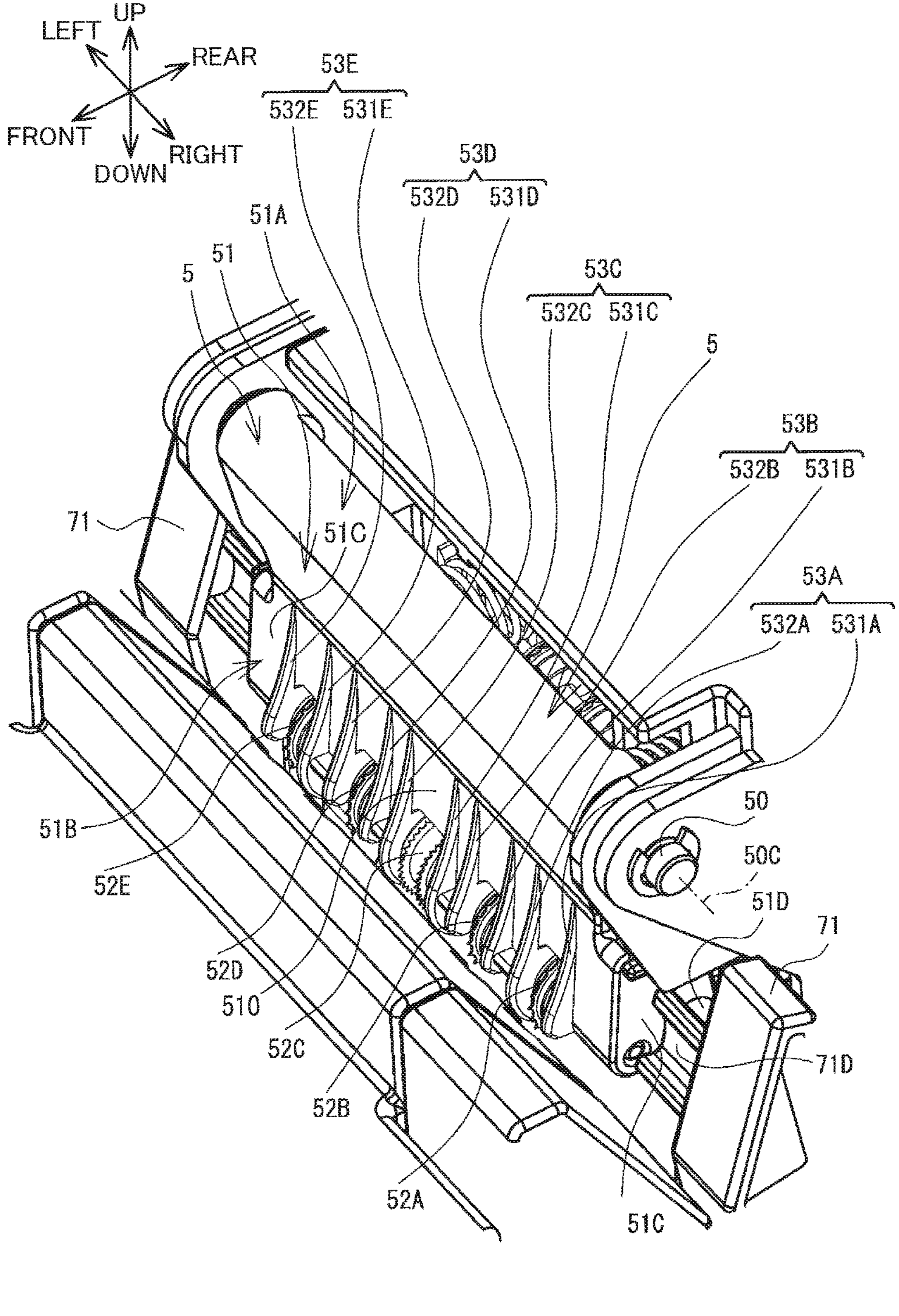
FIG. 16 is an enlarged view of a part of the area illustrated in FIG. 15.
Figure 17:
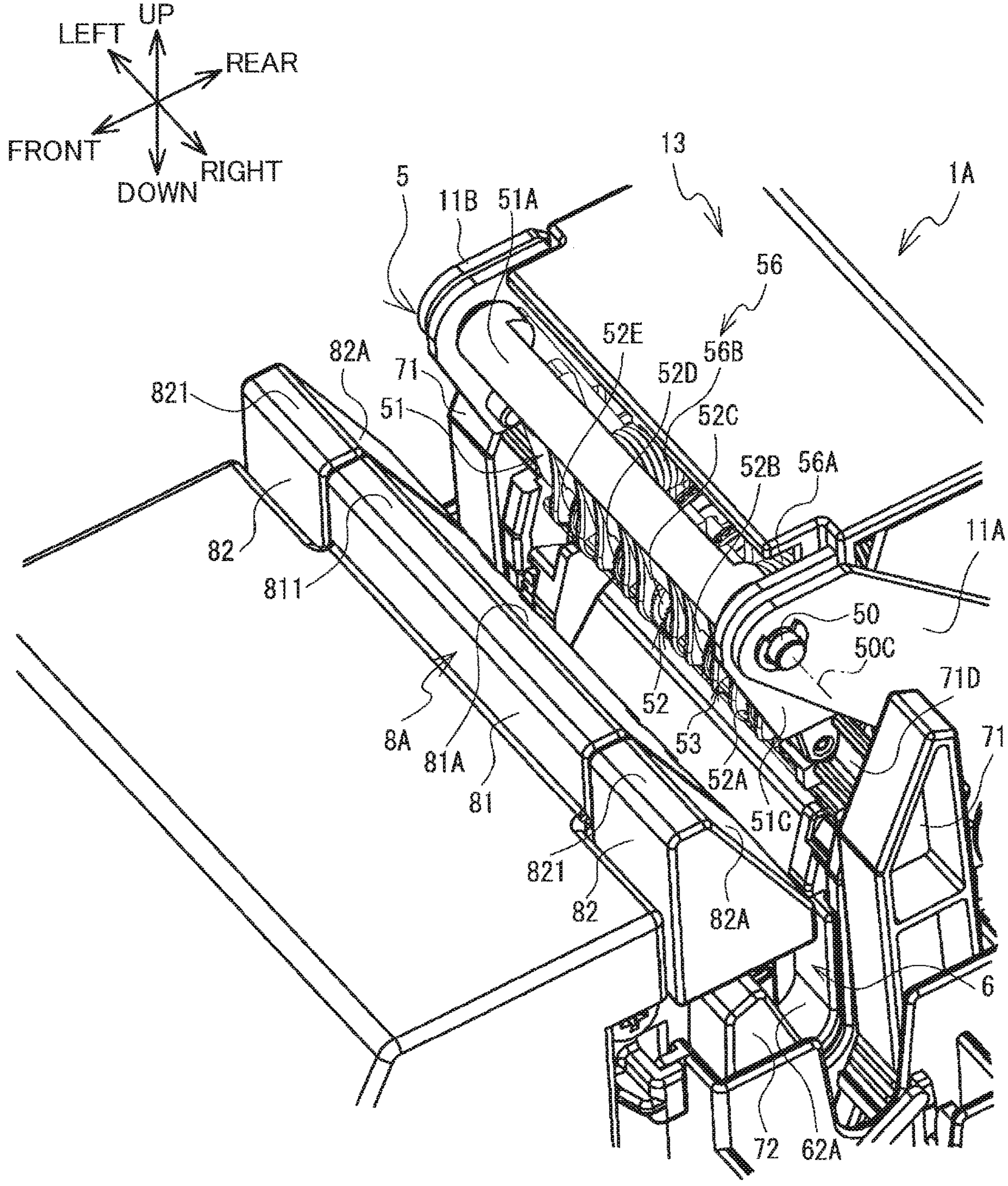
FIG. 17 is a perspective view of an area near the opening/closing member 5 (second position) and the guide member 8A.

As illustrated in FIGS. 15 through 17, the base part 51 has a cylindrical part 51A, an extension part 51B, and a pair of side plates 51C. The cylindrical part 51A is arranged around the rotating shaft 50, which spans between the side plates 11A and 11B of the frame 11, and is rotatable about the rotating shaft 50. The extension part 51B extends downward from the cylindrical part 51A. The extension part 51B has a front surface including an opening/closing surface 510 that intersects the front-rear direction. The side plates 51C are provided on both left and right ends of the extension part 51B and are orthogonal to the left-right direction.

The opening/closing member 5 is pivotably supported on the side plates 11A and 11B by the rotating shaft 50. The base part 51 can pivot about the axis 50C extending in the left-right direction (serving as the center of the rotating shaft 50) so that the bottom end of the extension part 51B is movable in the front-rear direction. The position of the opening/closing member 5 when the bottom end of the extension part 51B is moved forward will be called a first position, and the position of the opening/closing member 5 when the bottom end of the extension part 51B is moved rearward will be called a second position. Note that the cover part 13 is similarly supported on the side plates 11A and 11B so as to be pivotable by the rotating shaft 50. In other words, both the cover part 13 and the opening/closing member 5 are pivotable about the shared axis 50C.

The rotating bodies 52 include rotating bodies 52A, 52B, 52C, 52D, and 52B arranged in the left-right direction. The rotating bodies 52A-52E are disc-shaped and have uneven circumferential edges. Portions of the respective rotating bodies 52A-52E protrude outward from the extension part 51B, the portion being on the bottom and front forward of the approximate front-rear center of each rotating body 52.

Holes are formed in centers of the respective rotating bodies 52. A rotational shaft 520 illustrated in FIG. 10 is inserted into these holes. The rotational shaft 520 is rod-shaped and extends in the left-right direction. Both left and right ends of the rotational shaft 520 are supported by the side plates 51C of the base part 51. The rotating bodies 52 are rotatably supported in the base part 51 by the rotational shaft 520.

Figure 18:
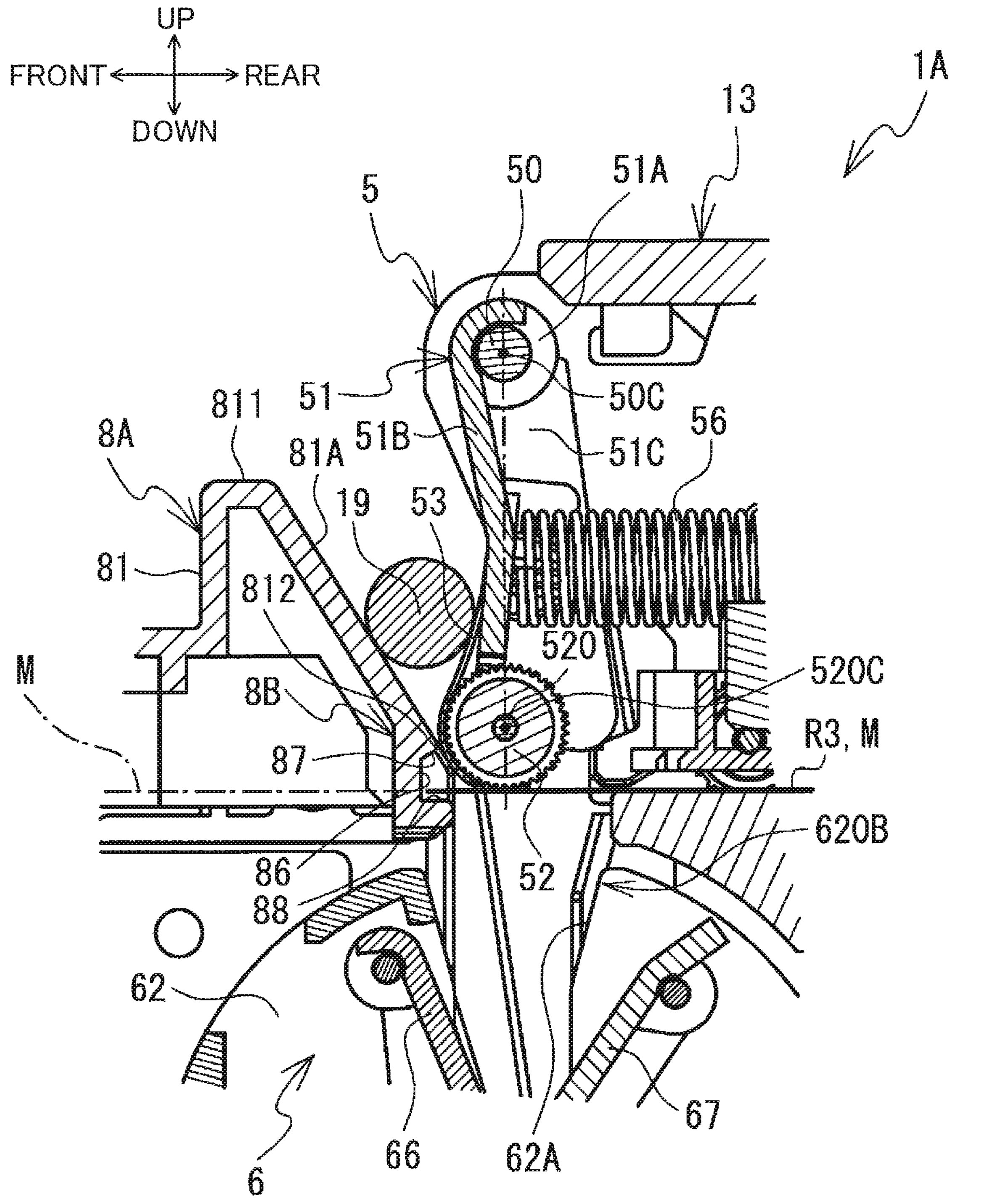
FIG. 18 is a cross-sectional view of an area in the vicinity of the opening/closing member 5 (first position), the guide member 8A, and a restriction part 8B.

As illustrated in FIG. 6, the rotational shaft 520 defines an axis 520C extending in the left-right direction and serving as a center of the rotational shaft 520. The rotating bodies 52 are respectively rotatable about the axis 520C. The axis 520C is positioned above and in proximity to the third conveying path R3 (see FIGS. 6 and 12). Further, when the opening/closing member 5 is in the first position (see FIG. 12), the bottoms of the rotating bodies 52 border the datum plane M from above. As illustrated in FIG. 18, the axis 50C of the rotating shaft 50 in the opening/closing member 5 and the axis 520C of the rotating bodies 52 are at substantially the same positions in the front-rear direction.

As illustrated in FIGS. 15 and 16, the ribs 53 include ribs 53A (531A, 532A), 53B (531B, 532B), 53C (531C, 532C), 53D (531D, 532D), and 53E (531E, 532E) arranged in the left-right direction. The ribs 53A-53E are all plate-shaped and orthogonal to the left-right direction. The rib 531A is poisoned rightward of and adjacent to the rotating body 52A, and the rib 532A is positioned leftward of and adjacent to the rotating body 52A. The rib 531B is positioned rightward of and adjacent to the rotating body 52B, and the rib 532B is positioned leftward of and adjacent to the rotating body 52B. The rib 531C is positioned rightward of and adjacent to the rotating body 52C, and the rib 532C is positioned leftward of and adjacent to the rotating body 52C. The rib 531D is positioned rightward of and adjacent to the rotating body 52D, and the rib 532D is positioned leftward of and adjacent to the rotating body 52D. The rib 531E is positioned rightward of and adjacent to the rotating body 52E, and the rib 532E is positioned leftward of and adjacent to the rotating body 52E. The direction in which the ribs 53 are arranged adjacent to each other is coincident with the extending direction of the axis 50C serving as the rotational center of the rotating bodies 52.

The ribs 53A-53E all have the same shape. A peripheral edge of each rib 53 extends from an upper end of the extension part 51B near the cylindrical part 51A in a direction that slopes forward relative to the opening/closing surface 510. At a lower end, each rib 53 curves and extends rearward. As illustrated in FIG. 18, the ribs 53 are arranged forward of a datum plane passing through the axis 50C of the rotating shaft 50 in the opening/closing member 5 and the axis 520C of the rotating bodies 52.

When the opening/closing member 5 is disposed in the first position, as illustrated in FIG. 15, the ribs 53 cover portions of the corresponding rotating bodies 52 from both left and right sides thereof, the portions protruding forward from the extension part 51B. In other words, the ribs 53 protrude farther outward than the portions of the rotating bodies 52 protruding forward from the extension part 51B, and more specifically, protrude farther outward than radial edges of the rotating bodies 52 in an area encompassing the top edges, front edges, and lower edges of the rotating bodies 52 (see FIG. 10). Note that the bottom edges of the ribs 53 are positioned slightly higher than the bottom edges of the rotating bodies 52 (see FIG. 12). In other words, the bottom edges of the rotating bodies 52 protrude lower than the bottom edges of the ribs 53.

As illustrated in FIGS. 4 and 5, urging parts 56 are provided on the rear side of the base part 51 in the opening/closing member 5. As illustrated in FIG. 10, the urging parts 56 include urging parts 56A and 56B aligned in the left-right direction. The urging parts 56A and 56B are compression coil springs and are interposed between the rear surface on the base part 51 of the opening/closing member 5 and the cover part 13. The urging parts 56A and 56B exert a forward urging force on the opening/closing member 5. Through the urging parts 56, the opening/closing member 5 is urged from the second position (see FIG. 17) toward the first position (see FIG. 15).

After curl in the label 10A has been corrected by the straightening member 4, the label 10A is further conveyed by the conveying rollers 32 to pass under the opening/closing member 5. At this time, the rotating bodies 52 of the opening/closing member 5 contact the label 10A from above as the label 10A is conveyed along the third conveying path R3. In this way, the opening/closing member 5 corrects curvature in the label 10A, which has a tendency to curl upward, while moving the label 10A along the third conveying path R3.

<Guide Member 8A>

As illustrated in FIG. 1, the guide member 8A is disposed downstream of the opening/closing member 5 and above the datum plane M (see FIG. 12). As illustrated in FIG. 1, the guide member 8A includes a first part 81 adjacent to the opening/closing member 5 on the downstream side, and a pair of second parts 82 disposed respectively on left and right sides of the first part 81. The first part 81 has a length in the left-right direction approximately equivalent to a length of the opening/closing member 5 in the left-right direction.

As illustrated in FIGS. 15 and 17, the first part 81 has a rear portion having a sloped surface 81A thereon. Each of the second parts 82 has a rear portion having a sloped surface 82A thereon. The sloped surfaces 81A and 82A slope downward from respective front edges toward respective rear edges thereof. The front edges of the sloped surfaces 81A and 82A are top edges 811 and 821 located at the highest points on the sloped surfaces 81A and 82A, respectively. The top edges 811 and 821 are at a lower vertical position than the rotating shaft 50 that rotatably supports the opening/closing member 5. As illustrated in FIG. 18, the rear edge of the sloped surface 81A formed on the first part 81 constitutes a bottom edge 812. The bottom edge 812 is located at the lowest point on the sloped surface 81A and positioned in proximity to the third conveying path R3.

The bottom end of the opening/closing member 5 is adjacent to the bottom edge 812 of the guide member 8A when the opening/closing member 5 is in the first position (see FIG. 14). At this time, the ribs 53 contact the bottom edge 812 of the guide member 8A. However, when the opening/closing member 5 is in the second position (see FIG. 19), the bottom end of the opening/closing member 5 is separated rearward from the bottom edge 812 of the guide member 8A.

A cable 19 about which the label 10A is to be wrapped is mounted into the label wrapping device 1A from above the guide member 8A while being extended in the left-right direction. At this time, the cable 19 is guided diagonally downward and rearward along the sloped surfaces 81A and 82A of the guide member 8A, as illustrated in FIG. 18, and continues to be guided toward an insertion recess 62A of the wrapping mechanism 6 described later (see FIG. 23).

Figure 19:
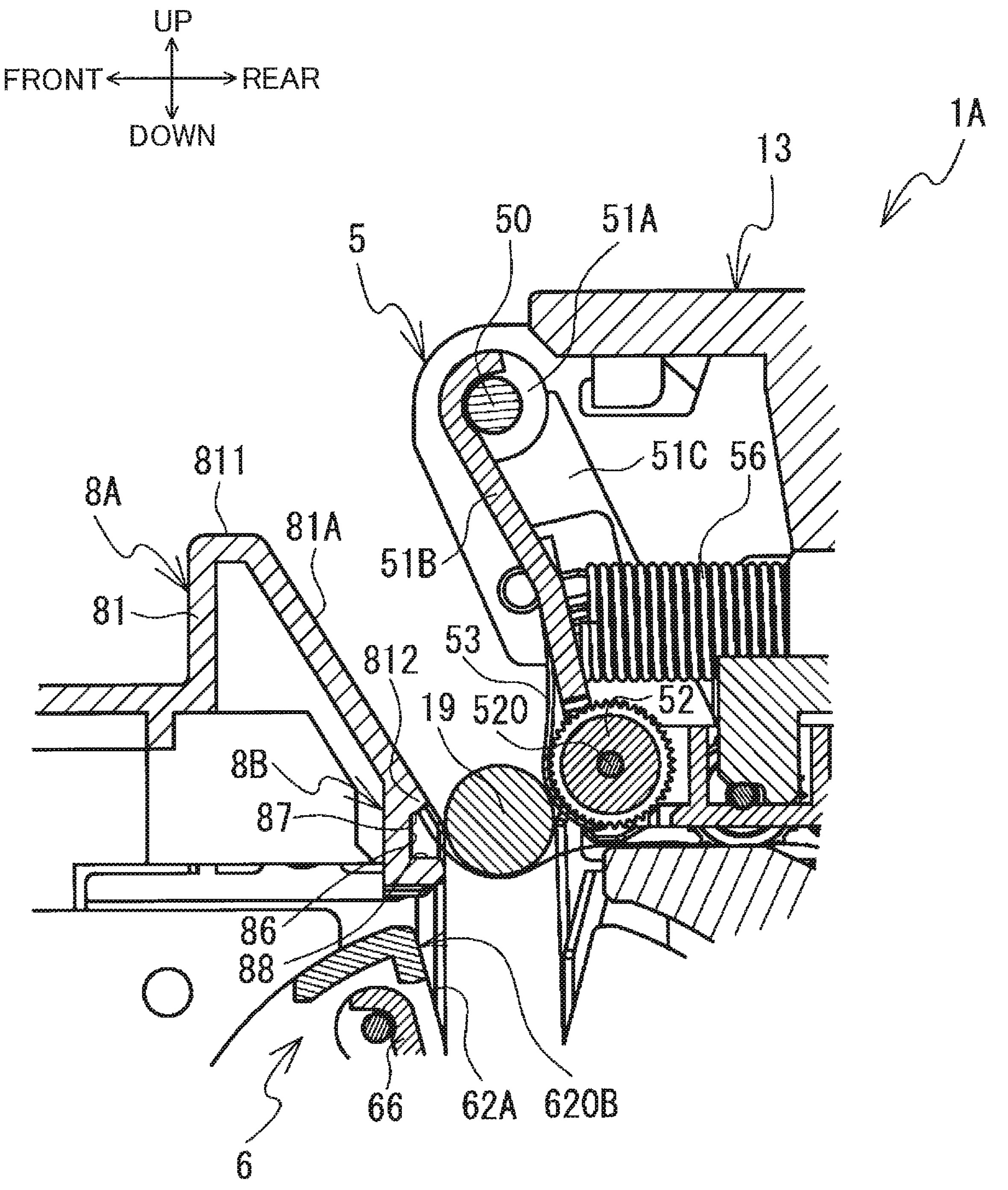
FIG. 19 is a cross-sectional view of an area in the vicinity of the opening/closing member 5 (second position), the guide member 8A, and the restriction part 8B.

Note that, relative to a moving direction of the cable 19 guided by the guide member 8A (diagonally downward and rearward), the edges of the ribs 53 facing a direction opposite the moving direction of the cable 19 (diagonally upward and forward) protrude farther outward than the radial edges of the rotating bodies 52 when the opening/closing member 5 is in the first position. Therefore, the cable 19 contacts the ribs 53 of the opening/closing member 5 while being guided by the guide member 8A toward the insertion recess 62A of the wrapping mechanism 6. The cable 19 exerts an external force on the bottom end of the opening/closing member 5 from above. At this time, the bottom end of the opening/closing member 5 moves rearward against the urging force of the urging parts 56, moving the opening/closing member 5 from the first position to the second position, as illustrated in FIG. 19. As a result, an opening 620B of the wrapping mechanism 6 described later is switched from a closed state closed by the opening/closing member 5 (see FIG. 18) to an open state (see FIG. 19).

<Restriction Part 8B>

As illustrated in FIGS. 18 and 19, the restriction part 8B is formed below the bottom edge 812 of the first part 81 of the guide member 8A. The restriction part 8B has a recess 85 that is recessed forward. The recess 85 extends linearly in the left-right direction. The recess 85 has restriction walls 86, 87, and 88 configuring inner walls of the recess 85.

The restriction wall 86 corresponds to a bottom wall in the recess 85 and is orthogonal to the front-rear direction. The restriction wall 86 is positioned on the downstream side of the downstream end of the third conveying path R3 and intersects the datum plane M. The restriction wall 87 is a portion constituting one of side walls of the recess 85 that extends from the top edge of the restriction wall 86. The restriction wall 87 intersects the vertical direction and extends diagonally upward and rearward from the top edge of the restriction wall 86 toward the bottom edge 812 of the guide member 8A. The restriction wall 87 is arranged above the third conveying path R3 and the datum plane M. The restriction wall 88 is a portion constituting another side wall of the recess 85 that extends from the bottom edge of restriction wall 86. The restriction wall 88 is orthogonal to the vertical direction and extends horizontally rearward from the bottom edge of the restriction wall 86. The restriction wall 88 is arranged below the third conveying path R3 and the datum plane M.

As illustrated in FIG. 18, the label 10A conveyed by the conveying rollers 32 passes the opening/closing member 5 and is further conveyed until the downstream edge contacts the restriction part 8B. The downstream edge of the label 10A contacts the restriction wall 86, whereby the restriction part 8B restricts the label 10A from being conveyed further downstream.

As the cable 19 is guided downward toward the wrapping mechanism 6 by the guide member 8A, the cable 19 contacts the label 10A from above, as illustrated in FIG. 19. A portion of the cable 19 adheres to the adhesive surface on the top surface of the label 10A. In response to this downward movement of the cable 19, the downstream edge of the label 10A may attempt to move vertically. However, the restriction wall 87 of the restriction part 8B restricts the downstream edge of the label 10A from moving above the third conveying path R3. Further, the restriction wall 88 of the restriction part 8B restricts the downstream edge of the label 10A from moving below the third conveying path R3.

<Wrapping Mechanism 6>

As illustrated in FIG. 4, the wrapping mechanism 6 includes a substantially cylindrical base part 61 whose peripheral side surfaces are partially omitted. The base part 61 is rotatably supported by the frame 11 so as to be rotatable about a prescribed axis 6A serving as a center of the base part 61. The axis 6A extends in the left-right direction.

Figure 20:
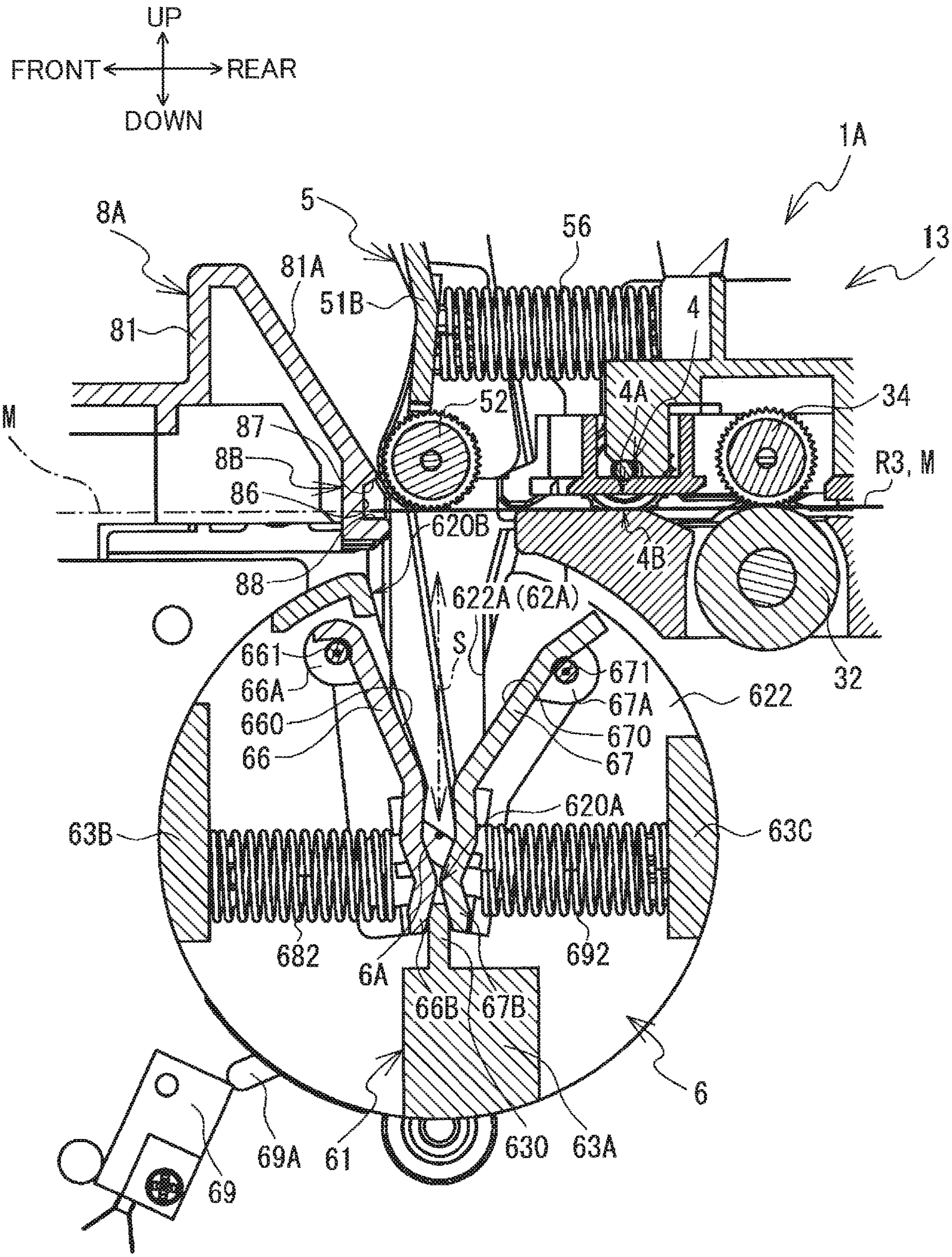
FIG. 20 is a cross-sectional view of a section near a wrapping mechanism 6 taken along the line IV-IV in FIG. 1 as viewed in the direction of the corresponding arrows.
Figure 21:
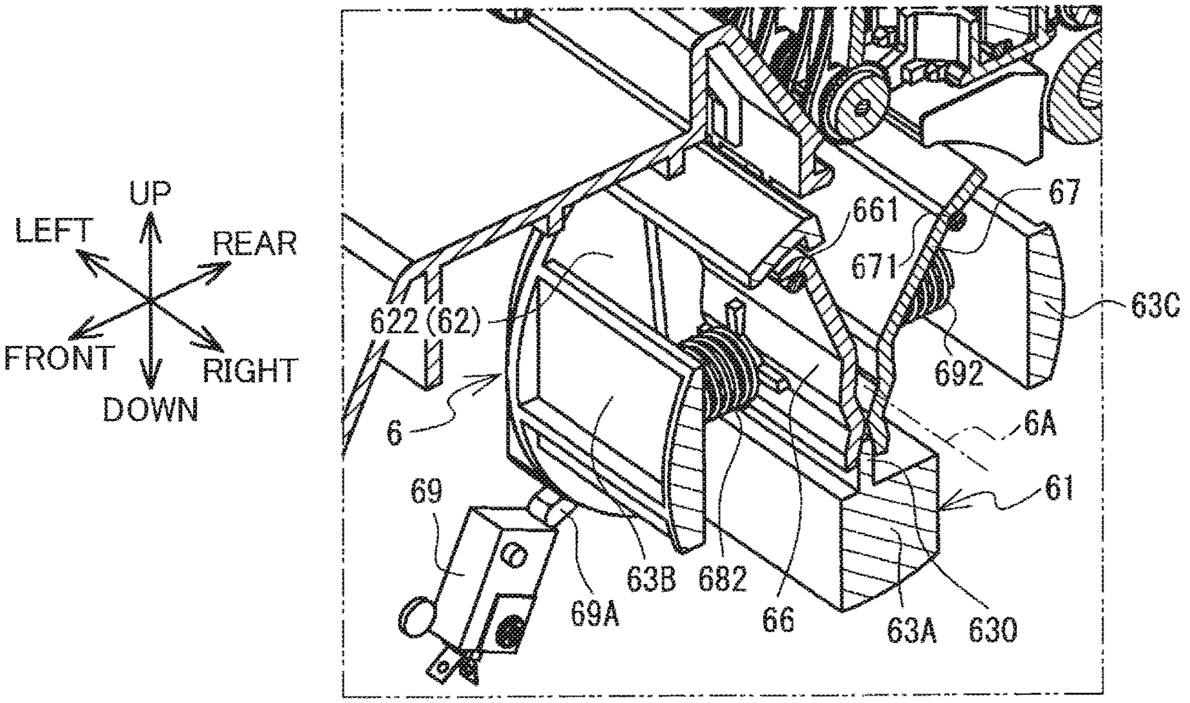
FIG. 21 shows perspective views of the area near the wrapping mechanism 6 that includes the cross section of the label wrapping device 1A taken along the line IV-IV in FIG. 1.
Figure 21:
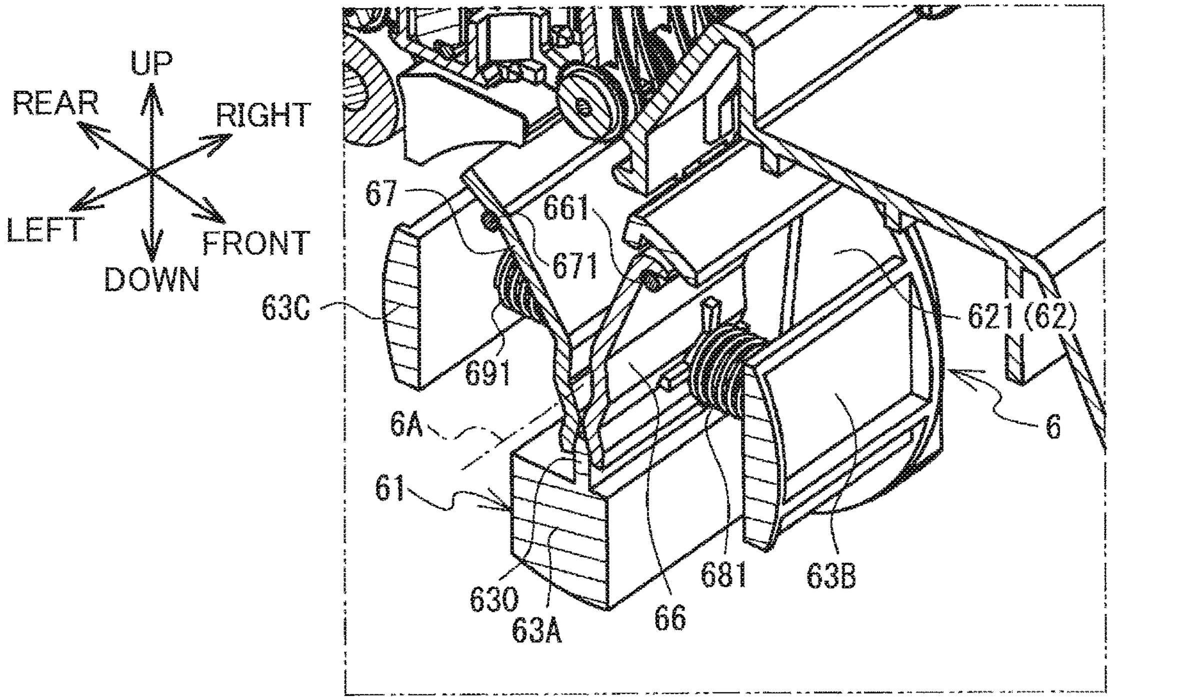

As illustrated in FIGS. 20 and 21, the base part 61 includes a first bottom wall part 621 provided on the right end (see FIG. 21), a second bottom wall part 622 provided on the left end, and side wall parts 63A, 63B, and 63C. The first bottom wall part 621 and second bottom wall part 622 are both disc-shaped and are separated but oppose each other in the left-right direction. Hereinafter, the first bottom wall part 621 and second bottom wall part 622 will be collectively referred to as a bottom wall part 62.

As illustrated in FIG. 20, a second insertion recess 622A is formed in the second bottom wall part 622. The second insertion recess 622A is recessed toward the axis 6A from the peripheral edge of the second bottom wall part 622. While not illustrated in the drawing, a first insertion recess having a similar shape to the second insertion recess 622A is formed in the first bottom wall part 621. Hereinafter, the first insertion recess and the second insertion recess 622A will be collectively called the insertion recess 62A.

Figure 22:
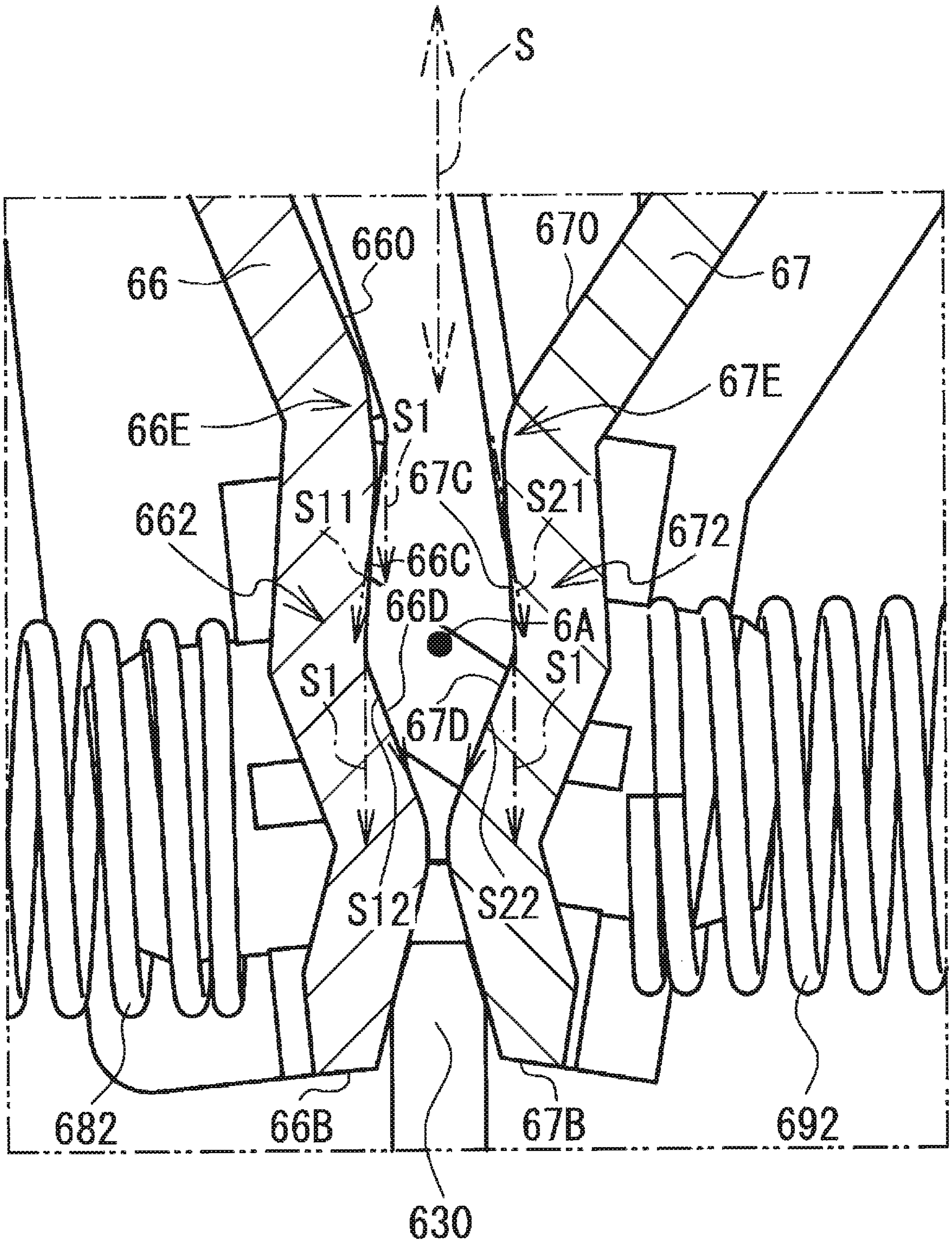
FIG. 22 is an enlarged view of a part of the section illustrated in FIG. 20.

More specifically, the insertion recess 62A has a general U-shape and extends in a prescribed radial direction (upward) from a position in the bottom wall part 62 a prescribed distance below the axis 6A (hereinafter called a bottom part 620A) to the opening 620B corresponding to a peripheral portion of the bottom wall part 62. Below, the direction in which the insertion recess 62A extends will be called an extension direction S. The direction from the opening 620B toward the bottom part 620A that corresponds to the extension direction S will be called an insertion direction S1, as indicated in FIG. 22.

Figure 23:
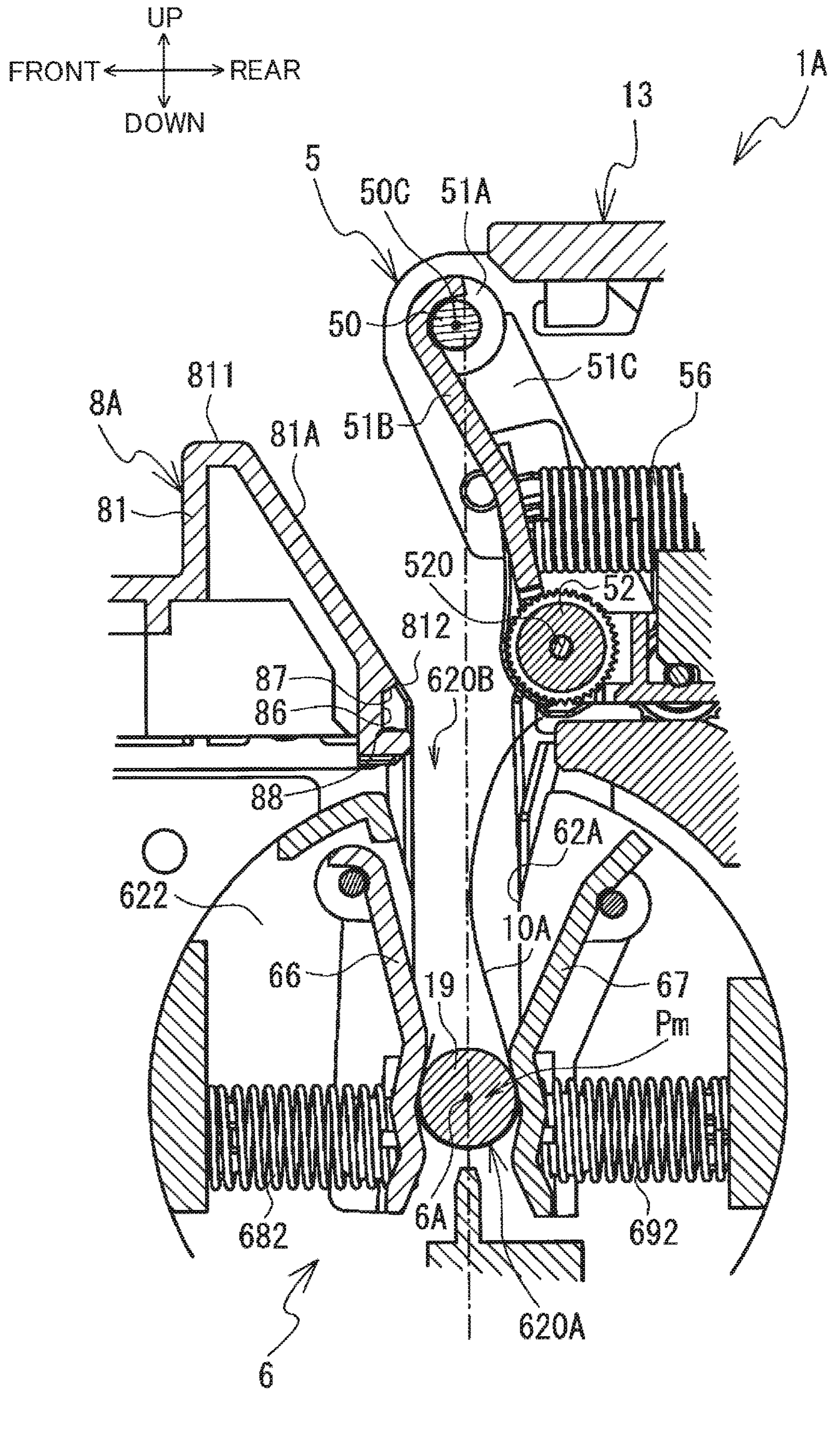
FIG. 23 is a cross-sectional view of an area near the opening/closing member 5 (second position), guide member 8A, restriction part 8B, and wrapping mechanism 6.

As illustrated in FIG. 23, the cable 19 and the label 10A can be inserted into the insertion recess 62A when the wrapping mechanism 6 is oriented with the opening 620B positioned above the bottom part 620A, i.e., with the extension direction S aligned vertically. Hereinafter, the rotated position of the wrapping mechanism 6 at which the cable 19 is insertable, i.e., the rotated position of the wrapping mechanism 6 at which the opening 620B is disposed above the bottom part 620A, will be called an initial position. Unless specifically indicated otherwise, the following description will assume that the wrapping mechanism 6 is disposed in the initial position. While the wrapping mechanism 6 is in the initial position, the conveying direction of the label 10A is orthogonal to both the axis 6A and the extension direction S.

As illustrated in FIG. 20, the insertion recess 62A is disposed downstream of the conveying rollers 32 and the straightening member 4 and below the third conveying path R3. The insertion recess 62A opens toward the third conveying path R3. The insertion recess 62A is disposed upstream of the restriction part 8B (the restriction walls 86, 87, and 88). As illustrated in FIG. 23, the insertion recess 62A and opening 620B vertically overlap the axis 50C, which corresponds to the pivoting center of the opening/closing member 5. The axis 6A, which corresponds to the rotational center of the base part 61, is positioned slightly rearward relative to the axis 50C.

As illustrated in FIG. 20, the insertion recess 62A and opening 620B are closed by the opening/closing member 5 when the opening/closing member 5 is in the first position. As illustrated in FIG. 23, the insertion recess 62A and opening 620B are open and not closed by the opening/closing member 5 when the opening/closing member 5 is in the second position.

As illustrated in FIGS. 20 and 21, the wrapping mechanism 6 includes a first arm member 66, a second arm member 67, first springs 681 and 682 (see FIG. 21), and second springs 691 and 692 (see FIG. 21) disposed inside the base part 61. The first arm member 66 and second arm member 67 hold the cable 19 from opposite sides thereof when the wrapping mechanism 6 wraps the label 10A around the cable 19 (see FIG. 23). The first springs 681 and 682 and the second springs 691 and 692 urge the first arm member 66 and second arm member 67 in order to hold the cable 19 (see FIG. 23).

As illustrated in FIG. 20, the first arm member 66 and the second arm member 67 have bent plate shapes that extend in the left-right direction between the first bottom wall part 621 and the second bottom wall part 622. The first arm member 66 is disposed downstream of the second arm member 67. The first arm member 66 and the second arm member 67 oppose each other in the front-rear direction. Hereinafter, a part of the first arm member 66 on the side opposing the second arm member 67, i.e., a rear end part of the first arm member 66, will be called a first opposing part 660. A part of the second arm member 67 on the side opposing the first arm member 66, i.e., a front end part of the second arm member 67, will be called a second opposing part 670.

Figure 24:
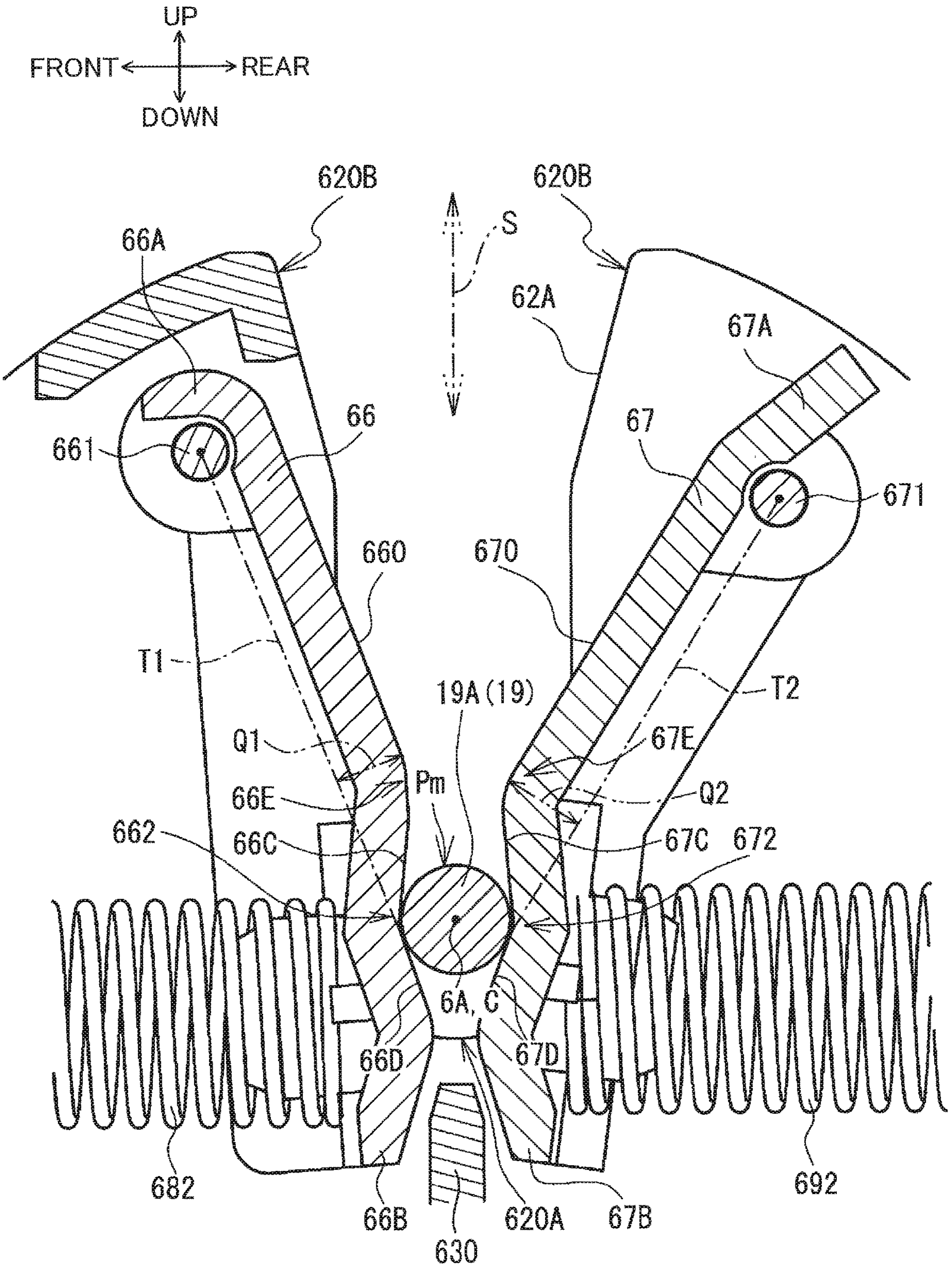
FIG. 24 is an enlarged view of a first arm member 66 and a second arm member 67 depicted in FIG. 20 (with a cable 19A interposed therebetween)

As illustrated in FIG. 24, the first arm member 66 has a first proximal part 66A, a first distal part 66B, a first sloped part 66C, a second sloped part 66D, and a first protruding part 66E.

The first proximal part 66A is pivotably supported about a rotational shaft 661 that spans between the first bottom wall part 621 and the second bottom wall part 622 (see FIG. 21). The first bottom wall part 621 and the second bottom wall part 622 support the rotational shaft 661 near the downstream side of the opening 620B formed in the insertion recess 62A. Accordingly, the first proximal part 66A is also disposed near the downstream side of the opening 620B. A distance in the extension direction S between the opening 620B and the first proximal part 66A is shorter than a distance in the extension direction S between the bottom part 620A and the first proximal part 66A. The first distal part 66B is disposed opposite the opening 620B with respect to the bottom part 620A in the insertion recess 62A in the extension direction S, i.e., below the bottom part 620A.

The first sloped part 66C and the second sloped part 66D correspond to a portion of the first opposing part 660 between the first proximal part 66A and the first distal part 66B. Both the first sloped part 66C and the second sloped part 66D are sloped relative to the insertion direction 81. This is described next in greater detail.

As illustrated in FIG. 22, a portion of the first sloped part 66C is arranged on the opening 620B side (see FIG. 20) of the axis 6A in the extension direction S. The first sloped part 66C slopes in a direction S11 away from the axis 6A relative to the insertion direction S1. A portion of the second sloped part 66D is disposed on the opposite side of the axis 6A from the opening 620B in the extension direction S. The second sloped part 66D is adjacent to the first distal part 66B side of the first sloped part 66C. The second sloped part 66D slopes in a direction S12 toward the axis 6A relative to the insertion direction S1. Hereinafter, the first sloped part 66C and the second sloped part 66D will be collectively called a sloped portion 662.

As illustrated in FIG. 24, the second arm member 67 has a second proximal part 67A, a second distal part 67B, a first sloped part 67C, a second sloped part 67D, and a second protruding part 67E.

The second proximal part 67A is pivotably supported about a rotational shaft 671 that spans between the first bottom wall part 621 and the second bottom wall part 622 (see FIG. 21). The first bottom wall part 621 and the second bottom wall part 622 support the rotational shaft 671 near the upstream side of the opening 620B formed in the insertion recess 62A. Accordingly, the second proximal part 67A is also disposed near the upstream side of the opening 620B. A distance in the extension direction S from the opening 620B to the second proximal part 67A is shorter than a distance in the extension direction S from the bottom part 620A to the second proximal part 67A. The second distal part 67B is disposed opposite the opening 620B with respect to the bottom part 620A in the insertion recess 62A in the extension direction S, i.e., below the bottom part 620A. The first proximal part 66A and the second proximal part 67A are arranged on different sides of the insertion recess 62A from each other in the conveying direction.

The first sloped part 67C and the second sloped part 67D correspond to a portion of the second opposing part 670 between the second proximal part 67A and the second distal part 67B. Both the first sloped part 67C and the second sloped part 67D slope relative to the insertion direction S1. This will be described next in greater detail.

As illustrated in FIG. 22, a portion of the first sloped part 67C is disposed on the opening 620B side of the axis 6A in the extension direction S. The first sloped part 67C slopes in a direction S21 away from the axis 6A relative to the insertion direction S1. A portion of the second sloped part 67D is disposed on the opposite side of the axis 6A from the opening 620B in the extension direction S. The second sloped part 67D is adjacent to the second distal part 67B side of the first sloped part 67C. The second sloped part 67D slopes in a direction S22 toward the axis 6A relative to the insertion direction S1. Hereinafter, the first sloped part 67C and the second sloped part 67D will be collectively called a sloped part 672.

The first sloped part 66C of the first arm member 66 and the first sloped part 67C of the second arm member 67 oppose each other in the front-rear direction across the axis 6A. The second sloped part 66D of the first arm member 66 and the second sloped part 67D of the second arm member 67 oppose each other in the front-rear direction across the axis 6A.

As illustrated in FIG. 21, the first springs 681 and 682 are interposed between the side wall part 63B of the base part 61 and the first arm member 66. The second springs 691 and 692 are interposed between the side wall part 63C of the base part 61 and the second arm member 67. The first springs 681 and 682 are aligned in the extending direction of the axis 6A. The second springs 691 and 692 are also aligned in the extending direction of the axis 6A. The first springs 681 and 682 and the second springs 691 and 692 are compression springs with identical characteristics and have the same amount of compression.

The first springs 681 and 682 urge the first arm member 66 in a direction toward the second arm member 67. The second springs 691 and 692 urge the second arm member 67 in a direction toward the first arm member 66. The urging force exerted by the first springs 681 and 682 on the first arm member 66 matches the urging force exerted by the second springs 691 and 692 on the second arm member 67.

As illustrated in FIGS. 20 and 21, a rib 630 is provided on the side wall part 63A. The rib 630 protrudes from the side wall part 63A in a direction opposite the insertion direction S1. The rib 630 extends in the left-right direction. The rib 630 has a tapered tip end portion whose thickness decreases toward the distal edge of the rib 630. Owing to the urging force of the first springs 681 and 682, the rear surface along the bottom edge of the first arm member 66 contacts the front surface of the tapered tip end portion of the rib 630. Similarly, owing to the urging force of the second springs 691 and 692, the front surface along the bottom edge of the second arm member 67 contacts the rear surface of the tapered tip end portion of the rib 630.

As illustrated in FIG. 24, the first protruding part 66E of the first arm member 66 protrudes toward the second arm member 67. Within the first opposing part 660 of the first arm member 66, the first protruding part 66E is adjacent to the first sloped part 66C on the first proximal part 66A side. A straight line connecting an axis of the rotational shaft 661 of the first arm member 66 and a connection point between the first sloped part 66C and the second sloped part 66D is defined as a line T1. Based on this line T1, a protruding amount Q1 of the first protruding part 66E can be defined as a distance between the line T1 and the first protruding part 66E.

The second protruding part 67E of the second arm member 67 protrudes toward the first arm member 66. Within the second opposing part 670 of the second arm member 67, the second protruding part 67E is adjacent to the first sloped part 67C on the second proximal part 67A side. A straight line connecting an axis of the rotational shaft 671 of the second arm member 67 and a connection point between the first sloped part 67C and the second sloped part 67D is defined as a line 12. Based on this line T2, a protruding amount Q2 of the second protruding part 67E can be defined as a distance between the line 12 and the second protruding part 67E. In this example, the protruding amount Q2 of the second protruding part 67E is greater than the protruding amount Q1 of the first protruding part 66E.

As illustrated in FIG. 23, the cable 19 guided downward by the guide member 8A enters the insertion recess 62A through the opening 620B. In conformance with the direction in which the cable 19 moves when guided along the sloped surfaces 81A and 82A of the guide member 8A, the cable 19 enters the insertion recess 62A while moving diagonally downward and rearward. Consequently, the cable 19 initially contacts the second protruding part 67E of the second arm member 67 (see FIG. 24), thereby moving the second arm member 67 rearward against the urging force of the second springs 691 and 692. Through the contact with the second protruding part 67E, the cable 19 is guided downward.

Figure 25:
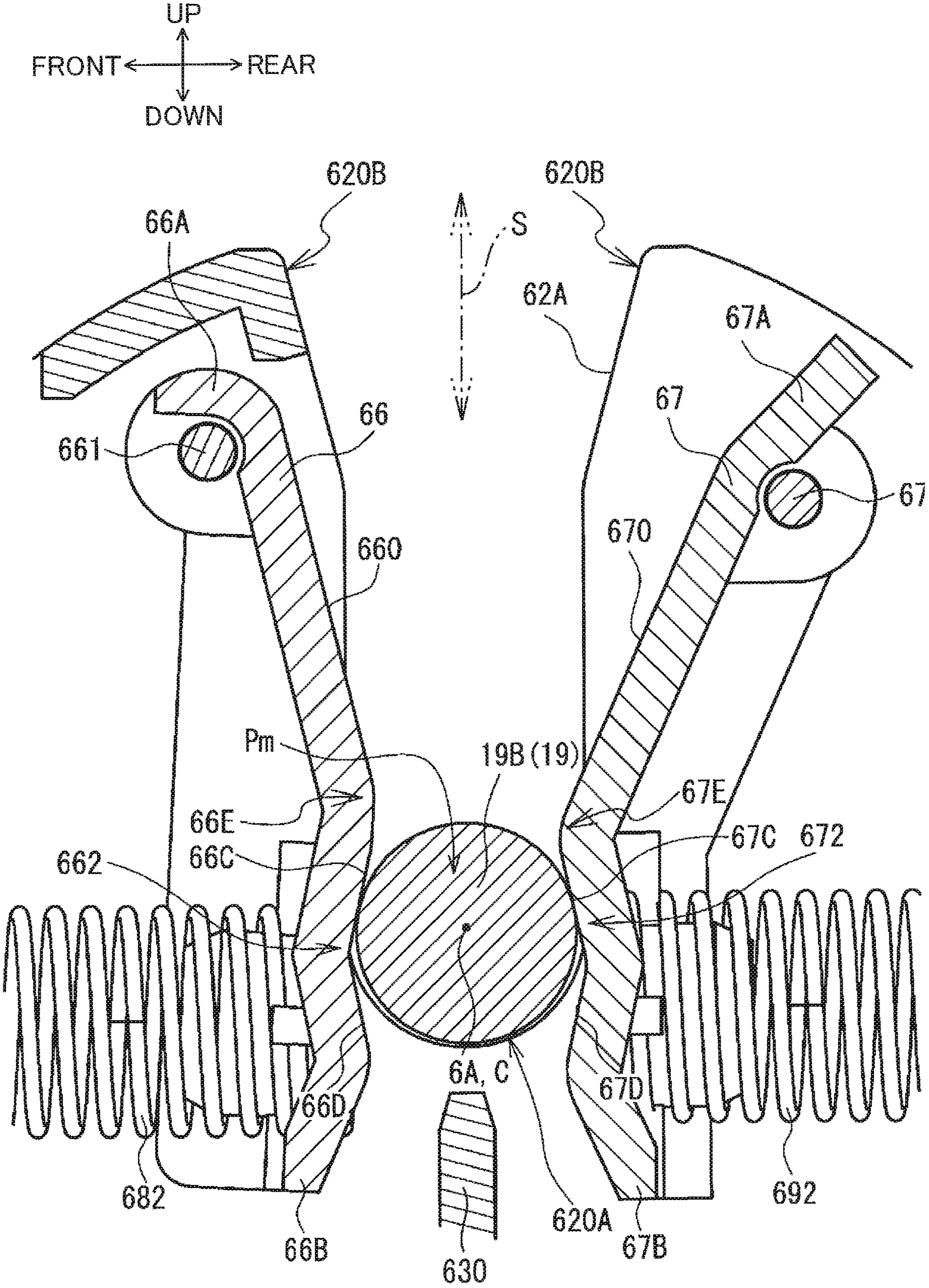
FIG. 25 is another enlarged view of the first arm member 66 and second arm member 67 depicted in FIG. 20 (with a cable 19B interposed therebetween)

Next, the cable 19 contacts the first protruding part 66E of the first arm member 66 (see FIGS. 24 and 25), moving the first arm member 66 forward against the urging force of the first springs 681 and 682, and continues to move downward. As illustrated in FIGS. 24 and 25, the cable 19 is gripped and held between the sloped portion 662 of the first arm member 66 and the sloped part 672 of the second arm member 67 from respective front and rear sides. Hereinafter, the position in which the cable 19 is held by the first arm member 66 and second arm member 67 will be called a wrapping position Pm. The longitudinal direction of the cable 19 disposed in the wrapping position Pm is aligned in the left-right direction and orthogonal to the insertion direction S1 of the cable 19.

FIG. 24 shows an example in which a cable 19A having a relatively small diameter has been inserted into the insertion recess 62A. In this case, the cable 19A is held in contact with the first sloped parts 66C and 67C and the second sloped parts 66D and 67D of the corresponding first arm member 66 and second arm member 67. While the cable 19A is held by the first arm member 66 and the second arm member 67, the axis 6A corresponding to the rotational center of the wrapping mechanism 6 is substantially aligned with a centerline C of the cable 19A.

On the other hand, FIG. 25 shows an example in which a cable 19B having a relatively large diameter has been inserted into the insertion recess 62A. In this case, the cable 19B is gripped and held by the first sloped parts 66C and 67C of the corresponding first arm member 66 and second arm member 67 and the bottom part 620A of the insertion recess 62A. While the cable 19B is held by the first arm member 66, second arm member 67, and bottom part 620A of the insertion recess 62A, the axis 6A corresponding to the rotational center of the wrapping mechanism 6 is substantially aligned with the centerline C of the cable 19B. In other words, the wrapping mechanism 6 can always hold a cable 19 so that the centerline C of the cable 19 corresponds approximately to the axis 6A, regardless of the diameter of the cable 19. Note that, since the label 10A is not depicted in FIG. 25, a slight gap equivalent to the thickness of the label 10A is illustrated between the cable 19B and the bottom part 620A.

Further, since the cable 19 is inserted into the insertion recess 62A together with the label 10A, the label 10A is interposed between the first arm member 66 and second arm member 67 and the cable 19 while the cable 19 is held in the wrapping position Pm, as illustrated in FIG. 24. In this state, the label 10A is wrapped around and affixed to an area on the approximate bottom half of the cable 19, i.e., the approximate lower half of the circumferential surface of the cable 19. In this state, the label wrapping device 1A drives the motor 96B (see FIG. 34) to rotate the wrapping mechanism 6. The wrapping mechanism 6 rotates on its axis 6A around the cable 19. At this time, the label 10A is guided to wrap around the cable 19 disposed in the wrapping position Pm. As a result, the label 10A is wrapped around and affixed to the cable 19.

<Wrapping Sensor 69>

As illustrated in FIG. 20, the wrapping mechanism 6 includes a protruding part 69A that protrudes outward from the second bottom wall part 622 at an area forward of the side wall part 63A constituting the base part 61. A wrapping sensor 69 is provided on the side plate 11B of the frame 11 (see FIG. 1) diagonally downward and forward of the base part 61. The wrapping sensor 69 is a contact-type position sensor capable of detecting proximity of the protruding part 69A. The wrapping sensor 69 is configured to output an OFF signal to the CPU 91A (see FIG. 34) when the protruding part 69A is separated from the wrapping sensor 69 and output an ON signal to the CPU 91A when the protruding part 69A is positioned near the wrapping sensor 69. Therefore, by accumulating the number of times the wrapping sensor 69 outputs an ON signal, the CPU 91A can detect the number of times the protruding part 69A has contacted the wrapping sensor 69 to identify the number of rotations of the wrapping mechanism 6.

Note that the wrapping mechanism 6 is in its initial position while the protruding part 69A is adjacent to the wrapping sensor 69. Accordingly, the CPU 91A can determine that the wrapping mechanism 6 is in the initial position when the wrapping sensor 69 outputs an ON signal.

<Retaining Members 7>

As illustrated in FIGS. 1 and 2, the retaining members 7 include retaining members 7A and 7B. The retaining member 7A is disposed on the right side of the wrapping mechanism 6 (see FIG. 20, etc.). Covers 117A and 118A that are coupled with the right surface of the side plate 11A cover a lower portion of the retaining member 7A from the right side. The retaining member 7B is disposed on the left side of the wrapping mechanism 6 (see FIG. 20, etc.). Covers 117B and 118B coupled to the left surface of the side plate 11B (see FIG. 2) cover a lower portion of the retaining member 7B from the left side. The structures of the retaining members 7A and 7B have left-right symmetry about a plane orthogonal to the left-right direction and passing through the left-right center of the label wrapping device 1A.

The retaining members 7A and 7B are configured to guide the cable 19 introduced into the insertion recess 62A of the wrapping mechanism 6 (see FIG. 20) downward to the wrapping position Pm (see FIG. 23) at two locations separated in the left-right direction and hold the cable 19 in the wrapping position Pm. Hereinafter, the retaining member 7A will be described in detail, while a description of the retaining member 7B will be omitted.

Figure 26:
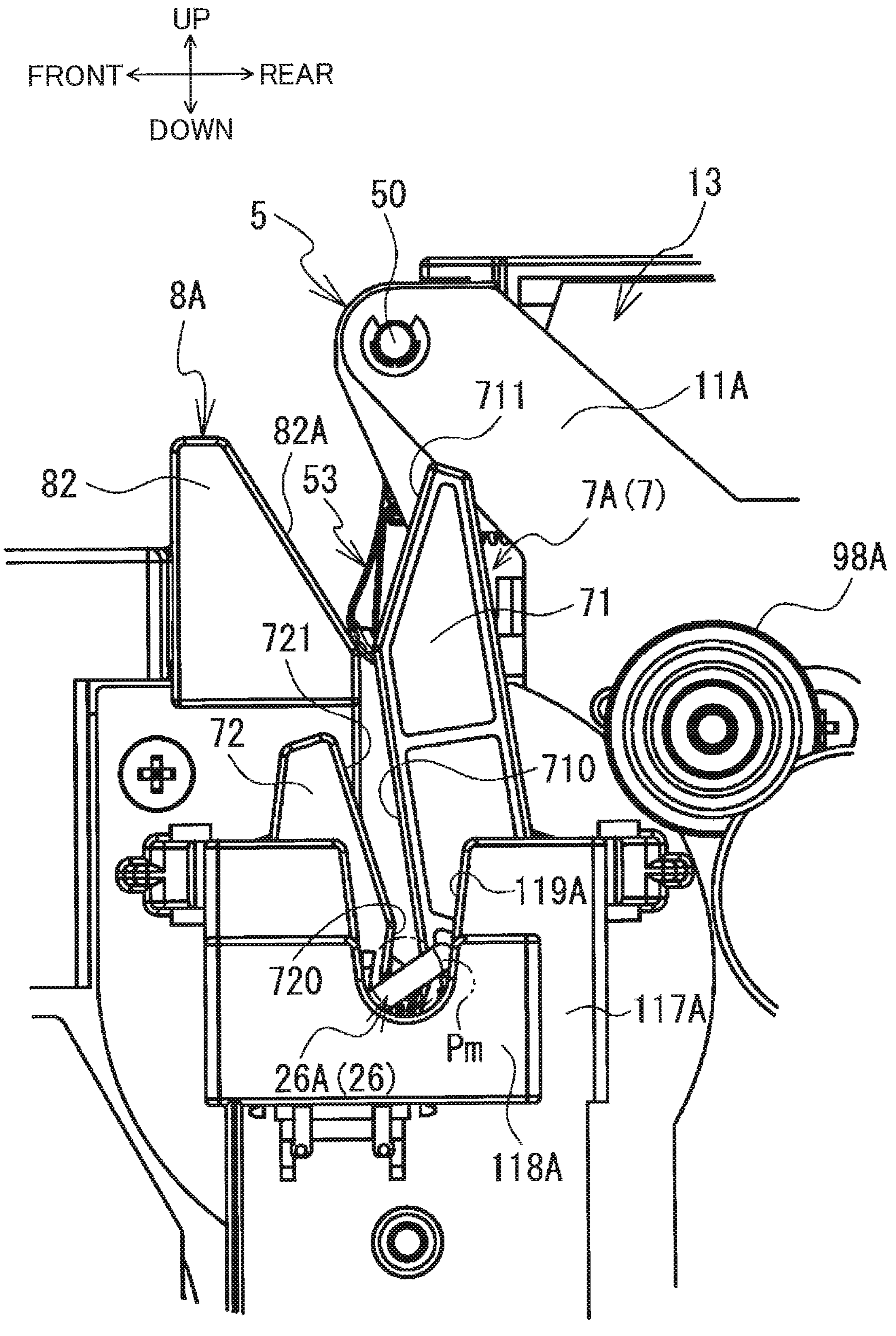
FIG. 26 is a right-side view of a retaining member 7.
Figure 27:
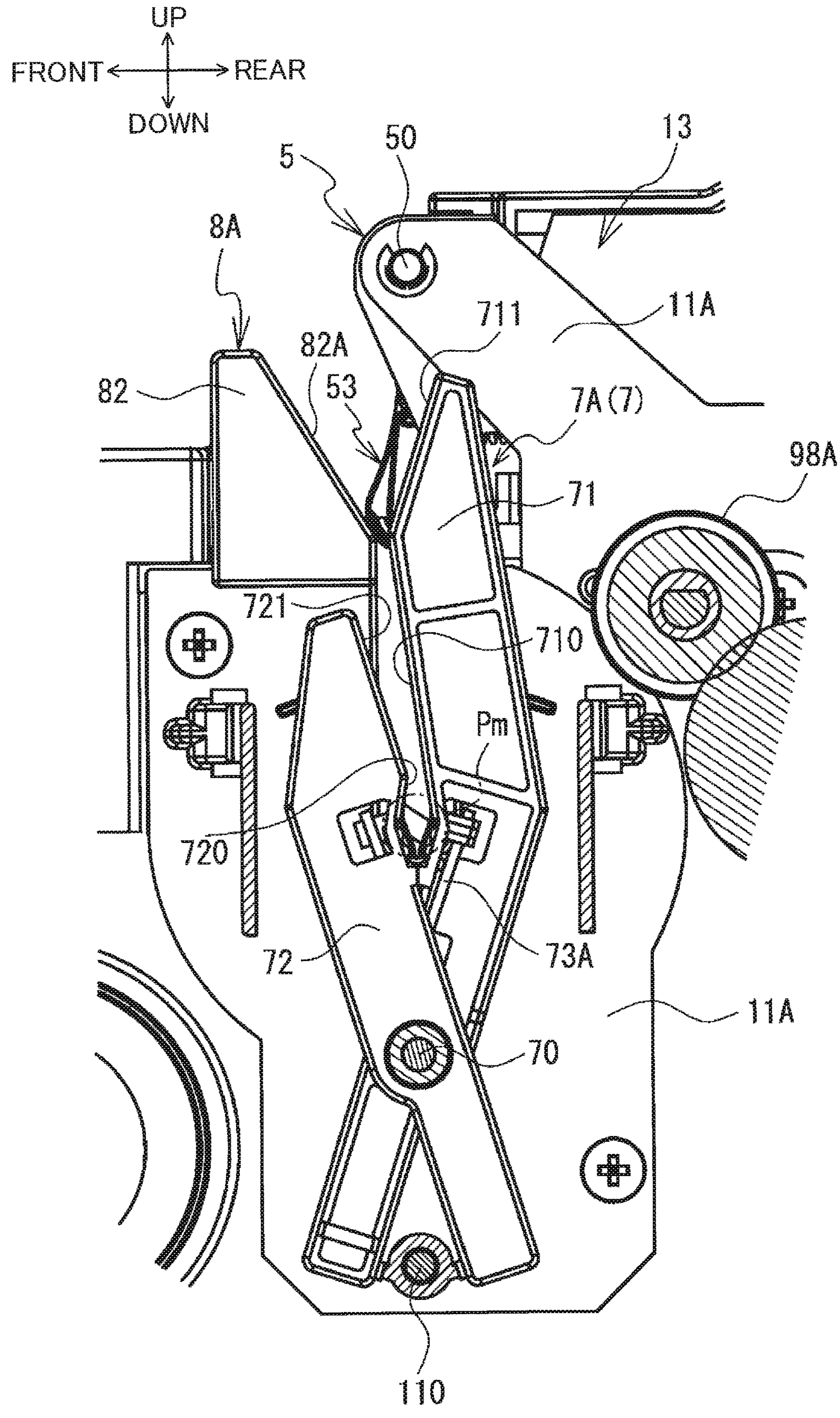
FIG. 27 is a cross-sectional view of a section taken along a line XXVII-XXVII in FIG. 1 as viewed in a direction indicated by corresponding arrows.
Figure 28:
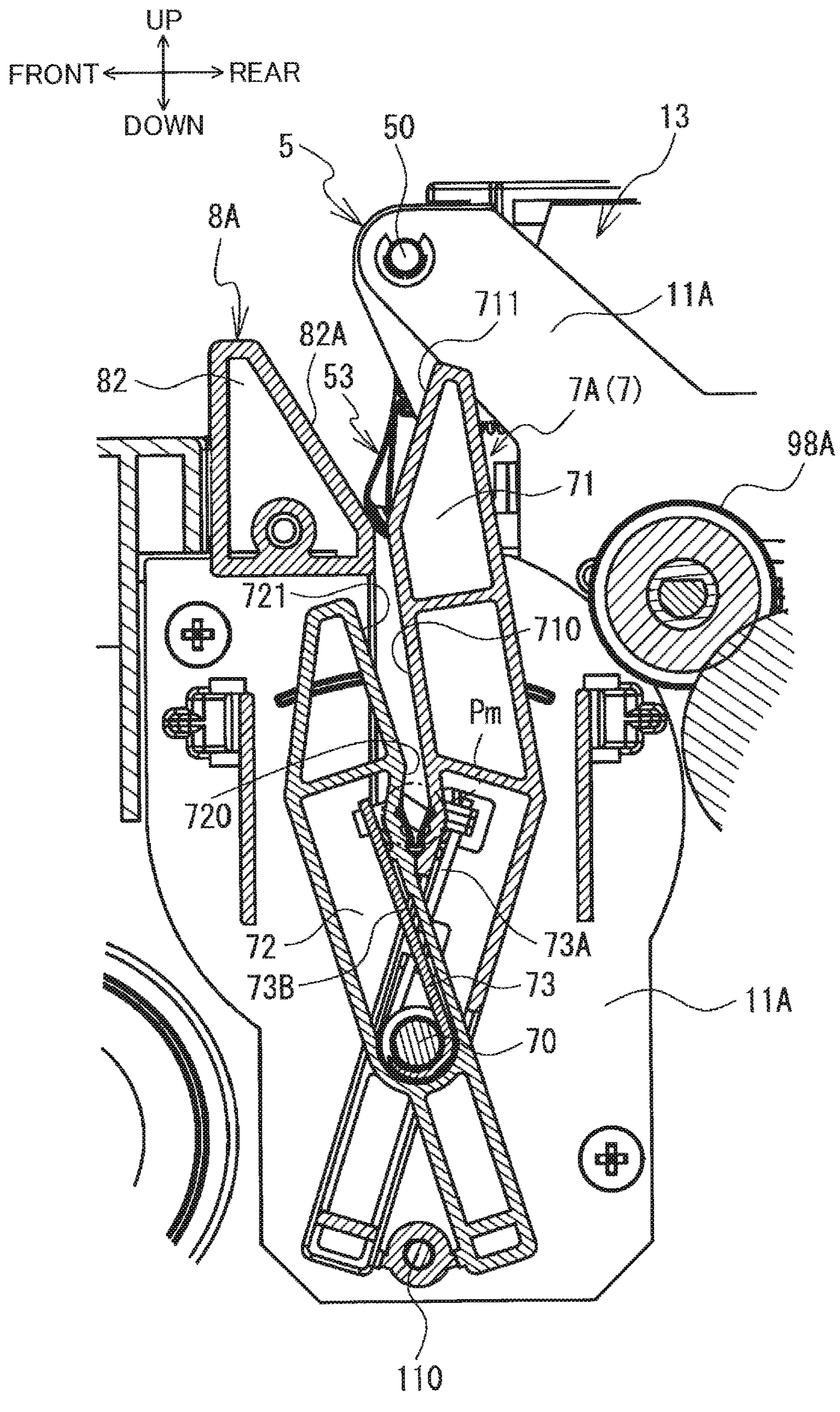
FIG. 28 is a cross-sectional view of a section taken along a line XXVIII-XXVIII in FIG. 1 as viewed in a direction indicated by corresponding arrows.

As illustrated in FIGS. 26 through 28, the retaining member 7A includes a first pinching member 71, a second pinching member 72, and an urging part 73 (see FIG. 28). As illustrated in FIGS. 27 and 28, the first pinching member 71 extends diagonally downward toward the rear from a position rearward of the right one of the second parts 82 of the guide member 8A, bends forward midway, and further extends diagonally downward toward the front. The second pinching member 72 extends diagonally downward and rearward from a position below the right one of the second parts 82 of the guide member 8A. The first pinching member 71 and second pinching member 72 intersect each other near their lower end portions. The first pinching member 71 and second pinching member 72 are both pivotably supported about a pivoting shaft 70 that extends in the left-right direction through this point of intersection. The pivoting shaft 70 is provided at the side plate 11A of the frame 11 and extends rightward therefrom. The pivoting shaft 70 is positioned below and is separated from the wrapping position Pm, which is the position of the cable 19 when the wrapping mechanism 6 wraps the label 10A around the cable 19.

A protruding part 110 is provided on the side plate 11A beneath the pivoting shaft 70. The protruding part 110 protrudes rightward from the side plate 11A. The bottom end portion of the first pinching member 71 contacts the protruding part 110 from its front side, while the bottom end portion of the second pinching member 72 contacts the protruding part 110 from its rear side. The first pinching member 71 and second pinching member 72 are maintained in positions at which their respective bottom end portions contact the protruding part 110 owing to the urging force of the urging part 73 described later.

As illustrated in FIG. 26, the cover 117A covers respective lower portions of the first pinching member 71 and second pinching member 72. The cover 117A has a recess 119A that is recessed downward from an upper edge of the cover 117A. The wrapping position Pm is located in a bottom portion of the recess 119A.

As indicated in FIGS. 27 and 28, a part of a front end of the first pinching member 71 positioned above the pivoting shaft 70 is referred to as a first opposing part 710, while a part of a rear end of the second pinching member 72 positioned above the pivoting shaft 70 is referred to as a second opposing part 720. The second opposing part 720 of the second pinching member 72 is arranged forward relative to the first opposing part 710 of the first pinching member 71. Using a gap formed between the first opposing part 710 of the first pinching member 71 and the second opposing part 720 of the second pinching member 72, the retaining member 7 (retaining member 7A) guides the cable 19 downward to the wrapping position Pm and holds the cable 19 in the wrapping position Pm.

As illustrated in FIGS. 26 through 28, the first pinching member 71 has a first sloped part 711 at an upper end of the first opposing part 710. The first sloped part 711 extends in a direction sloping relative to the vertical direction, and more specifically extends diagonally upward and rearward toward a distal end of the first pinching member 71. The first sloped part 711 is arranged rearward of the sloped surface 82A of the second part 82 on the right. A front-rear distance between the first sloped part 711 and the sloped surface 82A grows larger toward the top. That is, the first sloped part 711 slopes so that the distance in the front-rear direction between the first sloped part 711 and the sloped surface 82A increases at higher positions. Similarly, the sloped surface 82A slopes in a direction for increasing the distance between the sloped surface 82A and first sloped part 711 at higher positions.

The second pinching member 72 has a second sloped part 721 on an upper end of the second opposing part 720. The second sloped part 721 extends in a direction sloping relative to the vertical direction, and more specifically diagonally upward and forward toward a distal end of the second pinching member 72. In other words, the second sloped part 721 slopes in a direction separating away from the first pinching member 71 toward the top. Conversely, the first sloped part 711 slopes in a direction separating away from the second pinching member 72 toward the top.

The second sloped part 721 is positioned lower than the first sloped part 711 of the first pinching member 71 and higher than the wrapping position Pm. That is, a vertical distance between the first sloped part 711 and the wrapping position Pm is greater than a vertical distance between the second sloped part 721 and the wrapping position Pm.

As illustrated in FIG. 28, the urging part 73 is a torsion spring wound around the pivoting shaft 70. One end 73A of the urging part 73 is connected to the inside of the first pinching member 71, while the other end 73B of the urging part 73 is connected to the inside of the second pinching member 72. The urging part 73 urges the first pinching member 71 in a counterclockwise direction and urges the second pinching member 72 in a clockwise direction. Accordingly, the urging part 73 urges the first pinching member 71 and second pinching member 72 in directions for moving the first opposing part 710 and second opposing part 720 toward each other. Through the urging force of the urging part 73, the bottom and portions of the first pinching member 71 and second pinching member 72 are maintained in positions (hereinafter called their original positions) at which both bottom end portions are in contact with the protruding part 110.

Figure 29:
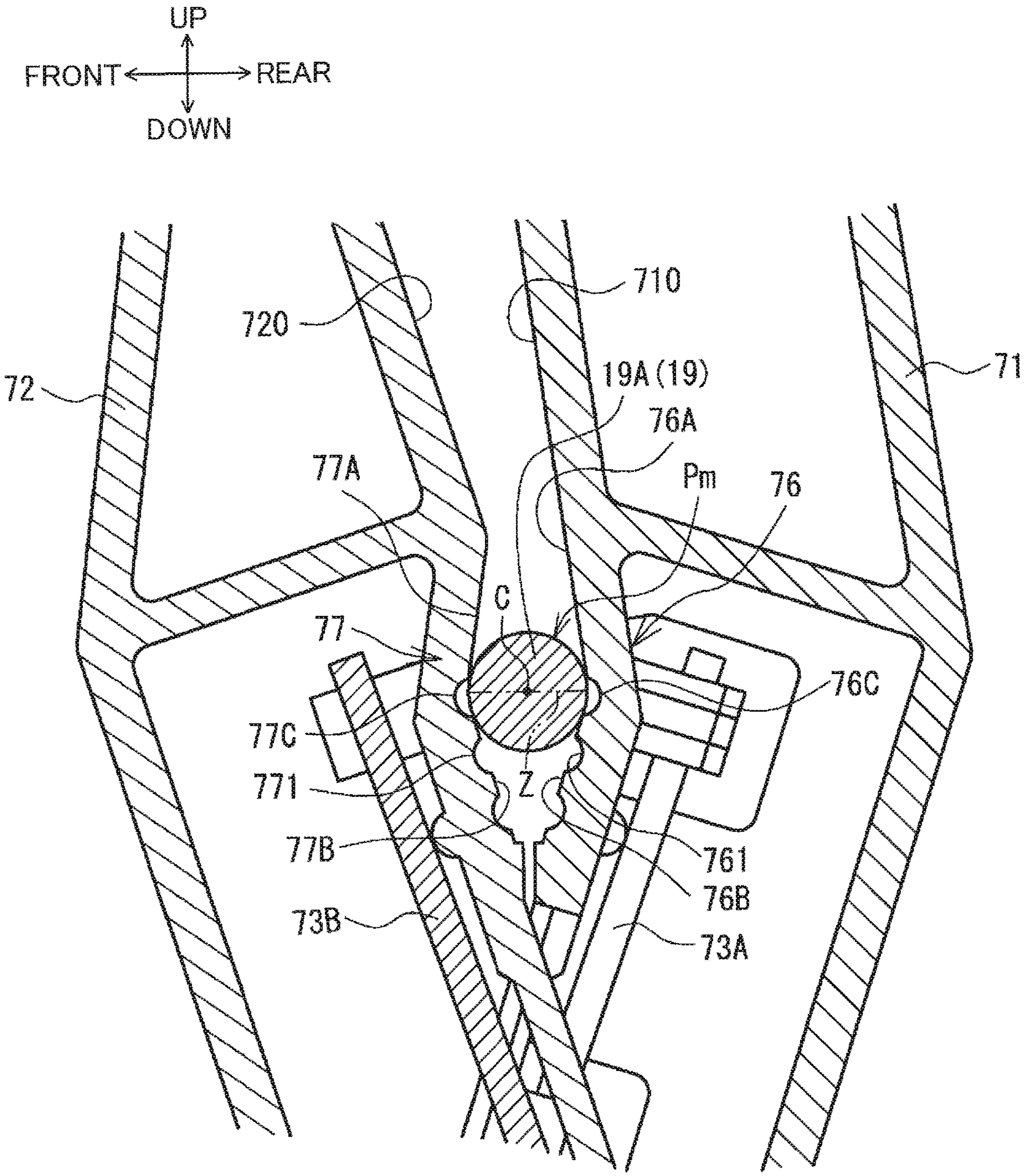
FIG. 29 illustrates a state where the cable 19A is held by a first pinching member 71 and a second pinching member 72 in the cross-sectional view of FIG. 28.
Figure 30:
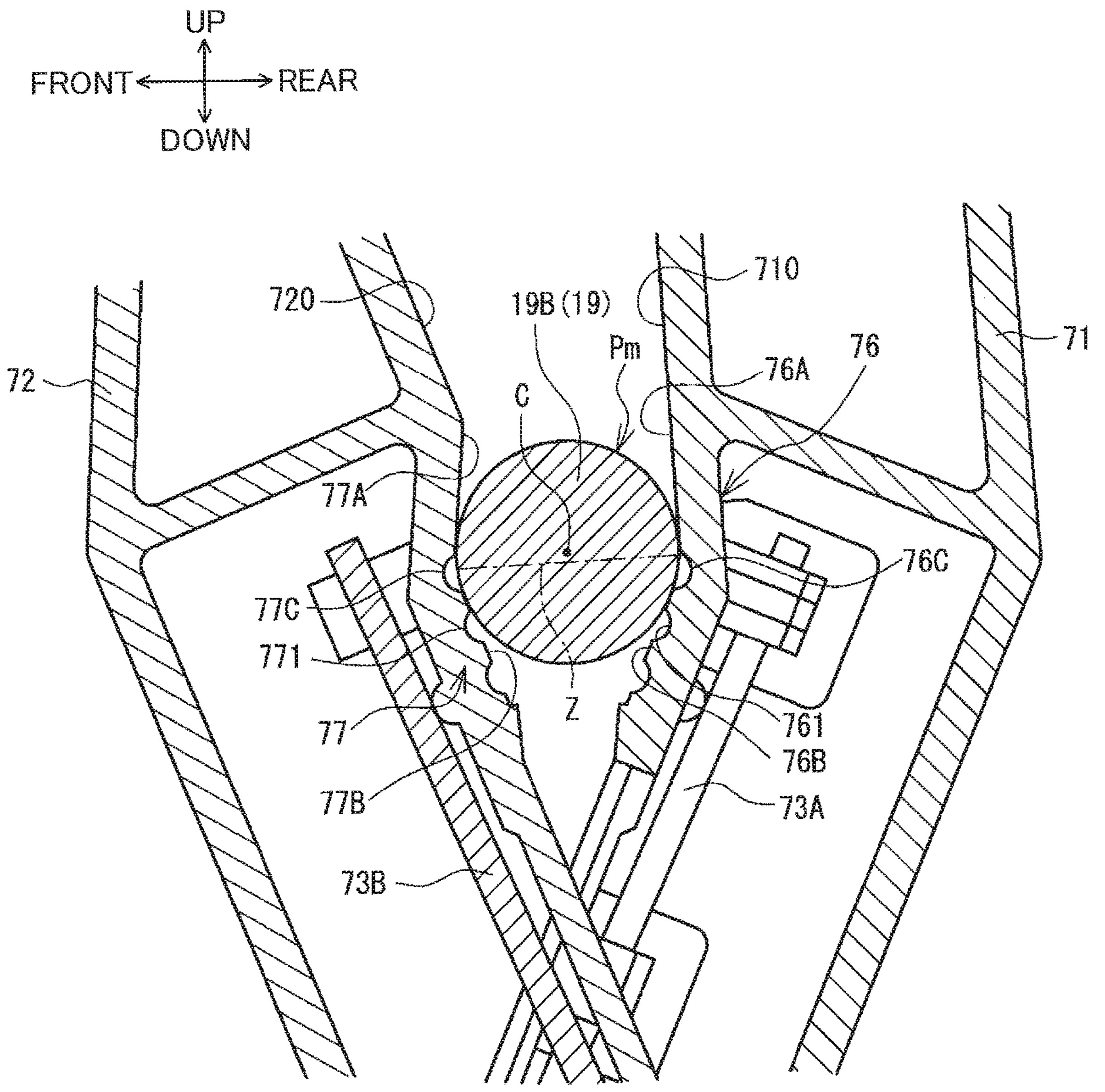
FIG. 30 illustrates a state where the cable 19B is held by the first pinching member 71 and second pinching member 72 in the cross-sectional view of FIG. 28.

As illustrated in FIGS. 29 and 30, the first pinching member 71 has a guiding portion 76 in an area above the point of intersection where the first opposing part 710 intersects the second opposing part 720 of the second pinching member 72. The guiding portion 76 has sloped parts 76A and 76B and an inflection part 76C. The sloped part 76A extends diagonally downward and rearward, while the sloped part 76B extends diagonally downward and forward. A bottom end of the sloped part 76A and a top end of the sloped part 76B are connected via the inflection part 76C. The sloped parts 76A and 76B define an angle of approximately 150° therebetween at the inflection part 76C. A plurality of recesses 761 is formed in the sloped part 76B.

The second pinching member 72 has a guiding portion 77 in an area above a point of intersection where the second opposing part 720 intersects the first opposing part 710 of the first pinching member 71. The guiding portion 77 has sloped parts 77A and 77B, and an inflection part 77C. The sloped part 77A extends diagonally downward and forward, while the sloped part 77B extends diagonally downward and rearward. A bottom end of the sloped part 77A and a top end of the sloped part 77B are connected via the inflection part 77C. The sloped parts 77A and 77B define an angle of approximately 150° therebetween at the inflection part 77C. A plurality of recesses 771 is formed in the sloped part 77B.

Figure 31:
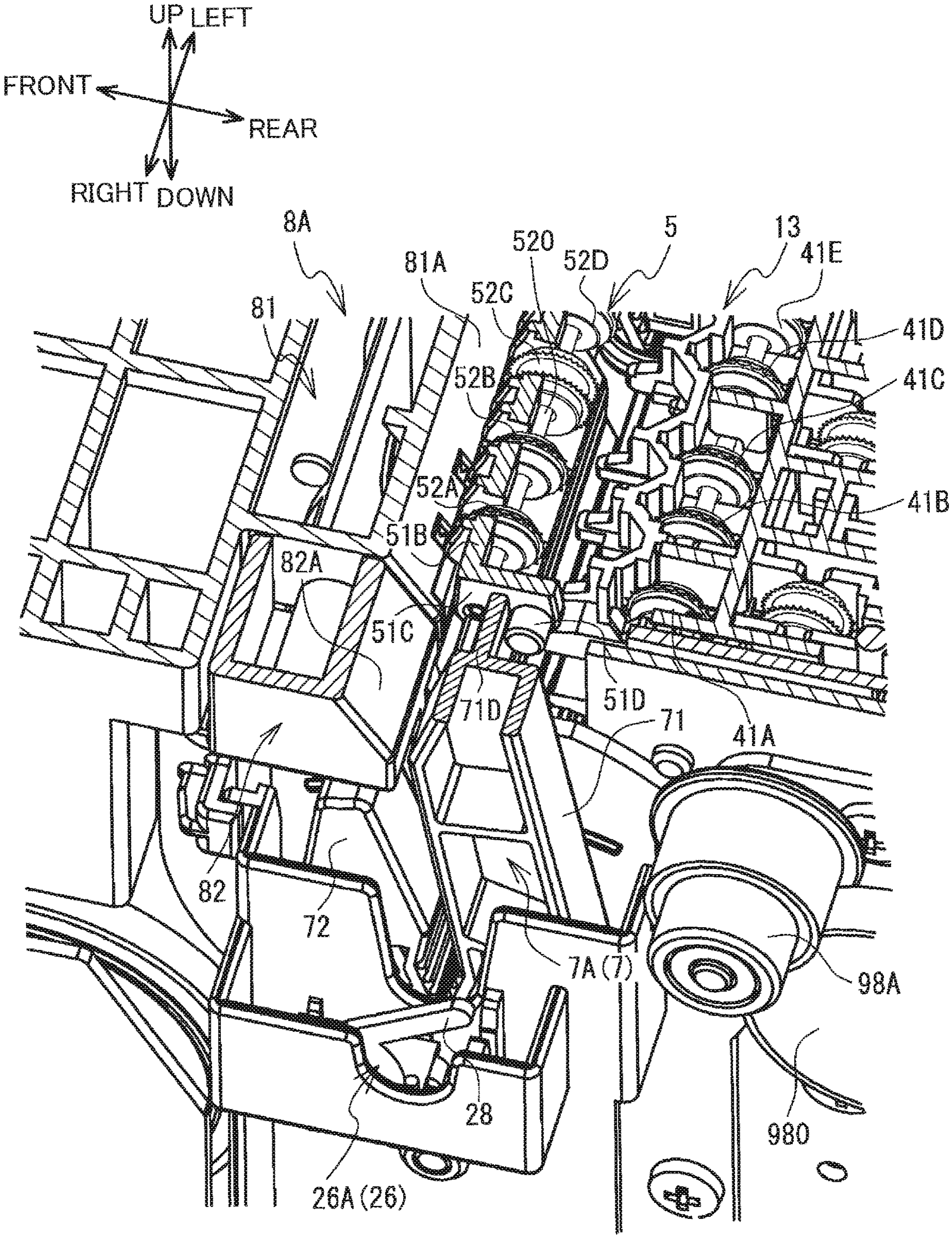
FIG. 31 is an explanatory diagram for illustrating operations of the first pinching member 71 and the opening/closing member 5 (first position) when extracting a cable 19 from an insertion recess 62A.
Figure 32:
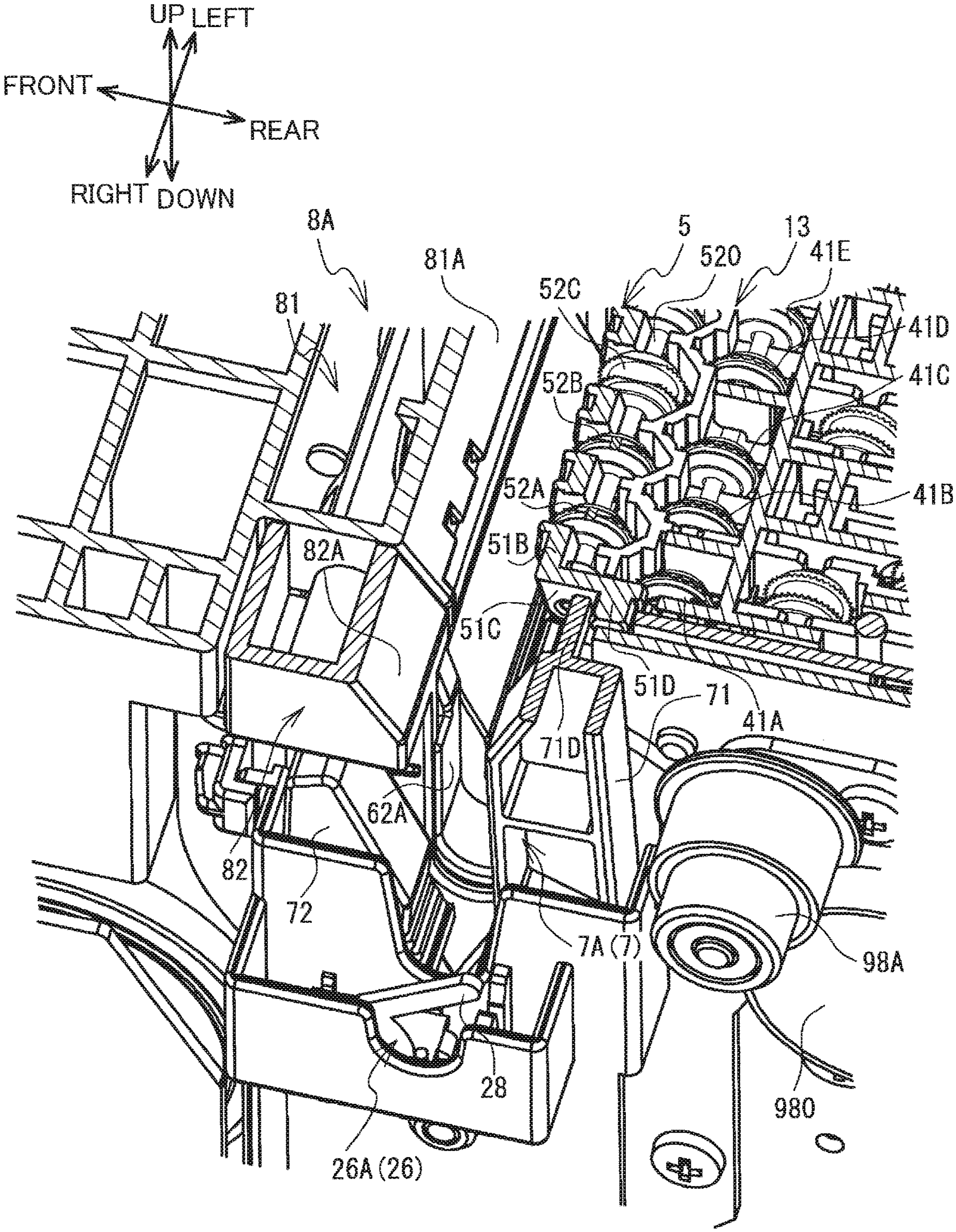
FIG. 32 is an explanatory diagram for illustrating operations of the first pinching member 71 and the opening/closing member 5 (second position) when extracting the cable 19 from the insertion recess 62A.

As illustrated in FIGS. 31 and 32, a protruding part 71D is provided on an inner surface of the first pinching member 71, the inner surface being a surface near the opening/closing member 5. The protruding part 71D protrudes inward from the inner surface of the first pinching member 71. The protruding part 71D is positioned on the front side of a protruding part 51D that protrudes outward from the right side plate 51C of the opening/closing member 5. The protruding parts 51D and 71D are positioned outside of the insertion recess 62A in the wrapping mechanism 6 with respect to the left-right direction.

When a cable 19 is mounted in the label wrapping device 1A, the cable 19 is guided diagonally downward and rearward along the sloped surface 82A of the guide member 8A toward the first sloped part 711 of the first pinching member 71. The cable 19 contacts the first sloped part 711, thereby pivoting the first pinching member 71 in the clockwise direction against the urging force of the urging part 73. Through this contact with the first sloped part 711, the cable 19 is guided diagonally downward and forward, entering the insertion recess 62A of the wrapping mechanism 6.

Subsequently, the cable 19 contacts the second sloped part 721 of the second pinching member 72 to pivot the second pinching member 72 in the counterclockwise direction against the urging force of the urging part 73. Through this contact with the second sloped part 721, the cable 19 is guided downward. While sandwiched from both front and rear sides by the first opposing part 710 of the first pinching member 71 and the second opposing part 720 of the second pinching member 72, the cable 19 moves downward.

As illustrated in FIGS. 29 and 30, the guiding portion 76 of the first pinching member 71 and the guiding portion 77 of the second pinching member 72 nip the cable 19 from front and rear sides thereof in the front-rear direction. The sloped part 76A of the guiding portion 76 and the sloped part 77A of the guiding portion 77 apply a downward force on the cable 19 in response to the urging force of the urging part 73. As a result, the cable 19 is guided downward toward the wrapping position Pm.

The first pinching member 71 and the second pinching member 72 are urged to pivot in directions for returning to their original positions by the urging force of the urging part 73 until the cable 19 reaches the wrapping position Pm. Further, the sloped part 76B of the guiding portion 76 and the sloped part 77B of the guiding portion 77 restrict further downward movement of the cable 19. In this way, the cable 19 is pinched from front and rear sides by the guiding portions 76 and 77 of the corresponding first pinching member 71 and second pinching member 72 and held in the wrapping position Pm.

At this time, the centerline C of the cable 19 at the wrapping position Pm is near a straight line Z connecting the inflection part 76C of the guiding portion 76 with the inflection part 77C of the guiding portion 77. Therefore, the centerline C of the cable 19 is at approximately the same position when a cable 19A having a relatively small diameter is held by the first pinching member 71 and second pinching member 72 (see FIG. 29) and when a cable 19B having a relatively large diameter is held by the first pinching member 71 and second pinching member 72 (see FIG. 30). Note that the centerline C of the cable 19 held by the first pinching member 71 and the second pinching member 72 is at approximately the same position as the axis 6A corresponding to the rotational center of the wrapping mechanism 6 (see FIGS. 24 and 25).

On the other hand, when the cable 19 is being removed from the label wrapping device 1A, an upward force is exerted on the cable 19 disposed in the wrapping position Pm. As the cable 19 is withdrawn from the insertion recess 62A of the wrapping mechanism 6, the cable 19 contacts the sloped part 76A of the first pinching member 71 and the sloped part 77A of the second pinching member 72 from below. In response to the force applied by the cable 19 to the sloped part 76A, the first pinching member 71 pivots in the clockwise direction against the urging force of the urging part 73.

At this time, the protruding part 71D of the first pinching member 71 comes into contact with the protruding part 51D of the opening/closing member 5 from its front side, as illustrated in FIG. 31, pushing the opening/closing member 5 rearward. As illustrated in FIG. 32, the opening/closing member 5 thus moves from the first position toward the second position, uncovering the opening 620B in the insertion recess 62A. The cable 19 passes through the exposed opening 620B and is removed upward from the insertion recess 62A.

After the cable 19 has been removed, the first pinching member 71 is pivoted counterclockwise by the urging force of the urging part 73 and returns to its original position. At the same time, the opening/closing member 5 moves from the second position to the first position, thereby covering the opening 620B in the insertion recess 62A. The second pinching member 72 is also pivoted clockwise by the urging force of the urging part 73 and returns to its original position.

<Detection Parts 26>

As illustrated in FIG. 2, a detection part 26A is provided on the right side of the retaining member 7A, and a detection part 26B is provided on the left side of the retaining member 7B. The detection parts 26A and 26B are separated from each other in the left-right direction. The detection parts 26A and 26B have the same construction. Below, the detection part 26A will be described, while a description of the detection part 26B will be omitted. The detection parts 26A and 26B are collectively referred to as a detection part 26.

Figure 33:
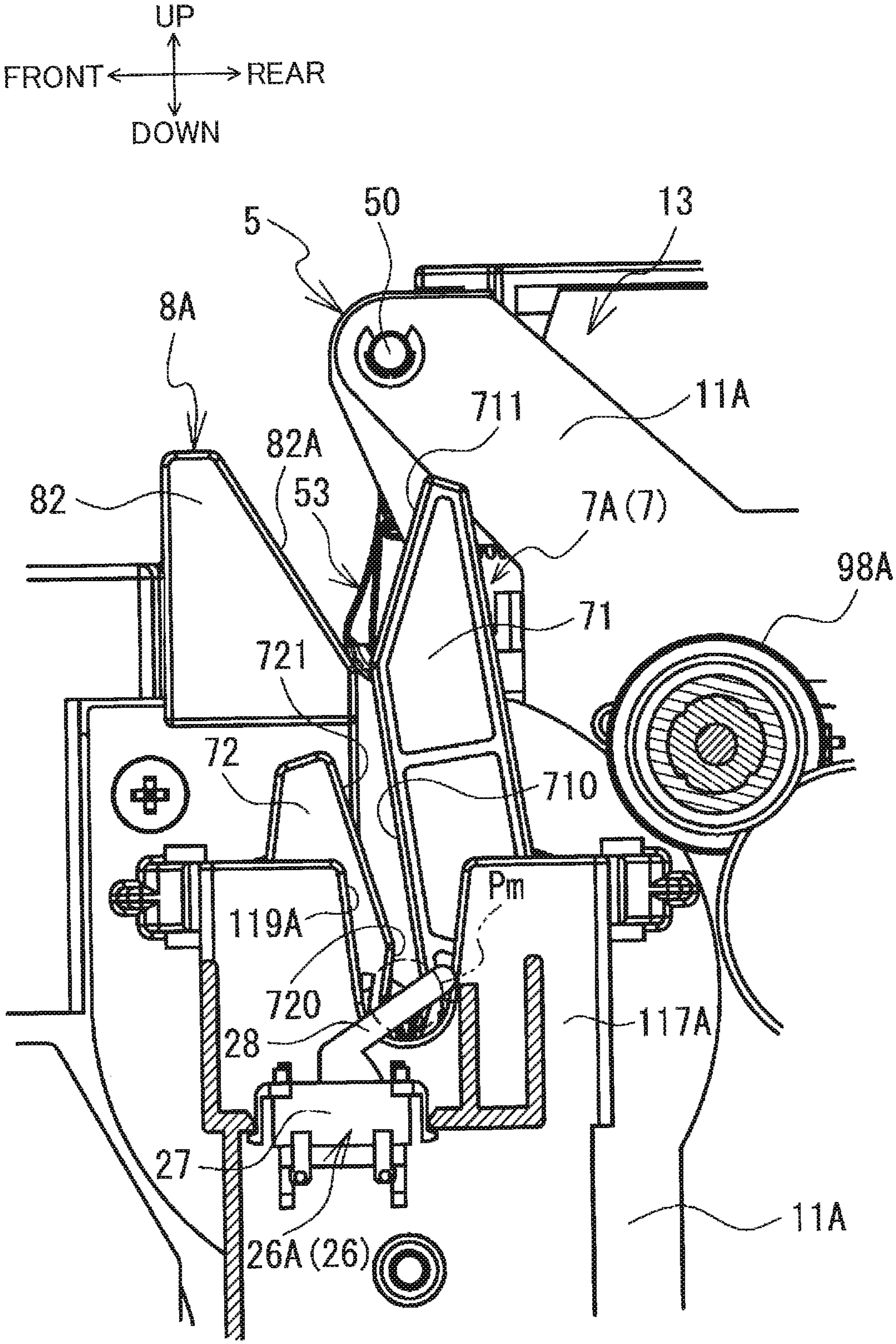
FIG. 33 is a cross-sectional view of a section taken along a line XXXIII-XXXIII in FIG. 1 as viewed in a direction indicated by corresponding arrows.

As illustrated in FIG. 33, the detection part 26A is disposed on a right surface of the cover 117A at a position higher than the pivoting shaft 70 for the first pinching member 71 and the second pinching member 72. The detection part 26A is a contact-type displacement sensor and includes a main body 27 and a movable piece 28.

The main body 27 has a box shape and is fixed to the right surface of the cover 117A. The cover 118A provided on the right side of the cover 117A (see FIG. 26) covers the main body 27 from its right side. The movable piece 28 has an elongated plate shape that extends diagonally upward and rearward from the main body 27. The movable piece 28 is arranged above the bottom portion of the recess 119A formed in the cover 117A. The movable piece 28 has a bottom end that is pivotably supported by the main body 27. The main body 27 has a built-in switch that can detect downward movement of a distal end of the movable piece 28 when the movable piece 28 pivots.

When a cable 19 is inserted into the insertion recess 62A of the wrapping mechanism 6, the cable 19 contacts the movable pieces 28 of the corresponding detection parts 26A and 26B. As the cable 19 moves down into the wrapping position Pm, the movable pieces 28 are pushed by the cable 19 from above and pivot so that the distal ends of the movable piece 28 move downward. The main bodies 27 of the corresponding detection parts 26A and 26B detect the movement of the movable pieces 28 and output ON signals to the CPU 91A (see FIG. 34). Conversely, when the movable pieces 28 move upward, the main bodies 27 of the corresponding detection parts 26A and 26B output OFF signals to the CPU 91A. Accordingly, the CPU 91A can detect whether the cable 19 is at the wrapping position Pm in both the right retaining member 7A and the left retaining member 7B.

<Electrical Configuration>

Next, an electrical configuration of the label wrapping device 1A will be described with reference to FIG. 34.

The label wrapping device 1A includes the CPU 91A, a ROM 91B, a RAM 91C, a flash memory 91D, and an input/output interface 91E, all of which are interconnected via a data bus 92. The CPU 91A is configured to perform overall control of the label wrapping device 1A. The ROM 91B stores constants needed when the CPU 91A executes various programs. The RAM 91C stores temporary data generated when the CPU 91A executes processes. The flash memory 91D stores the programs executed by the CPU 91A, variables (a first length H1, a second length H2, diameters of cables 19, etc.), and the like.

The input/output interface 91E is connected to a notification unit 93A, an input unit 93B, drive circuits 95A and 95B, the detection parts 26A and 26B, the label detection sensor 46, the wrapping sensor 69, and an external interface 94. The notification unit 93A is an LCD capable of displaying screens showing the status of the label wrapping device 1A. The input unit 93B includes buttons for inputting operations into the label wrapping device 1A. The drive circuit 95A is an electronic circuit for driving the motor 96A. The drive circuit 95B is an electronic circuit for driving the motor 96B. The external interface 94 connects to and communicates with an external terminal 94A. As an example, the CPU 91A can update programs by storing programs received from the external terminal 94A in the flash memory 91D. The external terminal 94A may be a general-purpose personal computer (PC) or a portable terminal.

<Main Process>

Next, a main process will be described with reference to FIGS. 35 and 36. The main process is configured to begin when an instruction to begin an operation for wrapping a label 10A about a cable 19 is inputted via the input unit 93B. At this time, the CPU 91A reads a program stored in the flash memory 91D and executes the program.

Figure 35:
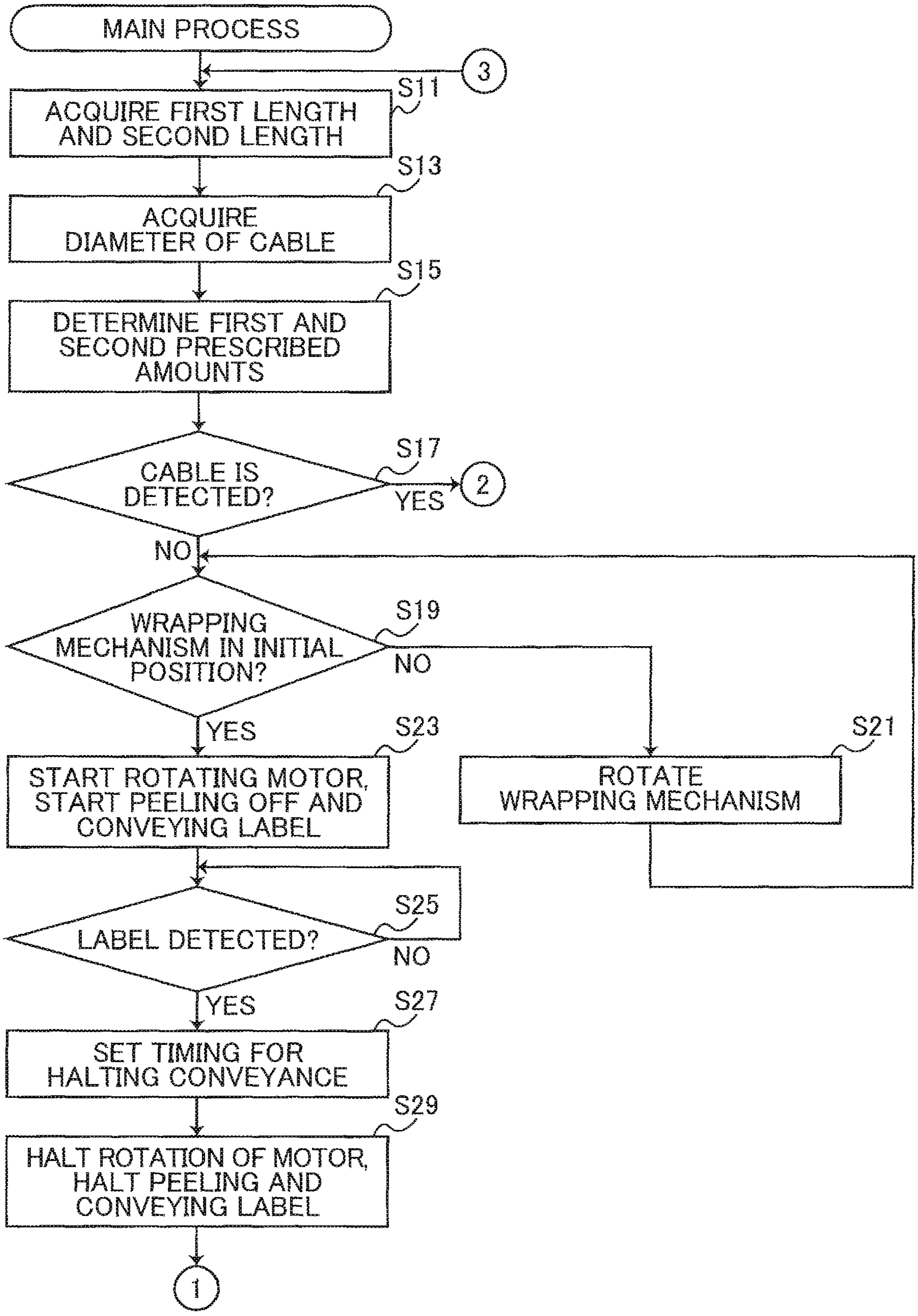
FIG. 35 is a flowchart illustrating steps in a main process.
Figure 37A:
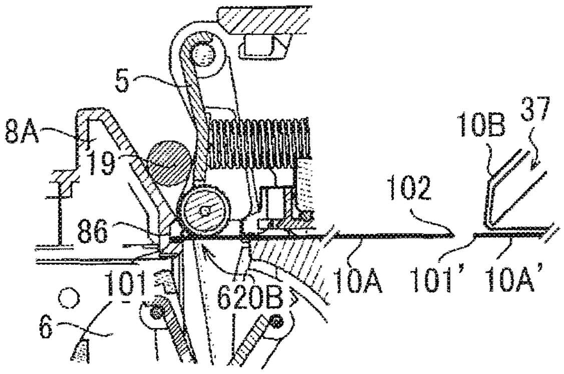
FIGS. 37A through 37F are explanatory diagrams illustrating how a label 10A is wrapped around the cable 19.
Figure 37B:
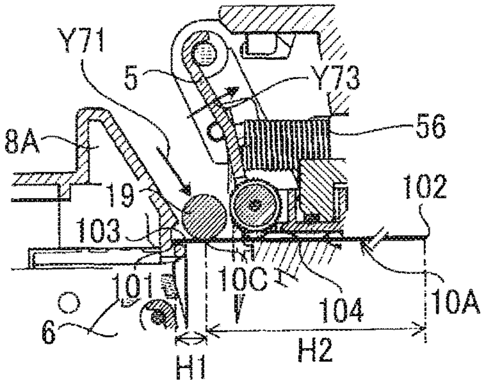

As illustrated in FIG. 35, in S11 the CPU 91A first reads and acquires a first length H1 for a first portion 103 of the label 10A (see FIG. 3B) and a second length H2 for a second portion 104 of the label 10A (see FIG. 37B). The first portion 103, second portion 104, first length H1, and second length H2 are defined below.

FIG. 37B shows an example in which the cable 19 is being mounted into the label wrapping device 1A after the conveying rollers 32 have completed conveying the label 10A. The drawing shows the cable 19 being guided downward along the guide member 8A toward the wrapping mechanism 6. At this time, a portion on the adhesive surface of the label 10A (hereinafter called an adhering part 10C) becomes affixed to the cable 19. In the following description, this state in which the cable 19 is affixed to the adhering part 10C of the label 10A will be called the initial state. The position of the cable 19 in this initial state is higher than the wrapping position Pm.

In this initial state, the first portion 103 corresponds to a portion of the label 10A between the downstream end of the label 10A (hereinafter called a first end 101) and the adhering part 10C. The first length H1 corresponds to a length of the first portion 103 in the front-rear direction. In the initial state, the second portion 104 corresponds to a portion of the label 10A between the upstream and of the label 10A (hereinafter called a second end 102) and the adhering part 10C. The second length H2 is a length of the second portion 104 in the front-rear direction. The first length H1 is shorter than the second length H2. The positions of the adhering part 10C, first end 101, and second end 102 in this initial state can be identified in advance as prescribed positions in the label wrapping device 1A. Therefore, the first length H1 and second length H2 are stored in the flash memory 91D in advance as initial settings for the label wrapping device 1A.

In S13 of FIG. 35, the CPU 91A reads and acquires the diameter of the cable 19 from the flash memory 91D. The user may input the diameter of the cable 19 into the label wrapping device 1A in advance via the external terminal 94A connected to the label wrapping device 1A, for example. The CPU 91A may receive the diameter of the cable 19 via the external interface 94 and may store this diameter in the flash memory 91D. Hence, when executing the process of S13, the CPU 91A may read and acquire the diameter of the cable 19 pre-stored in the flash memory 91D as described above.

In S15, the CPU 91A determines a first prescribed amount and second prescribed amount based on the first length H1 and second length H2 acquired in S11 and the diameter of the cable 19 acquired in S13. The first prescribed amount is a rotated amount of the wrapping mechanism 6 when the wrapping mechanism 6 is rotated in the clockwise direction (a first direction Y81; see FIG. 37E) through the process of S33 described later (see FIG. 36). The first prescribed amount specifies the angle of rotation of the wrapping mechanism 6. The second prescribed amount is a rotated amount of the wrapping mechanism 6 when the wrapping mechanism 6 is rotated counterclockwise (a second direction Y83; see FIG. 37F) through the process of S37 described later (see FIG. 36). The second prescribed amount specifies the number of rotations of the wrapping mechanism 6. The method of setting the first prescribed amount and second prescribed amount will be described later.

In S17 the CPU 91A determines whether the cable 19 was detected by either of the detection parts 26A and 26B based on whether either of the detection parts 26A and 26B outputted an ON signal. Note that, in this state, the process of peeling off and conveying the label 10A has not been completed and, hence, preparations for wrapping and fixing the label 10A to the cable 19 have not been completed. Therefore, if the CPU 91A determines that an ON signal is outputted from one of the detection parts 26A and 26B (S17: YES), the process advances to S55 (see FIG. 36). In S55 of FIG. 36, the CPU 91A displays a message on the notification unit 93A notifying the user that the operation for wrapping the label 10A around the cable 19 cannot be initiated. Subsequently, the CPU 91A ends the main process.

However, if the cable 19 has not yet been placed in the wrapping position, the operation for wrapping and affixing the label 10A to the cable 19 may begin. When the CPU 91A determines that OFF signals were outputted from both detection parts 26A and 26B (S17: NO), the process advances to 819.

In S19 the CPU 91A determines whether the wrapping mechanism 6 is in its initial position based on the output signal from the wrapping sensor 69. When the wrapping sensor 69 outputs an OFF signal, the CPU 91A determines that the wrapping mechanism 6 is not in the initial position (S19: NO). In this case, in S21 the CPU 91A controls the drive circuit 95B to rotate the motor 96B in order to rotate the wrapping mechanism 6. Subsequently, the process returns to 819 and the CPU 91A continues to monitor output signals from the wrapping sensor 69. When the wrapping sensor 69 outputs an ON signal, the CPU 91A determines that the wrapping mechanism 6 is disposed in its initial position (S19: YES). Since the opening 620B of the insertion recess 62A faces upward in the wrapping mechanism 6 in this case, the insertion recess 62A is capable of receiving insertion of the cable 19. The CPU 91A controls the drive circuit 95B to halt rotation of the motor 96B, thereby halting rotation of the wrapping mechanism 6. The process then advances to S23.

In S23 the CPU 91A controls the drive circuit 95A to begin rotating the motor 96A. The rotational drive force of the motor 96A is transmitted to the stripping roller 31 via the plurality of gears 970 in the transmission part 97, and the stripping roller 31 begins to rotate. By rotating, the stripping roller 31 conveys the release paper 10B nipped between the stripping roller 31 and follow roller 33 in the direction of arrow Y11, thereby drawing the label tape 10 from the roll 100 in the direction of arrow Y12, as illustrated in FIG. 6. A label 10A is separated from the release paper 10B as the release paper 10B is bent around the peeling point 370 of the stripping plate 37. Once peeled off the release paper 10B, the label 10A is pushed in the direction of the arrow Y13 and advances between the conveying rollers 32 and follow rollers 34.

The rotational drive force of the motor 96A is also transmitted to the conveying rollers 32 via the plurality of gears 980 and the one-way clutch 98A of the transmission part 98, and the conveying rollers 32 begin rotating. By rotating, the conveying rollers 32 convey the label 10A in the conveying direction (the direction of arrow Y14) along the third conveying path R3.

In S25 the CPU 91A determines whether the label detection sensor 46 disposed along the third conveying path R3 at the location of the straightening member 4 outputted an ON signal. Timings at which the label detection sensor 46 outputs an OFF signal signify that the first end 101 (see FIG. 37B), which is the downstream end of the label 10A separated from the release paper 10B, has not yet passed the position of the straightening member 4. Therefore, when the CPU 91A determines that the label detection sensor 46 outputted an OFF signal (S25: NO), the CPU 91A returns to S25 and continues to monitor output signals from the label detection sensor 46.

On the other hand, the label detection sensor 46 outputs an ON signal in response to the first end 101 of the label 10A passing the position of the straightening member 4. When the CPU 91A determines that the label detection sensor 46 outputted an ON signal (S25: YES), in S27 the CPU 91A sets a timing for halting conveyance of the label 10A.

More specifically, the CPU 91A calculates a conveyance time required for the conveying rollers 32 to convey the label 10A a distance in the front-rear direction between the actuator 46A of the label detection sensor 46 and the restriction part 8B. The CPU 91A sets the timing at which the conveyance time will have elapsed after the current time as the timing for halting conveyance of the label 10A. Thus, in S27 the CPU 91A can set a timing for halting conveyance so that the label 10A can continue to be conveyed after the first end 101 of the label 10A has passed the position of the label detection sensor 46 until the first end 101 contacts the restriction wall 86. When conveyance of the label 10A is halted at this timing, the first end 101 of the label 10A is positioned downstream relative to the opening 620B formed in the insertion recess 62A of the wrapping mechanism 6.

In S29 the CPU 91A controls the drive circuit 95A based on the timing for halting conveyance set in the process of S27 to halt the rotation of the motor 96A that was started in the process of S23. Through this step, rotation of the conveying rollers 32 is halted. As illustrated in FIG. 37A, the label 10A is halted after being conveyed to a position covering the opening 620B in the insertion recess 62A of the wrapping mechanism 6.

Rotation of the stripping roller 31 is also halted in response to halting rotation of the motor 96A. In this state, the second end 102, which is the upstream end of the label 10A, is positioned downstream of the stripping plate 37. In other words, the entire label 10A has been completely peeled off the release paper 10B from its first end 101 to its second end 102. Further, a downstream end 101' of a label 10A' following the label 10A in the label tape 10 has been partially peeled off the release paper 10B by the stripping plate 37.

As illustrated in FIG. 37A, the user positions the cable 19 above the guide member 8A in order to mount the cable 19 in the label wrapping device 1A for wrapping the cable 19 with the label 10A. As illustrated in FIG. 37B, the user moves the cable 19 downward along the sloped surfaces 81A and 82A of the guide member 8A (arrow Y71). While the cable 19 is guided toward the insertion recess 62A of the wrapping mechanism 6 by the guide member 8A, the cable 19 contacts the ribs 53 of the opening/closing member 5, applying an external force to the bottom of the opening/closing member 5. In response to this force, the opening/closing member 5 moves from the first position to the second position against the urging force of the urging parts 56 (arrow Y73). Through this movement, the opening/closing member 5 switches the opening 620B of the wrapping mechanism 6 from a covered state (see FIG. 37A) to an exposed state (see FIG. 37B). The cable 19 becomes attached to the adhering part 10C of the label 10A at this time.

Figure 37C:
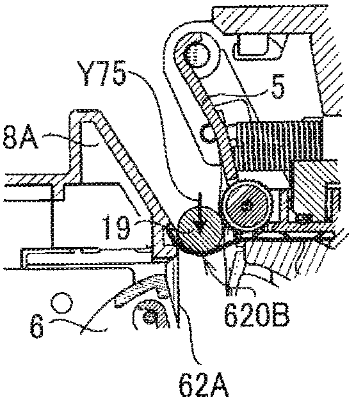
Figure 37D:
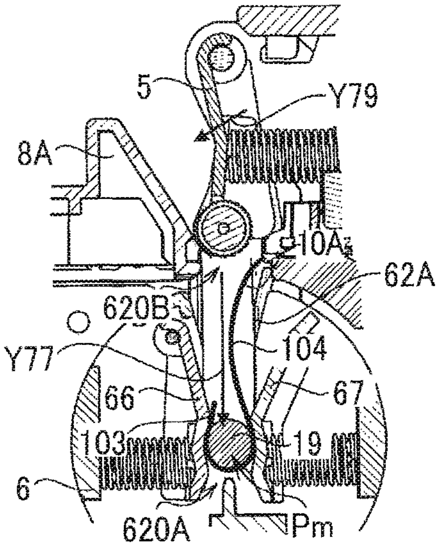

As illustrated in FIG. 37C, the user continues to move the cable 19 downward, whereby the cable 19 passes through the opening 620B and is inserted from above into the insertion recess 62A of the wrapping mechanism 6 (arrow Y75). As illustrated in FIG. 37D, the cable 19 moves through the insertion recess 62A in the insertion direction S1 (see FIG. 22) from the opening 620B to the bottom part 620A (arrow Y77). The cable 19 becomes nipped between the first pinching member 71 and second pinching member 72 of each retaining member 7 (see FIG. 26 and the like) and between the first arm member 66 and second arm member 67 of the wrapping mechanism 6 and is held at the wrapping position Pm.

Further, since the label 10A is affixed by the adhering part 10C to the cable 19, the label 10A is also inserted into the insertion recess 62A of the wrapping mechanism 6 along with the cable 19. The second portion 104 of the label 10A moves downstream through the third conveying path R3 and enters the insertion recess 62A. Note that the one-way clutch 98A of the transmission part 98 decouples the motor 96A from the conveying rollers 32 allowing the conveying rollers 32 to rotate while the motor 96A is halted. Therefore, the motor 96A does not impede the second portion 104 of the label 10A from moving downstream.

While the cable 19 is held in the wrapping position Pm, the label 10A is interposed between the cable 19 and the first arm member 66 and second arm member 67. The label 10A becomes wrapped around and affixed to an area constituting the approximate lower half of the cable 19.

As the cable 19 is inserted into the insertion recess 62A of the wrapping mechanism 6, the force applied from the cable 19 is no longer applied to the bottom of the opening/closing member 5. Consequently, the urging force of the urging parts 56 moves the opening/closing member 5 back from the second position to the first position (arrow Y79). As a result, the opening/closing member 5 covers the opening 620B of the wrapping mechanism 6, returning the opening 620B to the closed state.

Figure 36:
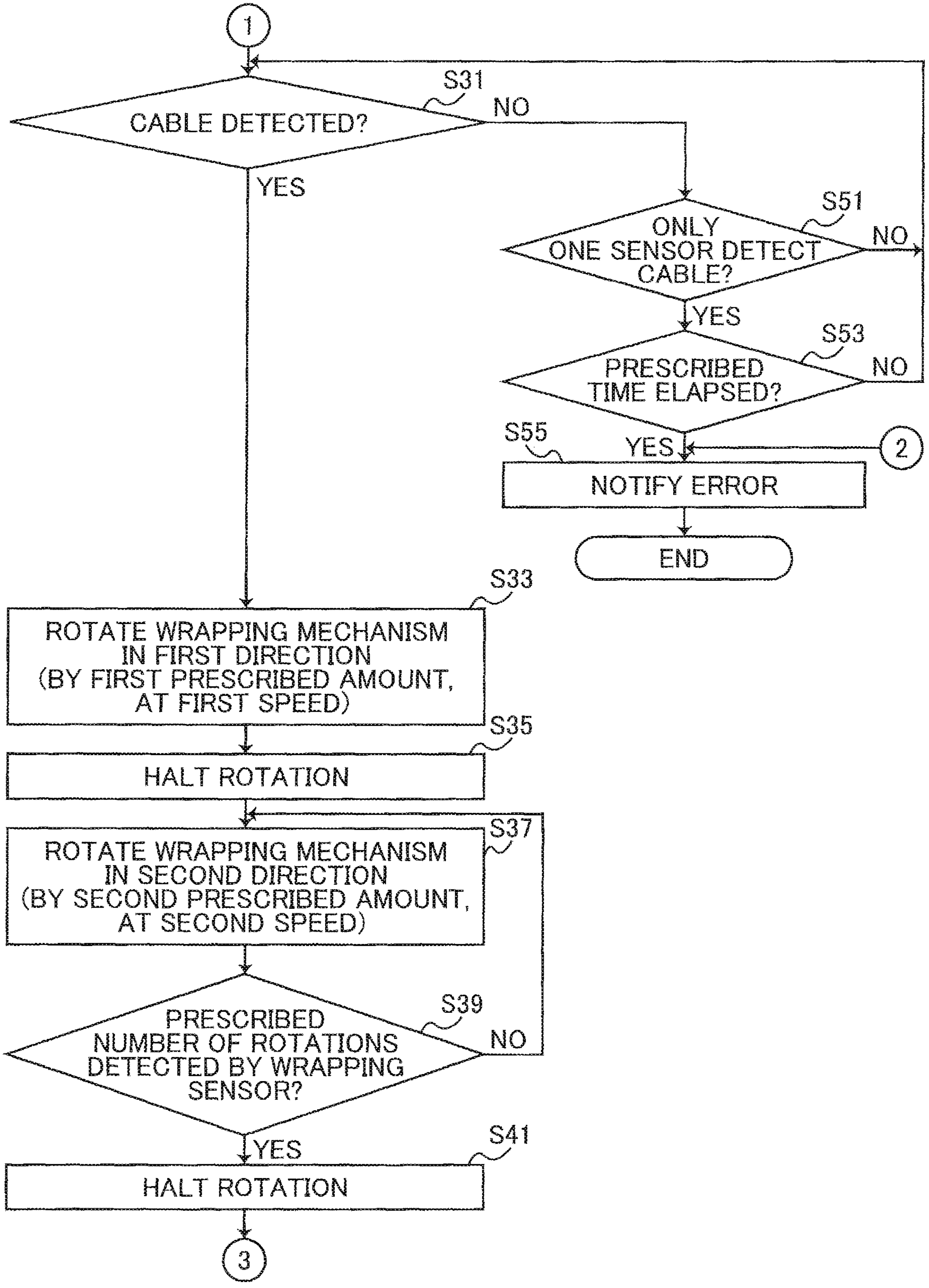
FIG. 36 is a continuation of the flowchart in FIG. 35.

Referring to FIG. 36, in S31 the CPU 91A determines whether both the detection parts 26A and 26B outputted an ON signal. When both of the detection parts 26A and 26B have outputted an OFF signal, the cable 19 has not yet arrived at the bottom part 620A of the insertion recess 62A and, hence, is not disposed in the wrapping position Pm. When only one of the detection parts 26A and 26B outputs an OFF signal while the other has outputted an ON signal, the cable 19 is skewed relative to the left-right direction, meaning that the cable 19 is not properly disposed in the wrapping position Pm.

Hence, when the CPU 91A determines that at least one of the detection parts 26A and 26B has outputted an OFF signal (S31: NO), the process advances to S51. In S51 the CPU 91A determines whether only one of the detection parts 26A and 26B outputted an OFF signal. If both of the detection parts 26A and 26B outputted an OFF signal (S51: NO), the process returns to S31, and the CPU 91A continues to monitor signals outputted from the detection parts 26A and 26B.

However, if the CPU 91A determines that only one of the detection parts 26A and 26B outputted an OFF signal (S51: YES), in S53 the CPU 91A determines whether a prescribed time has elapsed since the timing at which the CPU 91A first determined that only one of the detection parts 26A and 26B had outputted an OFF signal. If the CPU 91A determines that the prescribed time has not elapsed (S53: NO), the process returns to S31, and the CPU 91A continues to monitor signals outputted from the detection parts 26A and 26B. However, if the CPU 91A determines that the prescribed time has elapsed since the timing at which the CPU 91A first determined that only one of the detection parts 26A and 26B had outputted an OFF signal (S53: YES), in S55 the CPU 91A displays a message on the notification unit 93A to notify the user that the cable 19 is not properly mounted. Subsequently, the CPU 91A ends the main process.

On the other hand, when both of the detection parts 26A and 26B output an ON signal, then the cable 19 is arranged in the wrapping position Pm at the respective positions of both detection parts 26A and 26B and, hence, is properly disposed in the wrapping position Pm. When the CPU 91A determines that both of the detection parts 26A and 26B have outputted an ON signal (S31: YES), the process advances to S33.

Figure 37E:
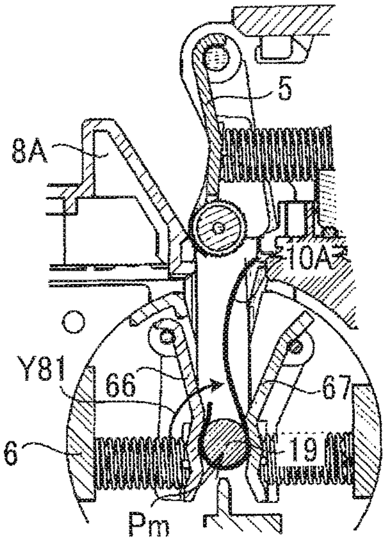

In S33 the CPU 91A controls the drive circuit 95B to rotate the motor 96B so that the wrapping mechanism 6 is rotated in the first direction Y81 (see FIG. 37E). Further, the CPU 91A controls the drive circuit 95B so that the rotational speed of the wrapping mechanism 6 rotated by the motor 96B is a first speed. After the CPU 91A has rotated the wrapping mechanism 6 the first prescribed amount (angle of rotation) set in the process of S15, in S35 the CPU 91A halts rotation of the wrapping mechanism 6.

By rotating the wrapping mechanism 6 in the first direction Y81, as illustrated in FIG. 37E, the first portion 103 of the label 10A becomes wrapped around and affixed to the cable 19 by the first arm member 66. Here, the first prescribed amount for rotating the wrapping mechanism 6 in the first direction Y81 corresponds to the amount of rotation required for wrapping the first portion 103 of the label 10A around the cable 19. In other words, in the process of S15 (see FIG. 35) the CPU 91A sets the angle of rotation required to wrap the first portion 103 of the label 10A around the cable 19 based on the diameter of the cable 19 and the first length H1 corresponding to the length of the first portion 103 (see FIG. 37B).

Figure 37F:
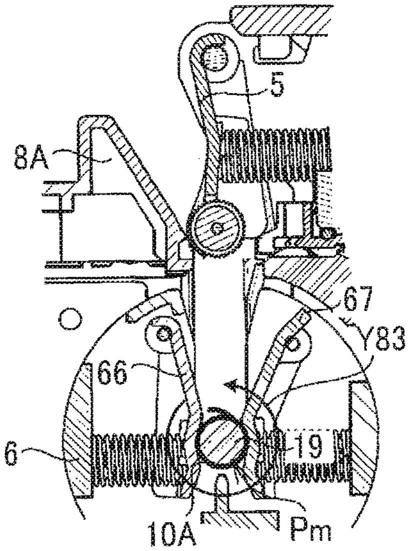
Figure 38:
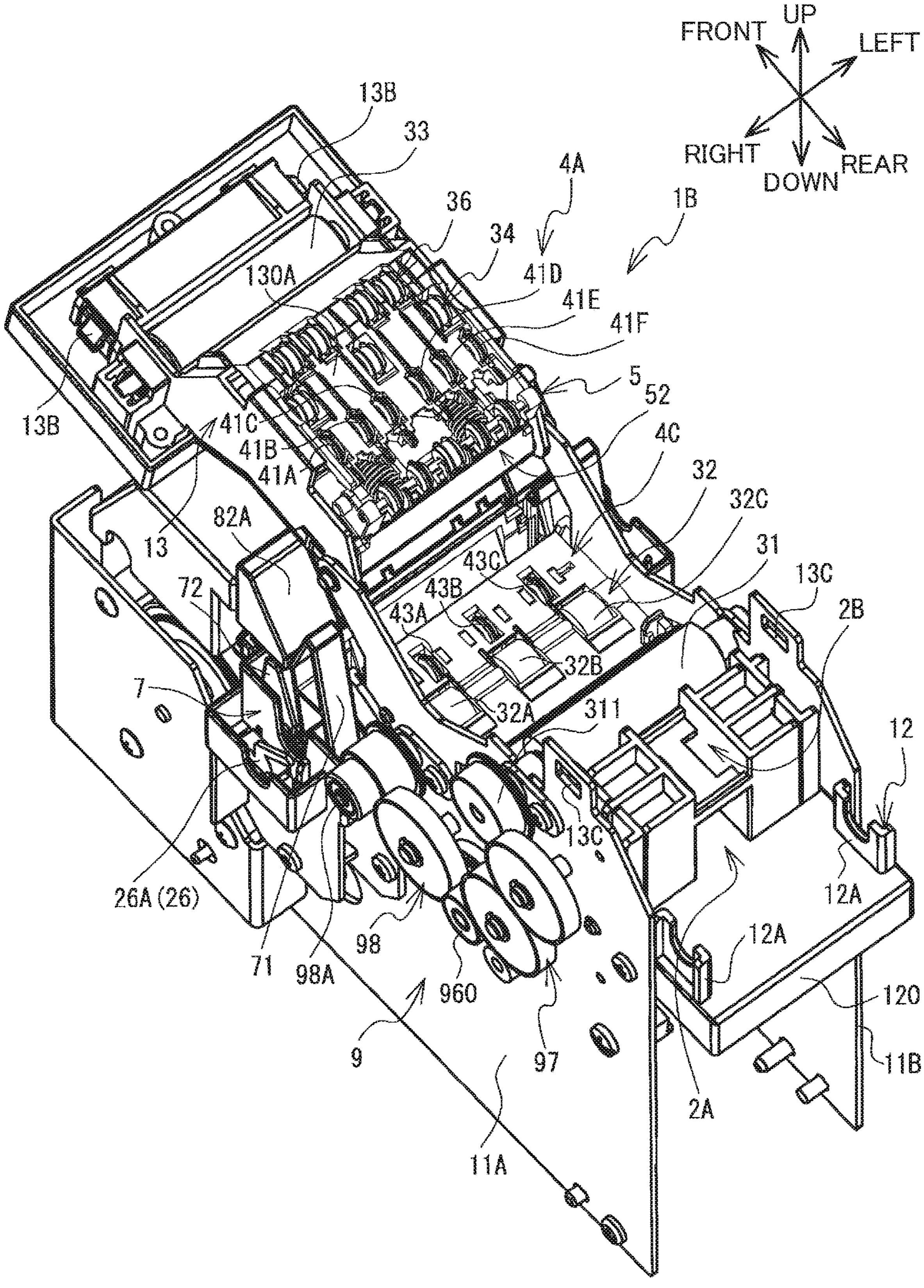
FIG. 38 is a perspective view of a label wrapping device 1B.

Next, in S37 the CPU 91A controls the drive circuit 95B to rotate the motor 96B so that the wrapping mechanism 6 rotates in the second direction Y83 (see FIG. 37F). Further, the CPU 91A controls the drive circuit 95B so that the rotational speed of the wrapping mechanism 6 rotated by the motor 96B is a second speed faster than the first speed.

In S39 the CPU 91A determines whether the wrapping mechanism 6 has rotated the second prescribed amount (number of rotations) that was set in the process of S15 based on the number of times the wrapping sensor 69 has outputted an ON signal. Each time the wrapping sensor 69 outputs an ON signal, the CPU 91A adds one to the cumulative number of rotations of the wrapping mechanism 6. While the cumulative number of rotations is less than the second prescribed number (S39: NO), the process returns to S37, and the CPU 91A continues control for rotating the wrapping mechanism 6 in the second direction Y83. When the cumulative number of rotations becomes greater than or equal to the second prescribed number (S39: YES), in S41 the CPU 91A controls the drive circuit 95B to halt rotation of the wrapping mechanism 6. Subsequently, the process returns to S11.

When the wrapping mechanism 6 is rotated in the second direction Y83, as illustrated in FIG. 37F, the second portion 104 of the label 10A is wrapped around and affixed to the cable 19 by the first arm member 66 and second arm member 67. Here, the second prescribed amount for rotating the wrapping mechanism 6 in the second direction Y83 corresponds to the amount of rotation required for wrapping the second portion 104 of the label 10A around the cable 19. That is, in the process of S15, the CPU 91A sets the number of rotations required for wrapping the second portion 104 of the label 10A around the cable 19 based on the diameter of the cable 19 and the second length H2 corresponding to the length of the second portion 104 (see FIG. 37B).

After the label 10A has been wrapped around the cable 19, the cable 19 is moved upward from the wrapping position Pm to remove the cable 19 from the label wrapping device 1A. During the process of extracting the cable 19 from the insertion recess 62A of the wrapping mechanism 6, the cable 19 contacts the sloped part 76A of the first pinching member 71 from below, causing the first pinching member 71 to pivot in the clockwise direction. At this time, the protruding part 71D on the first pinching member 71 contacts the protruding part 51D of the opening/closing member 5 from the front side and pushes the opening/closing member 5 rearward, as illustrated in FIG. 31. The opening/closing member 5 moves from the first position toward the second position, exposing the opening 620B to the insertion recess 62A, as illustrated in FIG. 32. Accordingly, the cable 19 passes through the opened opening 620B and is removed from the insertion recess 62A.

After the cable 19 is removed, the first pinching member 71 is pivoted counterclockwise by the urging force of the urging part 73, and the second pinching member 72 is pivoted clockwise by the urging force of the urging part 73. Hence, the first pinching member 71 and second pinching member 72 return to their original positions. The opening/closing member 5 is also moved from the second position to the first position by the urging force of the urging parts 56, thereby covering the opening 620B to the insertion recess 62A of the wrapping mechanism 6.

Operations and Technical Advantages of the Embodiment

The label wrapping device 1A includes the straightening member 4 on the downstream side of the conveying rollers 32. A label 10A conveyed along the third conveying path R3 by the conveying rollers 32 passes through the straightening member 4 before reaching the insertion recess 62A of the wrapping mechanism 6. The straightening member 4 includes the rotating bodies 4A disposed above the third conveying path R3, and the ribs 4B disposed below the third conveying path R3. The rotating bodies 4A and the ribs 4B overlap in the left-right direction. As a result, the label 10A passing through the straightening member 4 is curved into the shape of waves juxtaposed in the left-right direction while being conveyed, thereby correcting the curling tendency in the label 10A. Hence, the label wrapping device 1A can stably wrap the label 10A about the cable 19 by driving the wrapping mechanism 6 after curling tendency in the label 10A has been corrected. Additionally, the rotating bodies 4A of the straightening member 4 can restrain the adhesive surface of the label 10A from adhering to the straightening member 4 while the rotating bodies 4A and ribs 4B correct the curling tendency of the label 10A.

The label wrapping device 1A possesses the label detection sensor 46 that can detect the label 10A at a position in the conveying direction corresponding to the straightening member 4. Thus, the label detection sensor 46 can detect the label 10A at the position of the straightening member 4. When the label 10A is straightened at the position of the straightening member 4, the downstream end of the label 10A in particular is in a stable state. Therefore, the label wrapping device 1A can accurately detect the downstream end of the label 10A at the position of the straightening member 4.

The restriction walls 87 and 88 of the restriction part 8B can suppress the first end 101, which is the downstream and of the label 10A, from moving vertically when the cable 19 is inserted into the insertion recess 62A for wrapping the label 10A around the cable 19. Accordingly, the label wrapping device 1A can properly wrap the label 10A around the cable 19.

The restriction wall 86 of the restriction part 8B restrains further conveyance of the label 10A, halting conveyance of the label 10A while the label 10A is covering the insertion recess 62A. Therefore, the label wrapping device 1A can suitably wrap the label 10A around the cable 19 in response to the cable 19 being inserted into the insertion recess 62A.

The bottoms of the rotating bodies 4A are positioned below the tops of the conveying rollers 32. Therefore, the label 10A being conveyed by the conveying rollers 32 is curved downward at the positions of the rotating bodies 41B-41E. Further, the center positions X1 and X2 of the corresponding rotating bodies 41B and 41C and the center positions X3 and X4 of the corresponding rotating bodies 41D and 41B are all disposed at different positions in the left-right direction from the conveying rollers 32A-32C. That is, the label 10A is curved by the conveying rollers 32 and the rotating bodies 41B-41E to form waves in the left-right direction. Accordingly, the label wrapping device 1A can correct a curling tendency in the label 10A with the conveying rollers 32 and the rotating bodies 41B-41E.

When the conveying rollers 32 rotate in contact with the label 10A during the process of conveying the label 10A, frictional force generated between the conveying rollers 32 and the label 10A can produce a curl in the label 10A. However, the rear ends of the ribs 4B are disposed at the same position in the conveying direction as the front ends of the conveying rollers 32. In this case, the label wrapping device 1A can suppress the label 10A from developing a curling tendency when being conveyed by the conveying rollers 32 using the ribs 4B immediately after the label 10A is fed by the conveying rollers 32. Hence, the conveying rollers 32 of the label wrapping device 1A can suitably convey the label 10A to the insertion recess 62A.

The rotating bodies 4A have the rotating sets 411-413, each of which is configured of two rotating bodies 4A separated from each other in the left-right direction. The separation distances L1-L3 for the corresponding rotating sets 411-413 are mutually different. Each of the separation distances L1, L2, and L3 corresponds to the length in the left-right direction of labels 10A conveyed along the third conveying path R3. Hence, the rotating bodies 4A of the label wrapping device 1A can correct curling tendencies in the conveyed labels 10A at positions corresponding to left-right edges thereof. Further, even when a plurality of labels 10A having different lengths in the left-right direction are used in the label wrapping device 1A, the label wrapping device 1A can suitably correct a curling tendency in each label 10A and can suitably wrap the labels 10A around cables 19.

First Modification

A label wrapping device 1B according to a first modification will be described with reference to FIGS. 38 through 41.

The label wrapping device 1B includes rotating bodies 4C in place of the ribs 4B of the straightening member 4 (see FIG. 13). The remaining structures of the label wrapping device 1B are identical to those of the label wrapping device 1A, and a description of those structures will be omitted.

Figure 40:
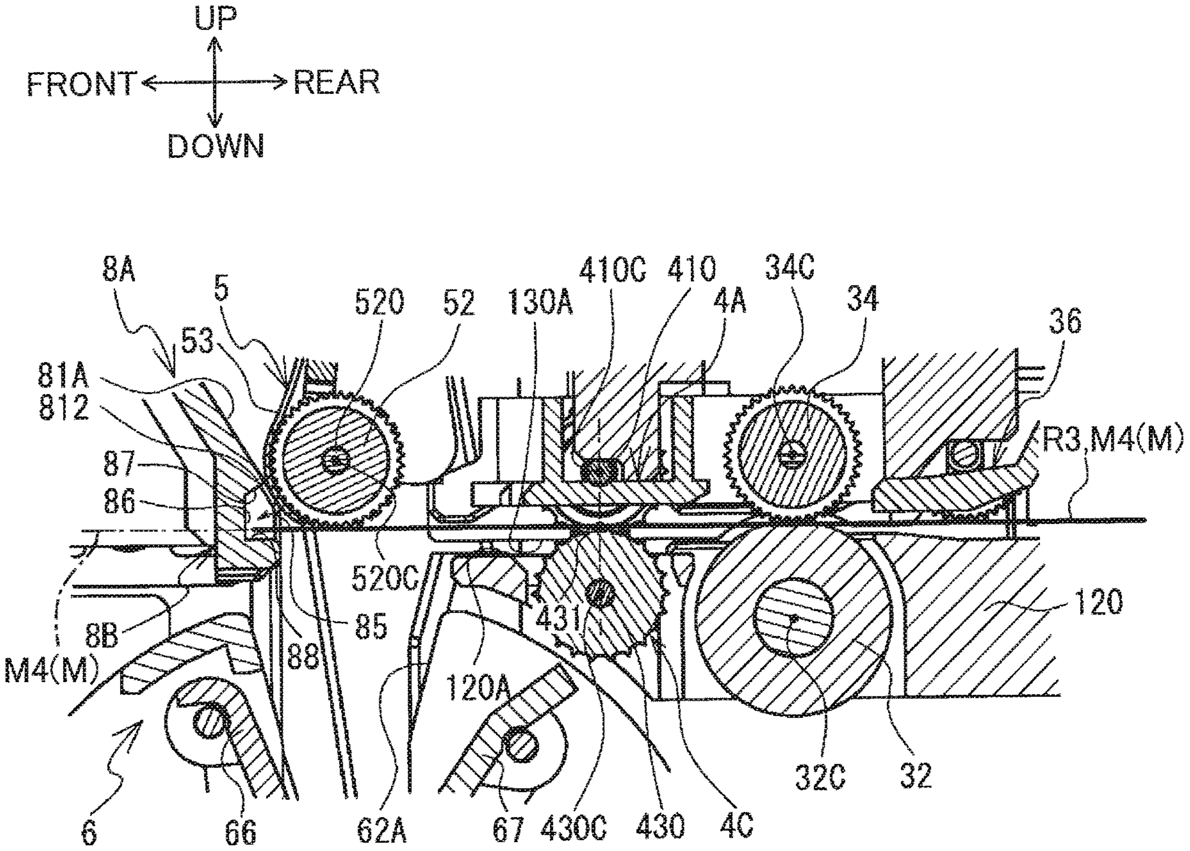
FIG. 40 is a cross-sectional view of the label wrapping device 1B.
Figure 41:
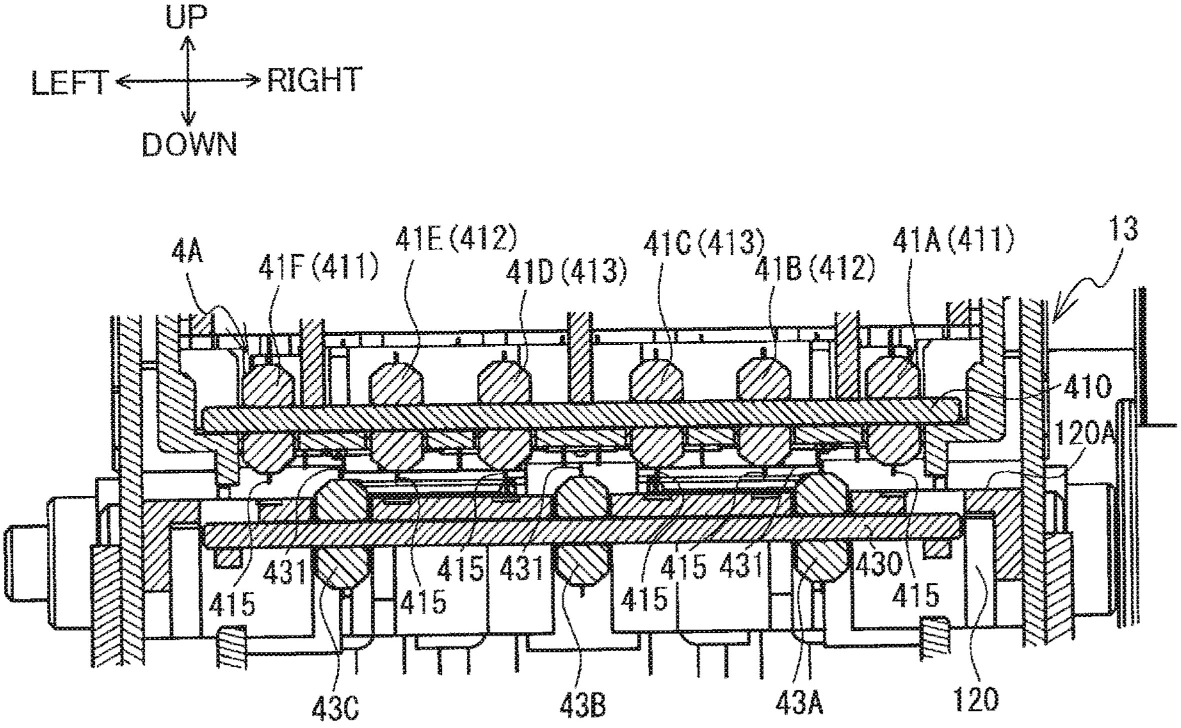
FIG. 41 is a cross-sectional view of a straightening member 400 in the label wrapping device 1B.

The rotating bodies 4C are arranged below the third conveying path R3. The rotating bodies 4C include rotating bodies 43A, 43B, and 43C arranged in the left-right direction. The rotating bodies 43A-43C are disc-shaped and have uneven circumferential edges. The rotating bodies 43A-43C have the same shape as the rotating bodies 41A-41F. Holes are formed through the centers of the rotating bodies 4C, and a rotational shaft 430 illustrated in FIG. 41 is inserted into these holes. The rotational shaft 430 is rod-shaped and extends in the left-right direction. The rotating bodies 4C are rotatably supported in the conveyance base 120 via the rotational shaft 430. As illustrated in FIG. 40, the rotational shaft 430 defines an axis 430C extending in the left-right direction through the center of the rotational shaft 430. The rotational shaft 430 is arranged so that the axis 430C is lower than the conveying surface 120A of the conveyance base 120. The tops of the rotating bodies 4C, i.e., protruding parts 431 of the rotating bodies 4C that protrude farthest toward the third conveying path R3 side, protrude above the conveying surface 120A. The axis 410C of the rotating bodies 4A and the axis 430C of the rotating bodies 4C oppose each other vertically across the third conveying path R3. The axis 410C and axis 430C have the same positions in the front-rear direction.

As illustrated in FIG. 41, the bottoms of the rotating bodies 4A are defined as protruding parts 415 that protrude farthest toward the third conveying path R3 side. In this case, the protruding parts 431 of the rotating bodies 4C are positioned slightly higher than the protruding parts 415 of the rotating bodies 4A. Therefore, the distal ends of the rotating bodies 4A and 4C overlap each other vertically. As illustrated in FIG. 40, the rotating bodies 4A and 4C also have the same position in the front-rear direction. Hence, the rotating bodies 4A and 4C overlap each other in the left-right direction.

Figure 39:
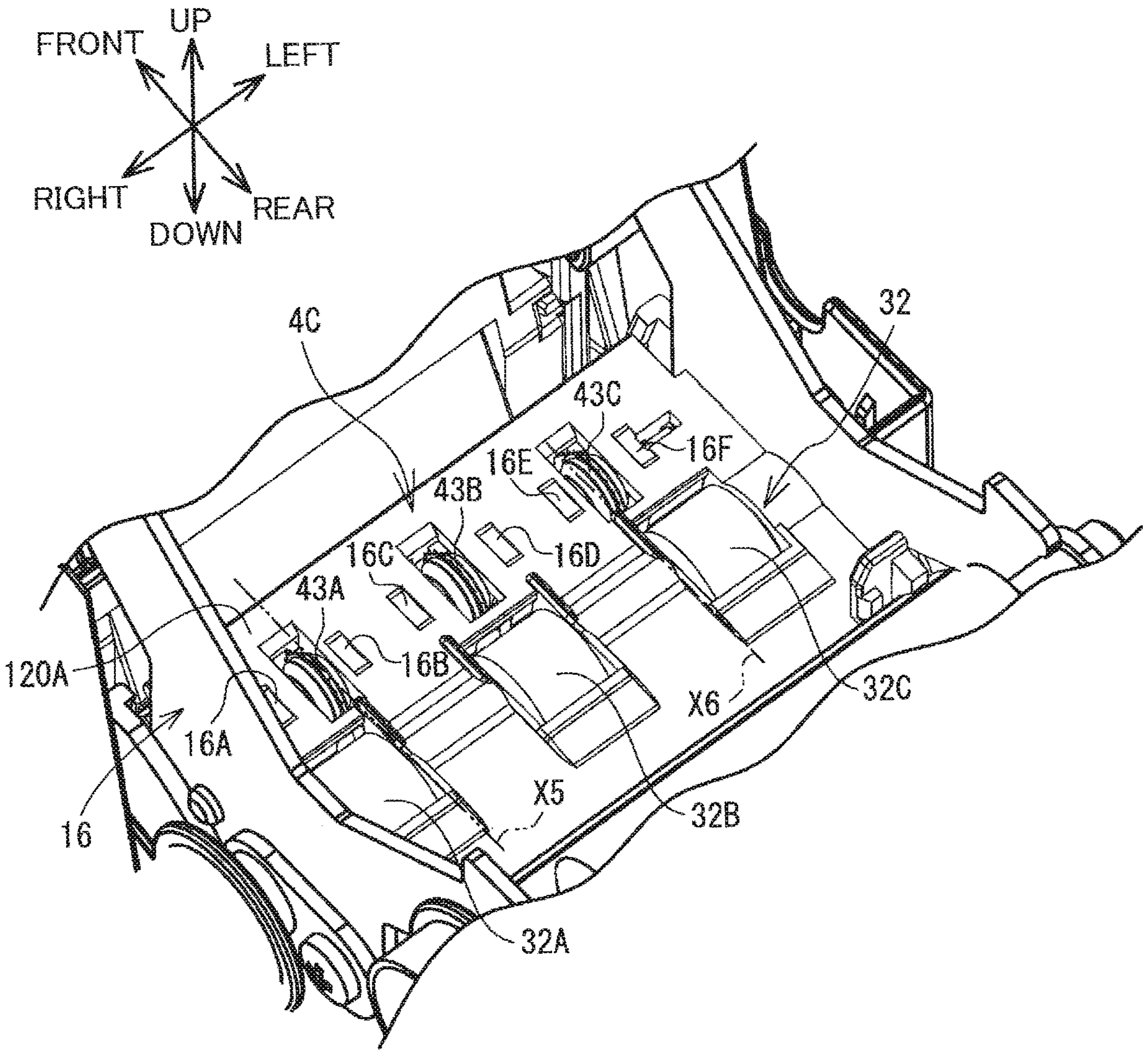
FIG. 39 is an enlarged view of a region near a straightening member 4C in FIG. 38.

As illustrated in FIG. 39, a center position X5 of the rotating body 43A in the left-right direction is arranged to the left of the conveying roller 32A. A center position X6 of the rotating body 43C in the left-right direction is arranged to the right of the conveying roller 32C. Therefore, the center positions X5 and X6 of the corresponding rotating bodies 43A and 43C are arranged at different positions in the left-right direction from the conveying rollers 32A-32C.

As illustrated in FIG. 40, a plane extending horizontally that passes through the protruding parts 431 of the rotating bodies 4C will be defined as a datum plane M4. The datum plane M4 is coincident with the datum plane M1 (see FIG. 7), which is the plane passing through the peeling point 370 of the stripping plate 37 and the tops of the conveying rollers 32. Hereinafter, the datum planes M1, M2, and M4 will be collectively referred to as the datum plane M. The restriction wall 86 of the restriction part 8B is positioned downstream relative to the downstream and of the third conveying path R3 and intersects the datum plane M. The restriction wall 87 is arranged above the third conveying path R3 and the datum plane M. The restriction wall 88 is arranged below the third conveying path R3 and the datum plane M.

As illustrated in FIG. 39, through-holes 16 (through-holes 16A-16F) are formed in the conveying surface 120A at positions overlapping the rotating bodies 4C in the left-right direction, i.e., at the same position in the conveying direction. Specifically, the through-holes 16A, 16B, 16C, 16D, 16E, and 16F are respectively arranged near the right side of the rotating body 43A, near the left side of the rotating body 43A, near the right side of the rotating body 43B, near the left side of the rotating body 43B, near the right side of the rotating body 43C, and near the left side of the rotating body 43C. The label detection sensor 46 (see FIG. 14) is disposed below the through-holes 16.

A label 10A peeled off the release paper 10B by the stripping plate 37 of the conveying mechanism 3 is conveyed along the third conveying path R3 by the conveying rollers 32 and guided to the straightening member 4 located downstream of the conveying rollers 32. As the label 10A passes between the rotating bodies 4A and 4C of the straightening member 4, the top adhesive surface of the label 10A contacts the rotating bodies 4A while the bottom surface contacts the rotating bodies 4C. The rotating bodies 4A and 4C convey the label 10A while curving the label 10A to form waves in the left-right direction. The straightening member 4 corrects any tendency to curl in the label 10A by bending the label 10A into this wavy shape.

Operations and Technical Advantages of the First Modification

The rotating bodies 4A and 4C of the straightening member 4 can convey the label 10A while bending the label 10A into the shape of waves juxtaposed in the left-right direction. Accordingly, the label wrapping device 1B can convey the label 10A while correcting curling tendency in the same. The label wrapping device 1B can also better suppress frictional force from being generated by the straightening member 4 when conveying the label 10A than when the ribs 4B are employed in the straightening member 4. Therefore, the label wrapping device 1B can convey the labels 10A more smoothly.

The center positions X1, X2, X3, and X4 of the corresponding rotating bodies 41B, 41C, 41D, and 41E are all arranged at different positions in the left-right direction from the conveying rollers 32A-32C (see FIG. 10). The center positions X5 and X6 of the corresponding rotating bodies 43A and 43C are also arranged at different positions in the left-right direction from the conveying rollers 32A-32C (see FIG. 39). In other words, portions of both rotating bodies 4A and 4C are arranged at different positions from the conveying rollers 32A-32C. In this case, the label 10A is curved by the conveying rollers 32 and the rotating bodies 41B-41E, 43A, and 43C to form waves in the left-right direction. Accordingly, with the conveying rollers 32 and the rotating bodies 41B-41E, 43A, and 43C, the label wrapping device 1B can bend the label 10A and can reliably suppress curling tendency in the label 10A.

Second Modification

Figure 42:
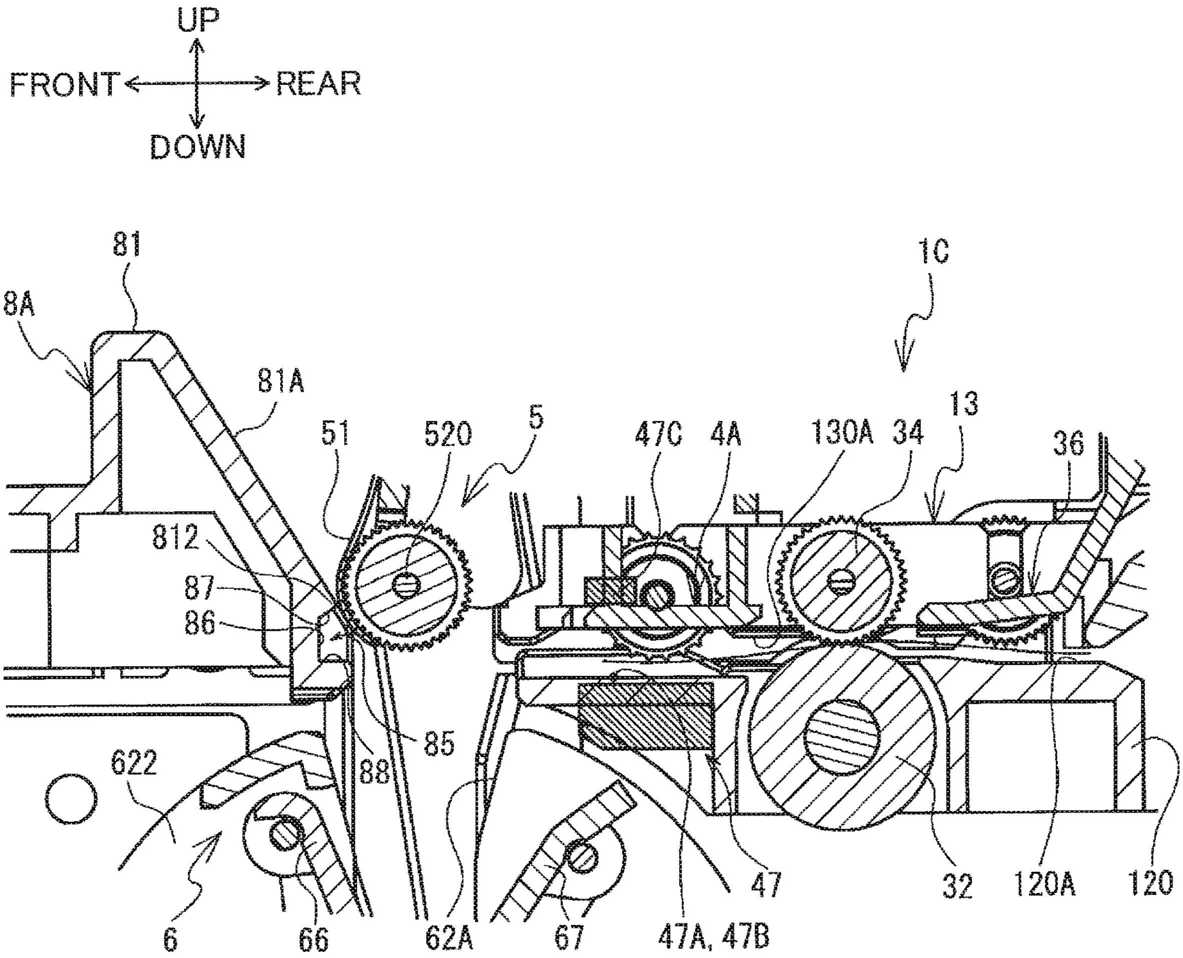
FIG. 42 is a cross-sectional view of a label wrapping device 1C.

A label wrapping device 1C according to a second modification will be described with reference to FIG. 42. The label wrapping device 1C differs from the label wrapping device 1A in that a sensor 47 is used in place of the label detection sensor 46. All remaining structures are identical to those in the label wrapping device 1A, and a description of those structures will be omitted.

The sensor 47 is provided beneath the through-hole 160 (see FIG. 10). The sensor 47 is a non-contact optical sensor configured of a light-emitting unit 47A and a light-receiving unit 47B. The light-emitting unit 47A emits light upward through the through-hole 160. A reflector 47C is provided on the conveying surface 130A of the cover part 13 for reflecting light emitted from the light-emitting unit 47A. The light-receiving unit 47B receives the light reflected by the reflector 47C. When a label 10A passes through the straightening member 4, the label 10A covers the top of the through-hole 160, blocking light emitted from the light-emitting unit 47A and preventing the light from reaching the reflector 47C. Consequently, the light-receiving unit 47B of the sensor 47 does not receive reflected light.

The sensor 47 outputs a signal to the CPU 91A (see FIG. 34) corresponding to whether or not the light-receiving unit 47B received reflected light when the light-emitting unit 47A emitted light. More specifically, the sensor 47 outputs an OFF signal when the light-receiving unit 47B receives reflected light and outputs an ON signal when the light-receiving unit 47B does not receive reflected light. Therefore, the CPU 91A can detect when the label 10A on the third conveying path R3 is at the position of the straightening member 4 based on the output signals from the sensor 47.

Third Modification

Figure 43:
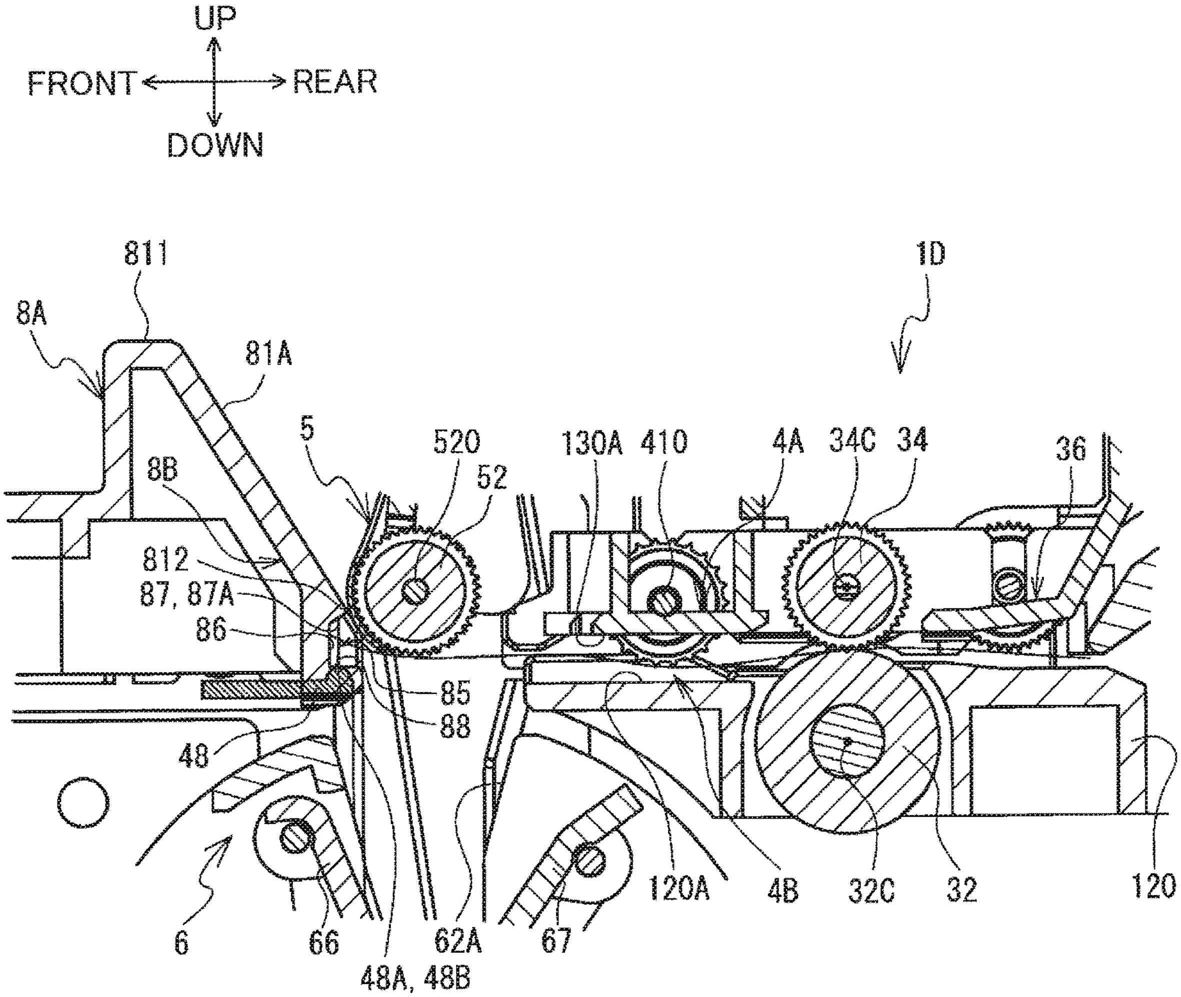
FIG. 43 is a cross-sectional view of a label wrapping device 1D.

A label wrapping device 1D according to a third modification will be described with reference to FIG. 43. The label wrapping device 1D differs from the label wrapping devices 1A-1C in that a label detection sensor 48 is provided at the restriction part 8B. The remaining structures of the label wrapping device 1D are identical to those of the label wrapping devices 1A-1C, and a description of those structures will be omitted.

The label detection sensor 48 is provided beneath the recess 85 of the restriction part 8B. The label detection sensor 48 is a non-contact optical sensor and includes a light-emitting unit 48A and a light-receiving unit 48B. The light-emitting unit 48A emits light upward from the restriction wall 88. A reflector 87A is provided on the restriction wall 87 for reflecting the light emitted from the light-emitting unit 48A. The light-receiving unit 48B receives the light reflected by the reflector 87A. When the first end 101, which is the downstream end of the label 10A, advances into the recess 85, the label 10A blocks the light emitted from the light-emitting unit 48A, preventing the light from reaching the reflector 87A. Consequently, the light-receiving unit 48B of the label detection sensor 48 will not receive reflected light.

The label detection sensor 48 outputs a signal to the CPU 91A (see FIG. 34) corresponding to whether or not the light-receiving unit 48B received reflected light when the light-emitting unit 48A emitted light. More specifically, the label detection sensor 48 is configured to output an OFF signal when the light-receiving unit 48B receives reflected light and output an ON signal when the light-receiving unit 48B does not receive reflected light. Hence, the label wrapping device 1D can detect the first end 101 of the label 10A at the position of the restriction walls 86, 87, and 88.

With this configuration, the label wrapping device 1D can regulate the conveyance amount for the label 10A so that the label 10A is conveyed until the label 10A reaches the restriction part 8B and covers the insertion recess 62A. Accordingly, the label wrapping device 1D can suitably wrap a label 10A around a cable 19 in response to the cable 19 being inserted into the insertion recess 62A.

<Other Variations>

The present disclosure is not limited to the embodiment and its modifications described above, and various modifications may be made thereto. Unless otherwise specified, the following variations will be described using the label wrapping device 1A as an example, but it should be apparent that the same variations may be applied to the label wrapping devices 1B-1D, as well.

The rotating bodies 4A may be configured of ribs instead. That is, the straightening member 4 may be configured with ribs disposed on both upper and lower sides of the third conveying path R3. In this case, the ribs may overlap each other in the left-right direction over their entire extended range in the conveying direction.

The sensor used in the label wrapping device 1A for detecting the label 10A at the position of the straightening member 4 is not limited to the label detection sensor 46. For example, the label wrapping device 1A may include a sensor that detects rotation of the rotating bodies 4A in the straightening member 4. In this case, the label wrapping device 1A can detect the label 10A passing through the straightening member 4 by detecting the rotation of the rotating bodies 4A rotating in response to the conveyance of the label 10A. Still alternatively, the label wrapping device 1A also need not possess a sensor for detecting labels 10A.

The restriction walls 87 and 88 of the restriction part 8B may be configured to be movable vertically. In this case, the restriction walls 87 and 88 can be moved toward each other to pinch the first end 101 of the label 10A from top and bottom thereof. The restriction wall 87 may also extend horizontally. The restriction wall 88 may also extend in a direction sloped relative to the horizontal direction. Still alternatively, rather than being formed by the bottom and side surfaces of the recess 85, the restriction walls 86, 87, and 88 may be provided separately. One of the restriction walls 87 and 88 may also be arranged along the datum plane M.

The two rotating bodies 4A configuring each of the rotating sets 411, 412, and 413 of the straightening member 4 may be movable in the left-right direction. The separation distance between the two rotating bodies 4A of each of the rotating sets 411, 412, and 413 can be adjusted based on the length in the left-right direction of labels 10A being used in the label wrapping device 1A.

In the label wrapping device 1A, the left-right center position of the rotating body 41A matches the conveying roller 32A in the left-right direction, and the left-right center position of the rotating body 41F matches the conveying roller 32C in the left-right direction (see FIG. 10). However, the center positions of the rotating bodies 41A and 41F in the left-right direction may differ from those of the conveying rollers 32A and 32C in the left-right direction. Alternatively, the rotating bodies 41A and 41F may be omitted from the label wrapping device 1A. In these cases, all of the rotating bodies 4A are arranged at different positions from the conveying rollers 32 in the left-right direction.

In the label wrapping device 1B, the left-right center position of the rotating body 43B matches the conveying roller 32B in the left-right direction (see FIG. 39). However, the left-right center position of the rotating body 43B may differ from the conveying roller 32B in the left-right direction. Alternatively, the rotating body 43B may be omitted from the label wrapping device 1B. In these cases, all of the rotating bodies 4C are arranged at different positions from the conveying rollers 32 in the left-right direction.

The rear ends of the ribs 4B may extend farther rearward than the front ends of the conveying rollers 32. In other words, a portion of the rear ends of the ribs 4B may overlap the conveying rollers 32 in the front-rear direction.

As with the rotating bodies 4A, the rotating bodies 4C of the label wrapping device 1B may be constituted by a plurality of rotating sets that are each configured of a pair of rotating bodies separated from each other in the left-right direction. The separation distance in the left-right direction for each of the rotating sets may be mutually different. The separation distances may correspond to the left-right lengths of labels 10A conveyed along the third conveying path R3.

The label wrapping device 1A may also include a printing unit capable of printing labels 10A. The printing unit may perform printing on a label 10A of a label tape 10, after which the label wrapping device 1A may wrap the printed label 10A around a cable 19.

While the description has been made in detail with reference to the embodiments, it would be apparent to those skilled in the art that many modifications and variations may be made thereto. Further, the elements described in the above embodiment and modifications may be combined as appropriate, as long as no contradiction is incurred.

REMARKS

The label wrapping devices 1A, 1B, 1C, 1D are examples of a label wrapping device. The label 10A is an example of a label. The cable 19 is an example of a cable. The conveying rollers 32 (32A-32C) are an example of a conveying roller. The straightening member 4 is an example of a straightening member. The rotating bodies 4A are an example of a first member. The ribs 4B are an example of a second member. The third conveying path R3 is an example of a conveying path. The insertion recess 62A is an example of an insertion recess. The vertical direction is an example of a prescribed direction. The left-right direction is an example of a width direction. The rotating sets 411-413 are an example of a rotating sets. The rotating bodies 41A-41F are examples of a pair of rotating bodies constituting the rotating set. The separation distances L1-L3 are examples of a prescribed separation distance. The restriction walls 87 and 88 are an example of a pair of first restriction walls. The restriction wall 86 is an example of a second restriction wall. The datum plane M (M2, M4) is an example of a datum plane. The label detection sensor 46 is an example of a first sensor. The sensor 47 is another example of the first sensor. The label detection sensor 48 is an example of a second sensor. The rotating bodies 4C are another example of the second member. The rotating bodies 41A-41F are also an example of a first rotating body. The rotating bodies 43A-43C are an example of a second rotating body.

What is claimed is:

1. A label wrapping device configured to peel a label off a release paper and wrap the label around a cable, the label wrapping device comprising:

a conveying roller pair configured to convey the label peeled off the release paper in a conveying direction along a conveying path, the conveying roller pair comprising:

a conveying roller rotatable upon receipt of a driving force; and a follow roller rotatably following rotation of the conveying roller and configured to pinch the label in cooperation with the conveying roller;

a straightening member positioned downstream of the conveying roller pair in the conveying direction, the straightening member comprising a first member and a second member positioned opposite each other with respect to the conveying path in a prescribed direction intersecting the conveying path, a part of the first member and a part of the second member overlapping each other in a width direction orthogonal to the conveying direction and crossing the prescribed direction, a part of the first member and a part of the second member overlapping each other in the prescribed direction; and an insertion recess disposed downstream of the straightening member in the conveying direction and positioned on the same side as the second member in the prescribed direction with respect to the conveying path, the insertion recess being open toward the conveying path.

2. The label wrapping device according to claim 1, further comprising a first sensor configured to detect the label conveyed in the conveying direction at a position of the straightening member.

3. The label wrapping device according to claim 1, wherein the first member is a rotating body, and the second member is a rib.

4. The label wrapping device according to claim 3, further comprising a pair of first restriction walls positioned downstream of the insertion recess in the conveying direction, the pair of first restriction walls being positioned opposite each other with respect to a datum plane in the prescribed direction and configured to restrict movement of the label in the prescribed direction, the datum plane passing through a distal end of the rib and extending in the conveying direction.

5. The label wrapping device according to claim 4, further comprising a second sensor configured to detect the label conveyed in the conveying direction at a position of the first restriction walls.

6. The label wrapping device according to claim 4, further comprising a second restriction wall positioned downstream of the insertion recess in the conveying direction, the second restriction wall intersecting the datum plane to restrict the label from being conveyed further downstream in the conveying direction.

7. The label wrapping device according to claim 3, wherein the rotating body comprises a plurality of rotating sets each of which is configured by a pair of rotating bodies separated in the width direction by a prescribed separation distance mutually different among the plurality of rotating sets, the prescribed separation distance being so set to correspond to a length in the width direction of the label conveyed along the conveying path.

8. The label wrapping device according to claim 3, wherein the rotating body is disposed at a different position from the conveying roller in the width direction.

9. The label wrapping device according to claim 3, wherein the rib has a portion positioned at the same position as the conveying roller in the conveying direction.

10. The label wrapping device according to claim 1, wherein the first member is a first rotating body, and the second member is a second rotating body.

11. The label wrapping device according to claim 10, further comprising a pair of first restriction walls positioned downstream of the insertion recess in the conveying direction, the pair of first restriction walls being positioned opposite each other with respect to a datum plane in the prescribed direction and configured to restrict movement of the label in the prescribed direction, the datum plane extending in the conveying direction and passing through a protruding portion of the second rotating body that protrudes farthest toward the conveying path.

12. The label wrapping device according to claim 11, further comprising a second sensor configured to detect the label conveyed in the conveying direction at a position of the first restriction walls.

13. The label wrapping device according to claim 11, further comprising a second restriction wall positioned downstream of the insertion recess in the conveying direction, the second restriction wall intersecting the datum plane to restrict the label from being conveyed further downstream in the conveying direction.

14. The label wrapping device according to claim 10, wherein at least one of the first rotating body and the second rotating body comprises a plurality of rotating sets each of which is configured by a pair of rotating bodies separated in the width direction by a prescribed separation distance mutually different among the plurality of rotating sets, the prescribed separation distance being so set to correspond to a length in the width direction of the label conveyed along the conveying path.

15. The label wrapping device according to claim 10, wherein the first rotating body and the second rotating body are disposed respectively at different positions from the conveying roller in the width direction.

16. The label wrapping device according to claim 1, wherein the insertion recess is configured to receive the label together with the cable after the label passed the straightening member in the conveying direction, the insertion recess being defined in a wrapping mechanism rotatable to wrap the label around the cable received in the insertion recess.

17. The label wrapping device according to claim 1, further comprising:

a housing; and a cover movably supported by the housing, wherein the conveying roller, the second member, and the insertion recess are provided in the housing, wherein the follow roller and the first member are provided on the cover, and wherein when the cover is closed, the second member is positioned opposite the first member with respect to the conveying path in the prescribed direction, the part of the first member and the part of the second member overlap each other in the width direction, and the part of the first member and the part of the second member overlap each other in the prescribed direction.

* * * * *